(12) United States Patent
Butterfield et al.

(10) Patent No.: US 9,978,068 B2
(45) Date of Patent: May 22, 2018

(54) OBTAINING RECIPIENT INFORMATION DURING AN ELECTRONIC REMITTANCE TRANSACTION

(71) Applicant: Facebook, Inc., Menlo Park, CA (US)

(72) Inventors: John Hamilton Butterfield, Fremont, CA (US); Stephen Moore Davis, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 770 days.

(21) Appl. No.: 14/509,871

(22) Filed: Oct. 8, 2014

(65) Prior Publication Data

US 2016/0104159 A1    Apr. 14, 2016

(51) Int. Cl.
| | |
|---|---|
| *G06Q 40/00* | (2012.01) |
| *G06Q 20/40* | (2012.01) |
| *G06Q 50/00* | (2012.01) |
| *G06Q 20/22* | (2012.01) |

(52) U.S. Cl.
CPC ......... *G06Q 20/405* (2013.01); *G06Q 20/223* (2013.01); *G06Q 20/4016* (2013.01); *G06Q 50/01* (2013.01)

(58) Field of Classification Search
CPC .... G06Q 40/00; G06Q 20/405; G06Q 20/223; G06Q 20/4016; G06Q 50/01
See application file for complete search history.

(56) References Cited

U.S. PATENT DOCUMENTS

| | | | | |
|---|---|---|---|---|
| 9,659,293 | B2 * | 5/2017 | Dunwoody | G06Q 20/381 |
| 2011/0251941 | A1 * | 10/2011 | Dunwoody | G06Q 20/223 |
| | | | | 705/37 |
| 2012/0150732 | A1 * | 6/2012 | Isaacson | G06Q 10/101 |
| | | | | 705/39 |
| 2012/0233073 | A1 * | 9/2012 | Salmon | G06Q 20/381 |
| | | | | 705/44 |
| 2013/0317966 | A1 * | 11/2013 | Bass | G06Q 30/02 |
| | | | | 705/37 |
| 2014/0058944 | A1 * | 2/2014 | Ballout | G06Q 20/3223 |
| | | | | 705/43 |
| 2017/0161781 | A1 * | 6/2017 | Parekh | G06Q 30/0253 |
| 2017/0178092 | A1 * | 6/2017 | Ubalde | G06Q 20/10 |

\* cited by examiner

*Primary Examiner* — Lalita M Hamilton
(74) *Attorney, Agent, or Firm* — Keller Jolley Preece

(57) ABSTRACT

One or more embodiments described herein include methods and systems for remitting funds via a social networking system. More specifically, systems and methods described herein provide users the ability to remit funds to co-users utilizing social network profiles and notifications. Additionally, systems and methods described herein determine one or more risk levels for a remittance request based on a variety of social network factors.

20 Claims, 37 Drawing Sheets

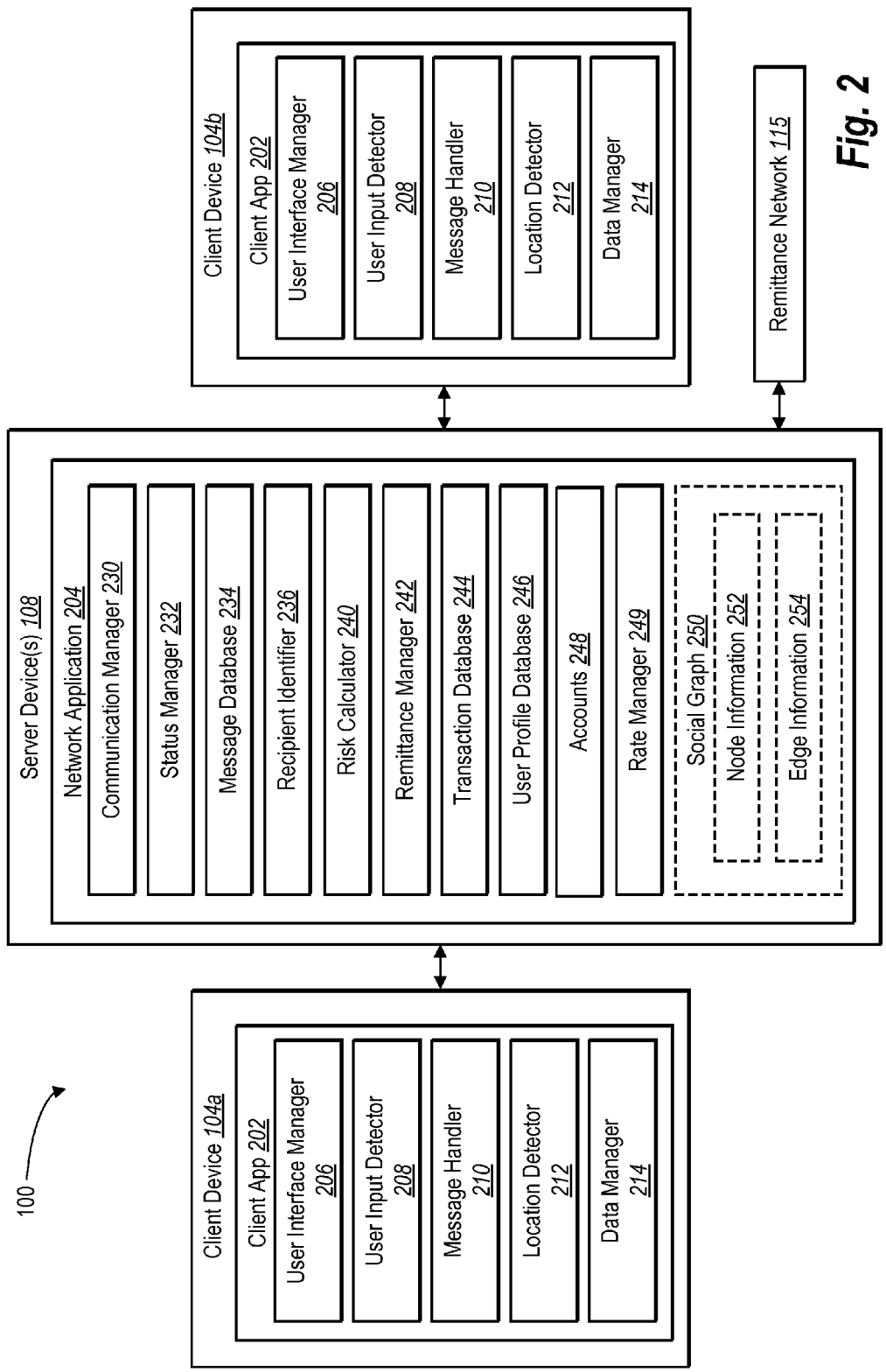

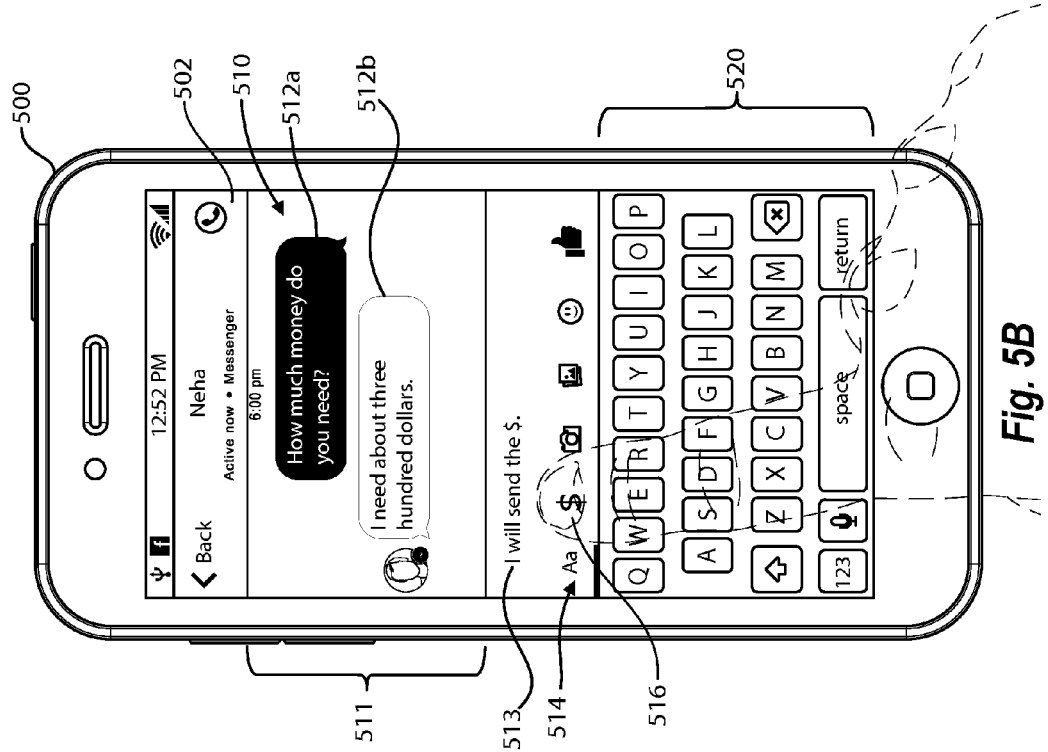
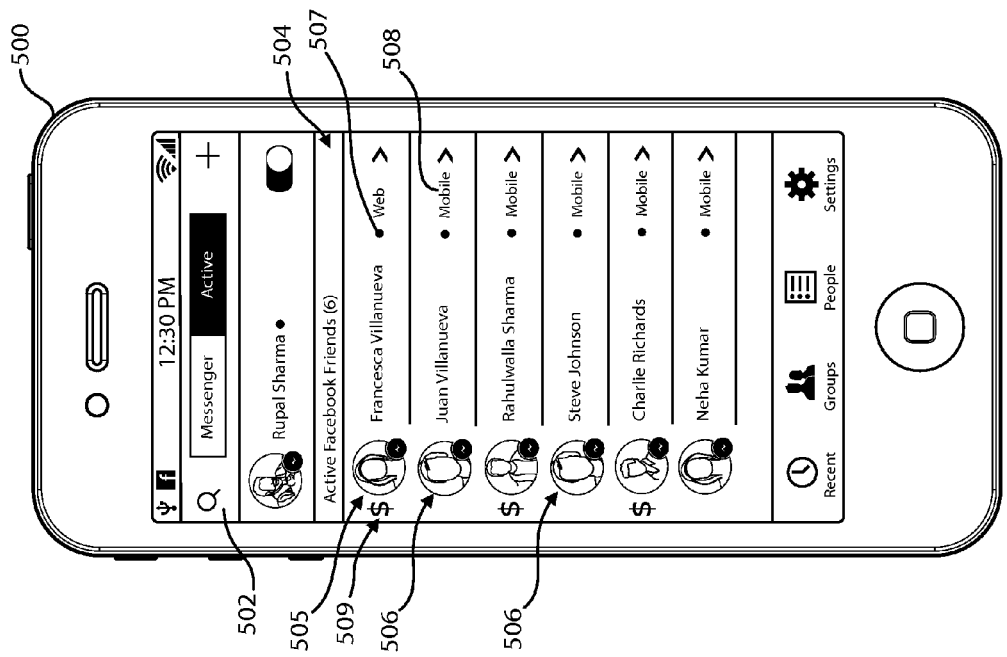
Fig. 5B
Fig. 5A

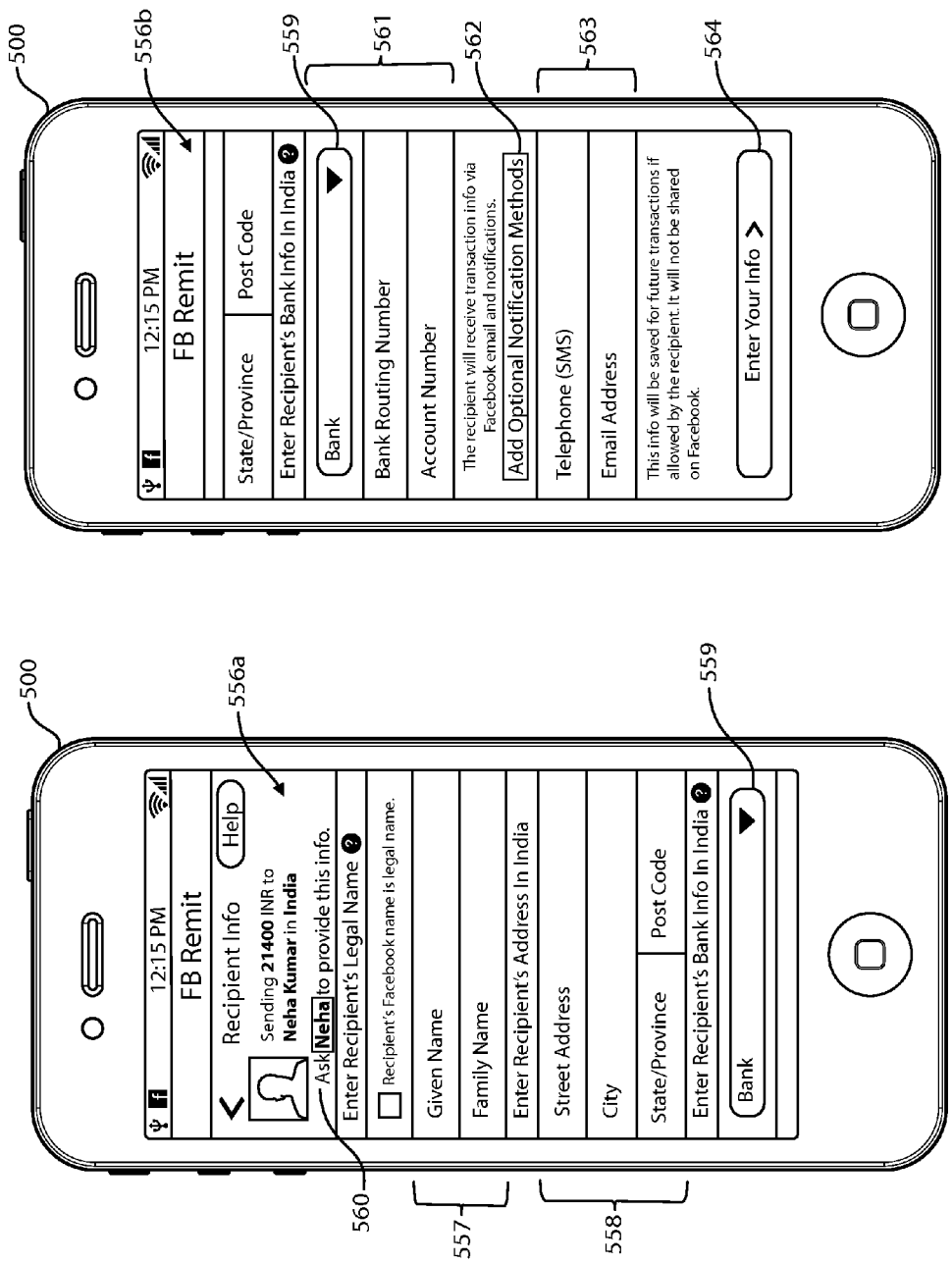

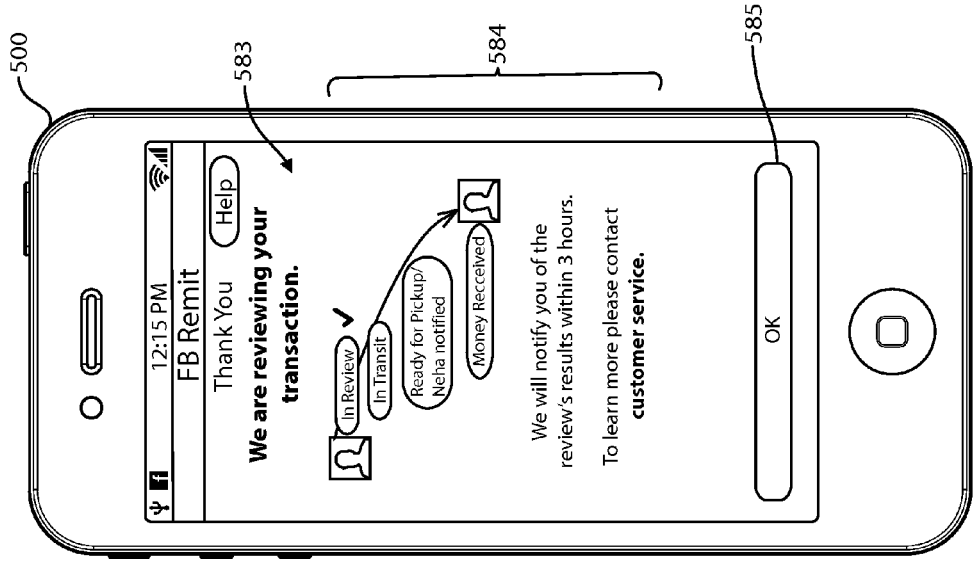
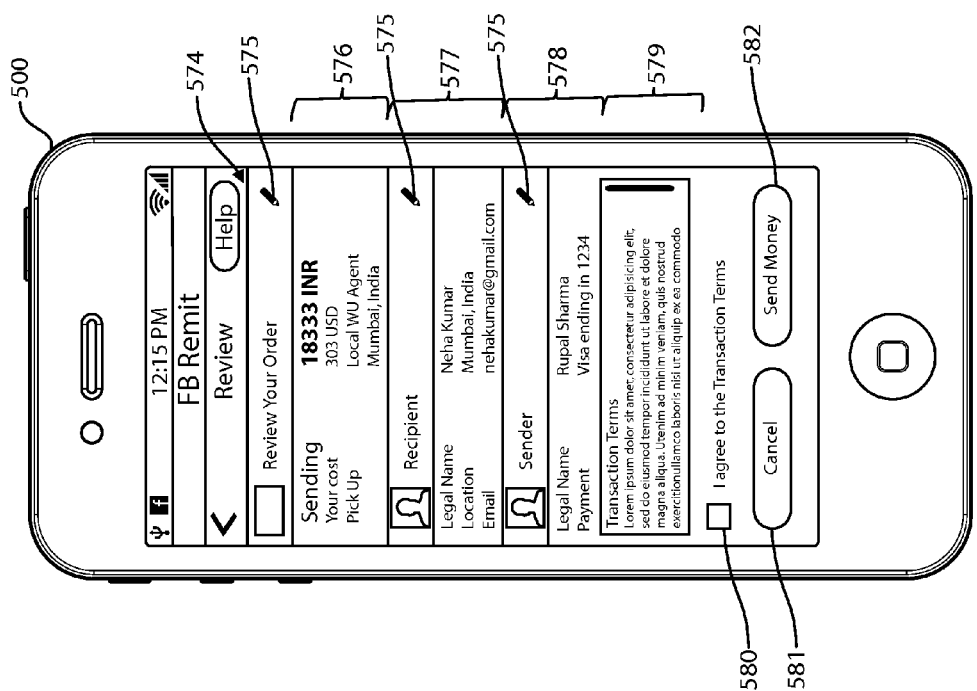
Fig. 5M
Fig. 5N

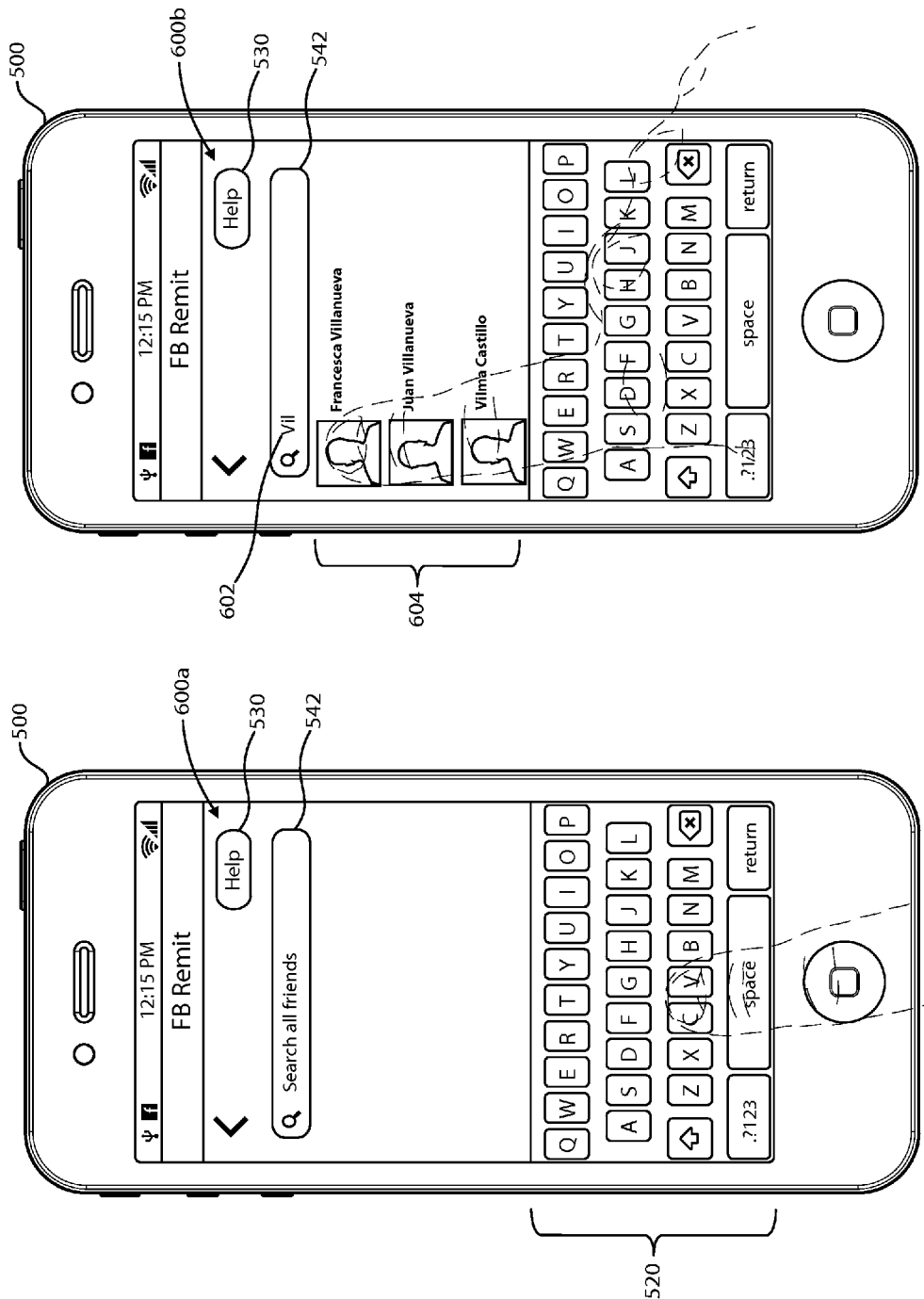

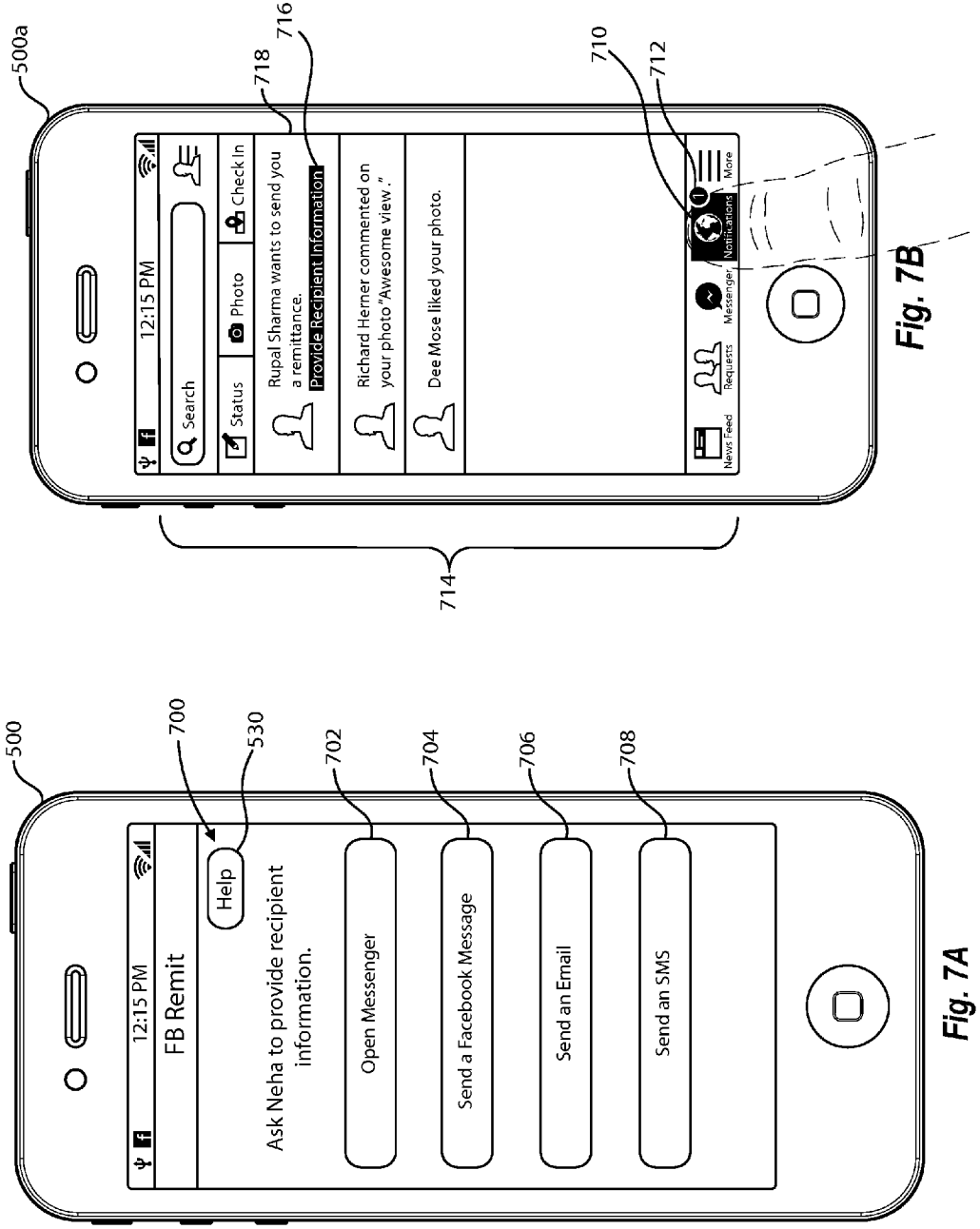

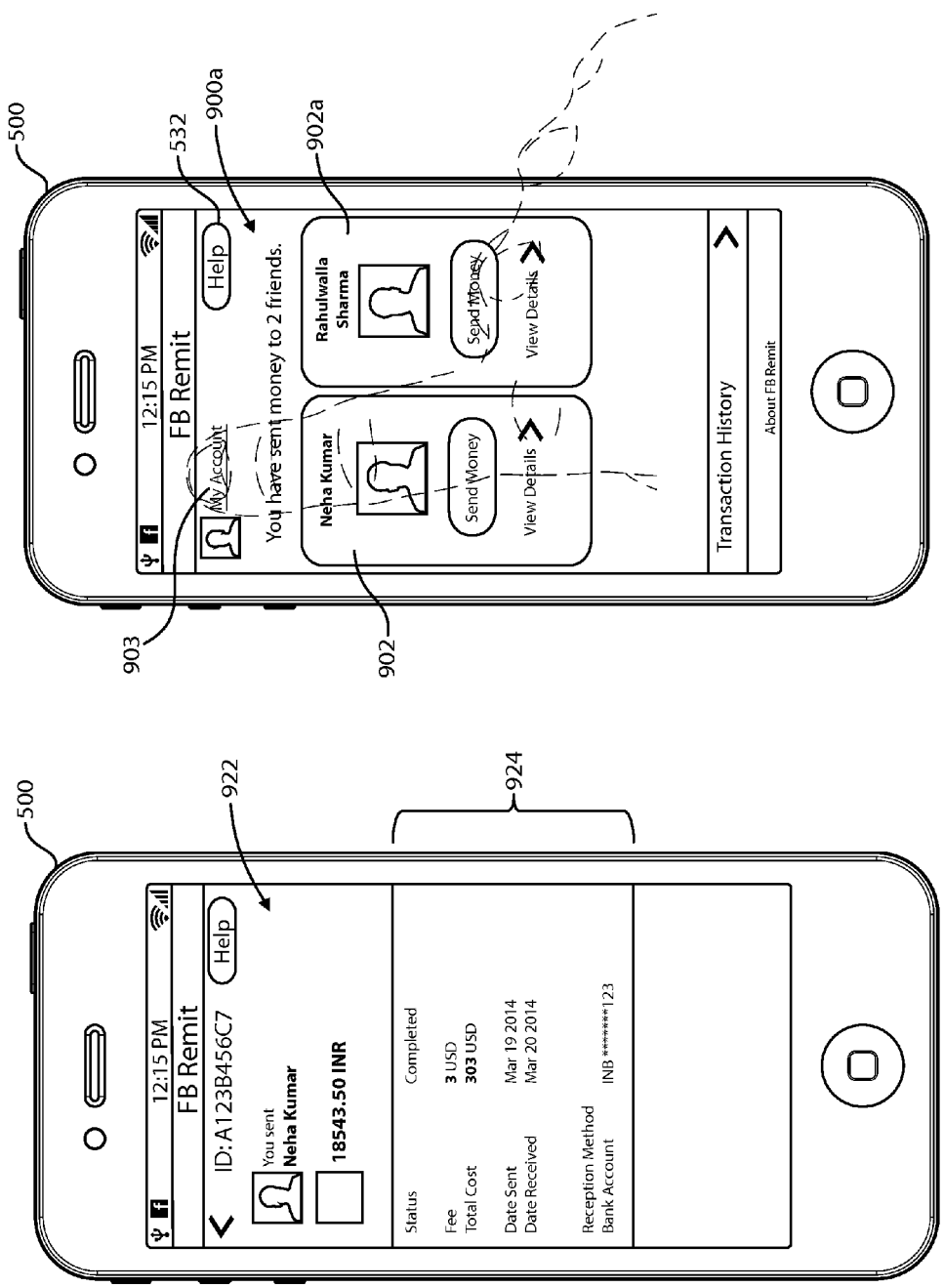

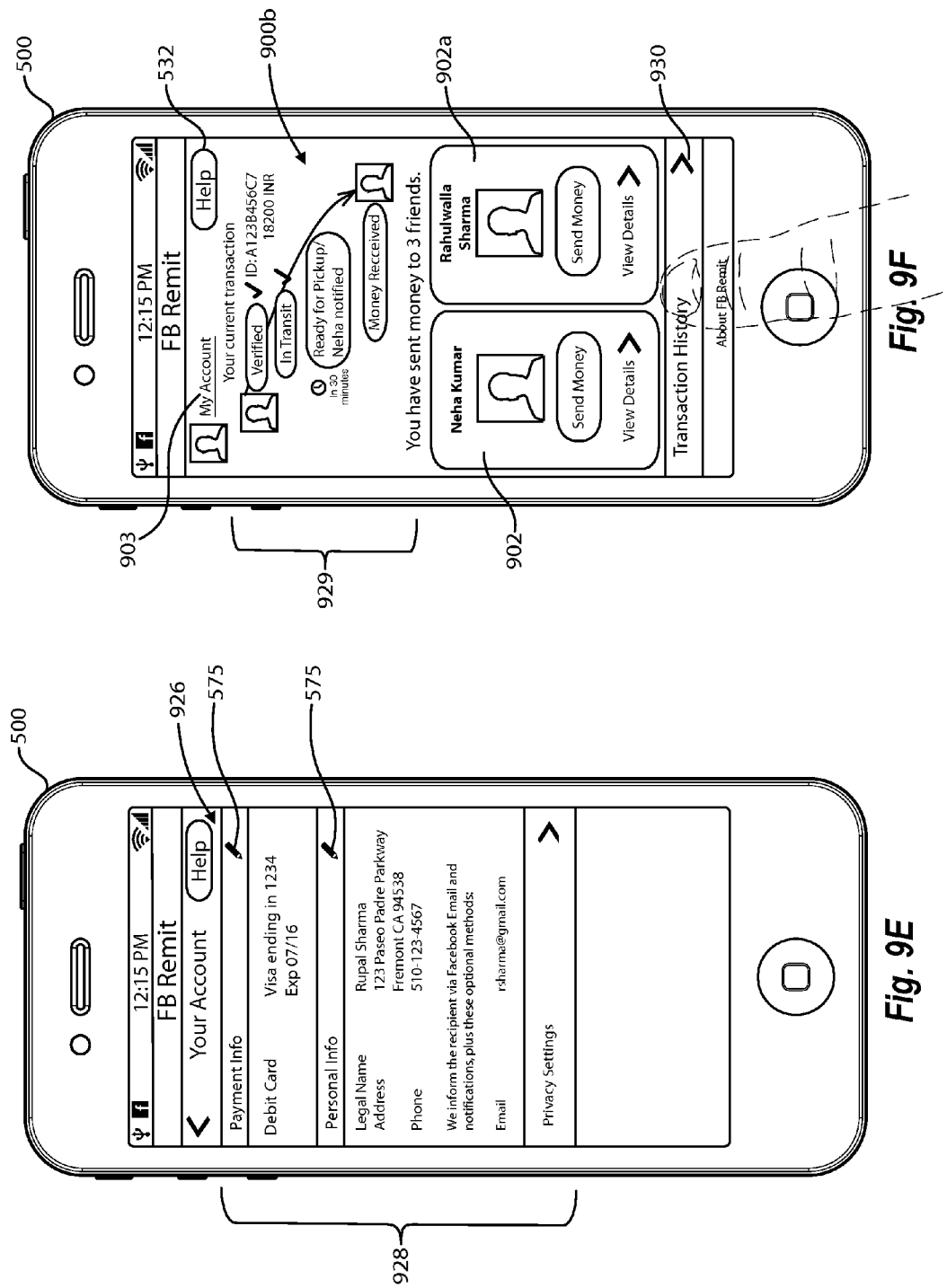

OBTAINING RECIPIENT INFORMATION DURING AN ELECTRONIC REMITTANCE TRANSACTION

CROSS REFERENCE TO RELATED APPLICATIONS

N/A

BACKGROUND

1. Technical Field

One or more embodiments relate generally to remitting funds. More specifically, one or more embodiments relate to system and methods of improving the safety, ease, and convenience of electronically remitting funds.

2. Background and Relevant Art

A remittance is typically a money transfer sent from a user to one or more individuals in another country. Remittances generally play a large role in the economies of developing countries where families are dependent on money sent from relatives who work in more affluent parts of the world. For example, an emigrant working in the United States may send money to his home country every week in order for his parents to be able to pay their bills. According to some estimates, in recent years, remittances have brought hundreds of billions of dollars to developing countries.

In order to send a remittance, a sender typically utilizes a money transfer service, such as Western Union® or MoneyGram®. Remitting funds with these types of money transfer services generally requires multiple communications back and forth between the sender and the recipient in order to determine the remittance amount, the delivery time and date, as well as the pickup location. Organizing these details may be time consuming and cumbersome when the sender and recipient are attempting to communicate across multiple countries and time zones. Additionally, money transfer services generally charge large transfer fees, which add an extra burden to the remittance process.

Users can also remit funds via a bank-to-bank transfer, where funds are transmitted from one person's bank account to another person's bank account. Remitting funds in a bank-to-bank transfer, however, is also often problematic. For example, a sender in the United States may have a bank account with a large national bank. U.S. banks, however, generally have a limited number of branches outside of the U.S. A large U.S. bank may have a branch in a large city of another country, but it is uncommon that even the most popular U.S. bank will have a branch in the rural parts of a developing country. Thus, in order to facilitate a bank-to-bank transfer, the sender generally must organize account and routing numbers across two different banking systems. This process is typically, expensive, cumbersome, and error-prone. Furthermore, depending upon the infrastructure of the developing country, there may not be any banks available to receive a wire transfer.

In addition to the foregoing, identity theft is an increasing problem with regard to money remittances. For example, a sender may receive a remittance request via a phone call or email to remit funds to a person in another country. The sender, however, may have little assurance that the person making the request is not a fraud. This may be especially true for remittances transferred to developing countries where crime rates tend to be high. A thief may trick a sender into remitting funds and obtain fake identification in order to pick up remitted funds that were intended for someone else.

Thus, there are several disadvantages to current methods for electronically remitting funds.

SUMMARY

One or more embodiments provide benefits and/or solve one or more of the foregoing or other problems in the art with systems and methods that provide users with efficient and effective user experiences when electronically remitting funds. In particular, systems and methods described herein can request remittance information from the intended recipient after the sender has initiated the remittance process, thus alleviating any need for the sender to personally obtain extra information from the recipient. This can allow a sender to electronically remit funds without the hassle and time required to obtain all the recipient information typically needed for a traditional money transfer.

Additionally, one or more embodiments can reduce potential for a fraudulent transaction by preforming a series of risk checks. For instance, one or more embodiments determine a risk level for the remittance transaction based on information about a sender, a recipient, and/or a relationship between the sender and the recipient. In one or more embodiments, if the risk level is too high, systems and methods described herein can deny the remittance transaction. If an intermediate risk score is determined, one or more embodiments can request additional information before allowing the transaction to continue. Thus, one or more embodiments described herein assist in making the electronic remittance relatively safe from fraudulent transfers.

In particular, one or more embodiments provide a remittance system that is integrated with a messaging/social networking system. The integrated remittance and social networking system can allow users to send and receive messages as well as electronic payments. For example, the systems and methods can allow a user to send a co-user(s) an electronic payment via a messaging interface that also allows for the exchange of electronic messages with the co-user(s). The integration of remittance system and a messaging system can provide users with the ability to send and receive electronic payments within the flow of a conversation. Thus, one or more embodiments allow users to communicate about a payment transaction and conduct the transaction without having to open a separate application dedicated to electronic payments.

Additional features and advantages of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments of the invention will be described and explained with additional specificity and detail through the use of the accompanying drawings in which:

FIG. 2 illustrates a detailed schematic diagram of a remittance system in accordance with one or more embodiments;

FIGS. 6A-6D illustrate user interfaces for searching for and selecting a remittance recipient in accordance with one or more embodiments;

FIGS. 7A-7B illustrate user interfaces to aid in obtaining information from a recipient in accordance with one or more embodiments;

FIGS. 9A-9I illustrate user interfaces for reviewing pending and completed remittances in accordance with one or more embodiments;

DETAILED DESCRIPTION

Figure 1:
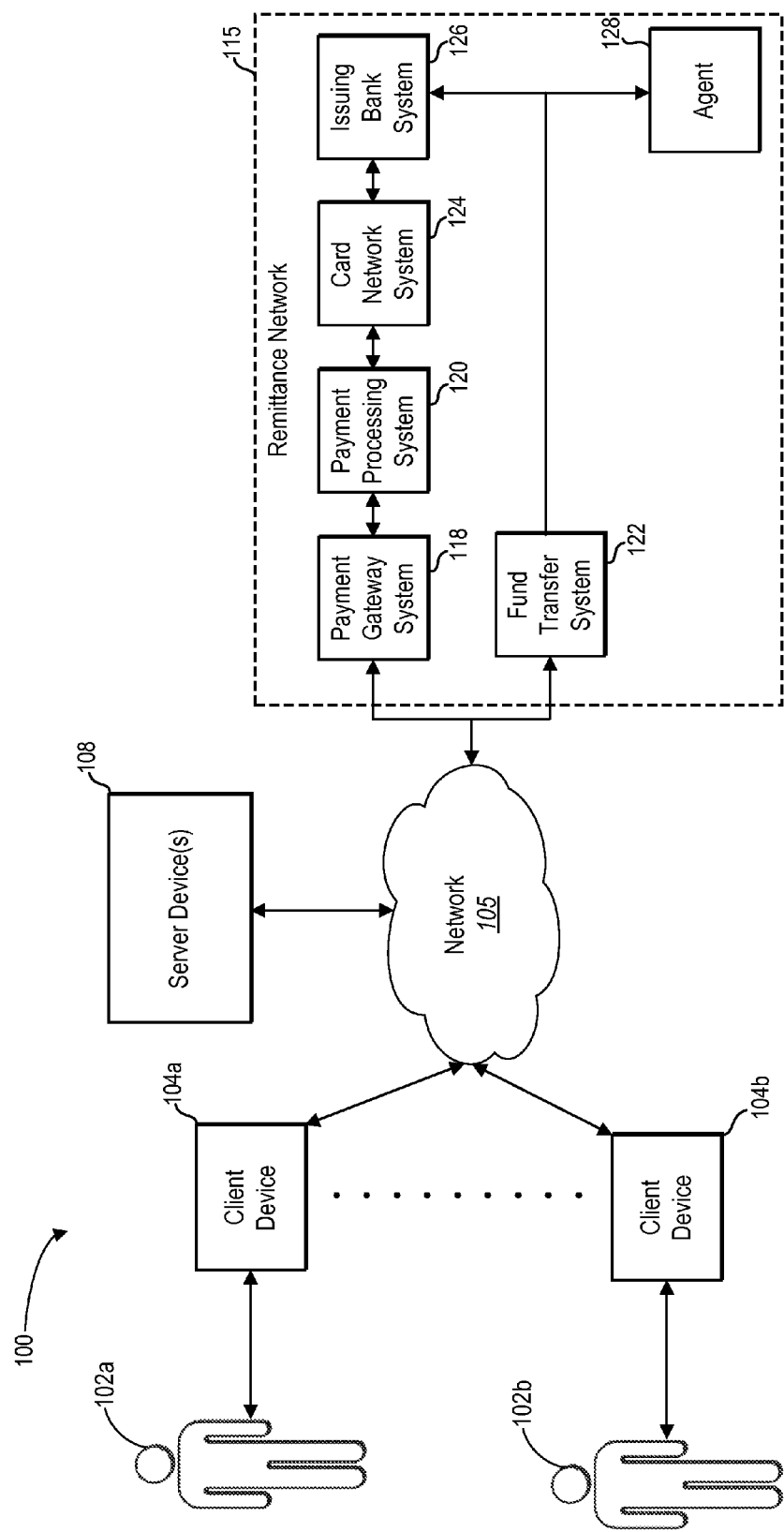
FIG. 1 illustrates a block diagram of an environment for implementing a remittance system in accordance with one or more embodiments.

One or more embodiments include a remittance system that provides users with efficient and effective user experiences when transacting electronic remittances. In particular, systems and methods described herein can pause an initiated remittance and gather remittance information from the intended recipient, thus sparing the remittance sender from having to gather the remittance information. Once the intended recipient has furnished the needed remittance information, the remittance system may proceed with the transaction.

Additionally, one or more embodiments can provide a series of remittance transaction risk checks. For instance, one or more embodiments assign a level of risk to a remittance transaction based on an analysis of the sender, the recipient, and/or a relationship between the sender and the recipient. In particular, based on an assigned level of risk, one or more embodiments may permit or deny the remittance transaction. In this way, the remittance system described herein can add an extra layer of fraud protection to the process of sending electronic remittances.

In one or more embodiments, the remittance process described herein begins with a sender logging into the remittance system. One or more embodiments may determine a risk level associated with the sender before the remittance process can continue. If the risk level associated with the sender is within a predetermined limit, the sender may select a new or previous recipient to receive the remittance. One or more embodiments may determine a risk level associated with the selected recipient before the remittance process can continue. If the risk level associated with the selected recipient is within a predetermined limit, the sender may configure one or more transaction parameters for the remittance (i.e., remittance amount, remittance method).

The sender may next enter recipient information related to the remittance (e.g., name, address, bank account information, etc.). One or more embodiments may directly request recipient information from the recipient via a social networking system or a messaging system. For example, the system can send a social network notification in the form of a pop-up notification, a social network post, or an icon notification. One or more embodiments may also pause the remittance process while waiting for the recipient to submit the requested recipient information. Once the recipient submits the requested recipient information, the sender may enter sender information (e.g., name, address, debit card information, etc.) and submit the remittance transaction for processing.

One or more embodiments may determine a risk level associated with the submitted remittance transaction before the submitted remittance transaction is processed. A risk level associated with the submitted remittance transaction may be determined based on a variety of information informed by data stored by a social network system. Based on the risk level associated with the submitted remittance transaction, one or more embodiments may require further information from the sender. Alternately, if the risk level associated with the submitted remittance transaction, one or more embodiments may block the submitted remittance transaction.

As used herein, the term "payment transaction" refers to any type of electronic transaction exchanging money or credits between two or more entities. For example, a payment transaction can be a financial electronic transaction between two users of the integrated message and payment system. In another example, a payment transaction can be a financial electronic transaction between a user and a financial institution or other multi-person entity. Additionally, a payment transaction can represent a monetary gift, a payment of a debt, a funding of a loan, a payment in consideration for a purchase of goods and/or services, or any other type of monetary transfer. In addition, a payment transaction can be made in one or more currencies and converted, based on an exchange rate for example, to one or more additional currencies.

As used herein, the term "account" or "payment credential" can refer to a user's bank account, credit card account, messaging account, gift card, or any other account from which money can be deducted or to which money can be deposited. The meanings of the above terms, as well as additional terms, will become more apparent in light of the disclosure below with respect to the figures.

As used herein, the term "remit" refers to a transfer of funds across country boundaries. The bulk of the application is described in reference to performing remittances to aid in description. One will appreciate that the principles described herein are not limited to remittances and can be applied with respect to payment transfers that do not cross country boundaries.

FIG. 1 is a schematic diagram illustrating an environment in which a remittance system 100 can function in accordance with one or more embodiments. An overview of the system 100 is described in relation to FIG. 1. Thereafter, a more detailed description of the components and processes of the system 100 are provided in relation to the remaining figures.

As illustrated by FIG. 1, the system 100 can allow users 102a, 102b to interact using a corresponding number of client devices 104a, 104b. As further illustrated in FIG. 1, the client devices can communicate with server device(s) 108 via a network 105. In addition, the system 100 can include or interact with a remittance network 115 communicatively coupled with the server device(s) 108 via the network 105. Although FIG. 1 illustrates a particular arrangement of the users, the client devices, the network 105, the server device(s) 108, and the remittance network 115, various additional arrangements are possible. For example, the client devices 104a, 104b may directly communicate with the server devices 108, bypassing network 105. Furthermore, the system 100 can provide for more users and more client devices. For example, the system 100 can facilitate the exchange of payments/remittances between any number of users and any number of client devices.

Figure 16:
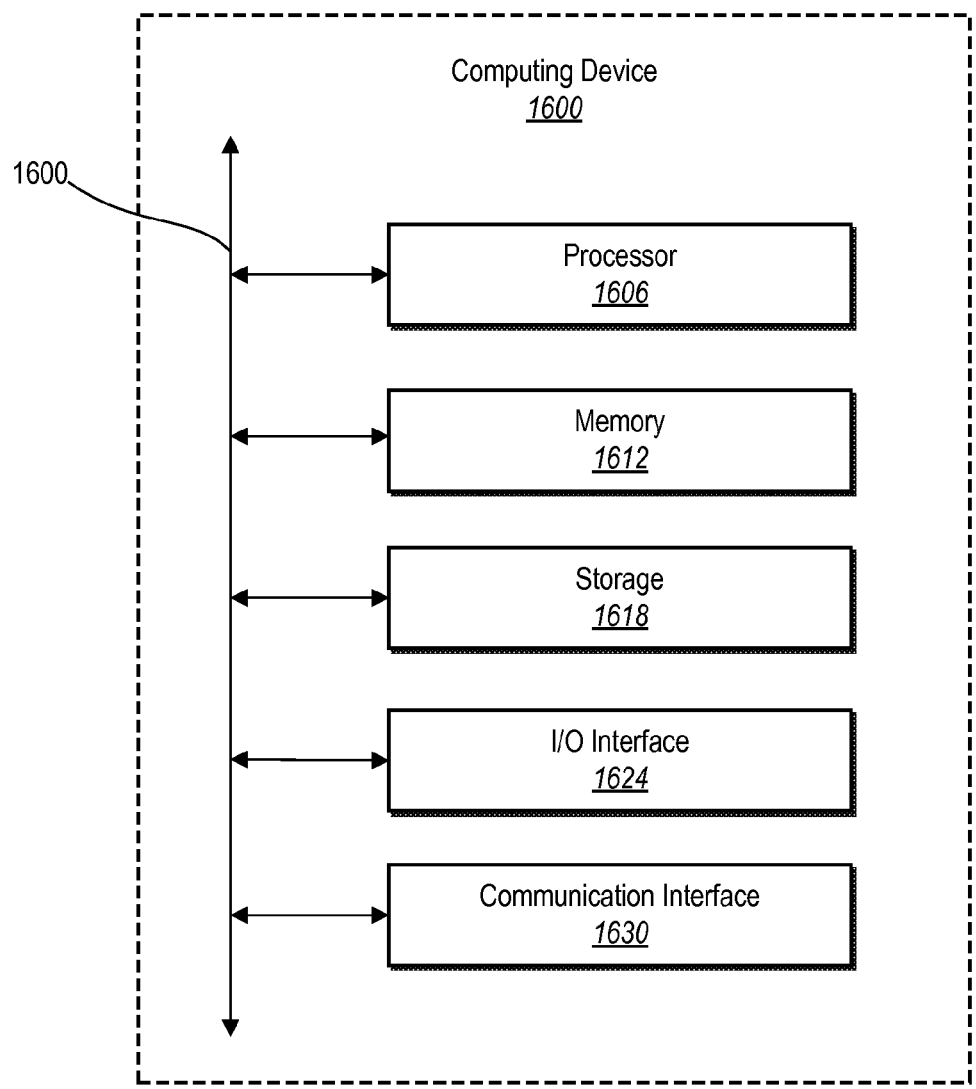
FIG. 16 illustrates a block diagram of an exemplary computing device in accordance with one or more embodiments.

As mentioned above, and as FIG. 1 illustrates, the users 102a and 102b can interact with the client devices 104a and 104b, respectively. Examples of client devices include computing devices such as mobile devices (e.g., smartphones, tablets), laptops, desktops, or any other type of computing device. FIG. 16 and the corresponding description provide additional information regarding computing devices. Moreover, and as mentioned above, the client devices can communicate with the through the network 105. In one or more embodiments, the network 105 includes the Internet or World Wide Web. The network, however, can include one or more private and/or public networks that use various communication technologies and protocols, as further described below with reference to FIG. 17.

The users 102a, 102b can request electronic remittances by using the client devices 104a, 104b to interact with the server device(s) 110. From the user's 102a perspective, for example, the user 102a can compose and send a remittance request that indicates an amount of payment the user 102a desires to send to user 102b. After composing the payment message, the sender user 102a can then send the remittance request to the server device(s) 110. The server device(s) can coordinate a transaction between one or more accounts of the sender user 102a and one or more accounts of the recipient user 102b via the remittance network 115. For example, in response to receiving remittance request from the user 102a, the server device(s) 110 can communicate transaction information to process a remittance using one or more components within the remittance network 115. Alternatively, or additionally, the system 100 can maintain one or more user accounts directly, and therefore, the system 100 can coordinate a transaction, or a portion of a transaction.

In one or more embodiments, the remittance network 115 can include a payment gateway system 118, a payment processing system 120, a fund transfer system 122, a card network system 124, an issuing bank system 126, and an agent 218. In other embodiments, however, the remittance network 115 includes more or fewer actors, though in most embodiments, the remittance network 115 includes at least a payment gateway system 118. As explained in greater detail below, each component of the system 100 can execute on and/or be implemented by one or more computing devices.

In one or more embodiments, for example, the system 100 can communicate with the remittance network 115 to authorize and process a transaction. For example, the system 100 can send a transaction to the payment gateway system 118, as shown in FIG. 1. Once the payment gateway system 118 receives the transaction, the payment gateway system 118 can send the transaction to the processor (e.g., payment processing system 120) used by a remittance recipient user's acquiring bank. Based on the method of the payment (e.g., sender user's account), the payment processing system 120 can transmit the transaction to an appropriate card network system 124. In many instances, the card network system 124 then sends the transaction to an issuing bank system 126.

The issuing bank system 124 either approves or declines the transaction, and sends the decision back to the card network system 122. The card network 122 then sends the decision to the payment processing system 120. The payment processing system 120 can then forward the decision to the payment gateway system 118, and in one or more embodiments, the payment gateway system 118 can maintain the details related to the transaction and the decision. The payment processing system 120 also sends the decision to the system 100.

In addition to authorizing a transaction, the remittance network 115 can also perform settlement tasks. For example, the system 100 can coordinate with the payment gateway system 118 to submit a daily settlement batch including one or more captured transactions to an acquiring bank via the acquiring bank's preferred payment processing system 120. The payment processing system 120 then sends the settlement batch to a server of the acquiring bank (not illustrated), which records a deposit in the amount of each transaction within the settlement batch to an account associated with a payment recipient user.

The acquiring bank can then send a funding request in satisfaction of the deposit amount to the payment processing system 120, which passes the funding request to the appropriate card network system 122. The card network system 122 then sends the funding request to the issuing bank system 124. The issuing bank system 124 can post the transaction to the sender user's account and pass a release of the funds to the card network system 122, which are then passed to the payment processing system 120, and then the acquiring bank. Additional details relating to the specific systems, methods, components and process of system 100 are described below.

One will appreciate that the above description can facilitate a remittance transaction that involves transferring funds from one bank account to another bank account, from a credit/debit card to a bank account, from a bank account or credit/debit card to an account maintained by the system 100. Depending upon the destination country, however, such transactions may not be readily available. For example, a developing country may not have banks to receive funds in a secure manner. In such embodiments, the server device(s) 100 can interact with a fund transfer system 122 (e.g., Western Union®, MoneyGram®, etc.) to facilitate a remittance. For example, the fund transfer system 122 can make the funds available for pick up at an agent 128 (e.g., physical location such as a store, ATM, or other location) in the destination country. Alternatively, the fund transfer system 122 can use existing relationships to make the funds available for pick up at a bank 126 in the destination country that may not readily accept or facilitate wire transfers or transfers from a card network system 124. In any event, the system 100 can facilitate the sending and receiving of a remittance.

In one or more embodiments the remittance system 100 can form part of or be integrated with a messaging system or social networking system. In such embodiments, the user 102a and user 102b can use client devices 104a and 104b, respectively, to communicate with one another via the server device(s) 108. For example, user 102a and user 102b can exchange electronic messages containing text, digital content (e.g., audio, images, video), location information, and other forms of data and information. For instance, the user 102a, using client device 104a, can compose a message intended for the user 102b. After composing the message, the user 102a can cause the client device 104a to send the message intended for the user 102b via the network 105 to the server device(s) 108. The server device(s) 108 can identify the user 102b as the intended recipient, and forward the message to the client device 104b associated with the user 102b.

In addition to the system 100 can use the messaging system or the social networking system to send interactive messages to both the user 102a and the user 102b. More particularly, the system 100 can send status messages regarding the remittance transaction to both the user 102a and the user 102b. Status messages to a remittance sender may indicate authorization processing with a remittance network, provide the option to cancel the transaction, indicate whether the recipient accepted or declined the remittance, or request further information from the recipient before the transaction can proceed. Status messages to the remittance recipient can include an option to accept or decline the remittance, indicate whether the sender canceled the remittance transaction, or request further information from the recipient (e.g., preferred remittance method, account information, etc.). Status messages to both the remittance sender and receiver may also indicate a risk level assigned to the remittance transaction.

While FIG. 1 illustrates the users as people, the users may include other entities, such as business, government, or other entities. For example, the user 102a can use the system 100 to provide a payment to a business for services or products. For instance, the user 102a can communicate with a business via the system 100, and ultimately decide to make a purchase of a product or service from the business. Using the same system 100, the user 102b can then send a payment for the product or service to the business. Similarly, a business may send a payment to other businesses or vendors, whether an individual or a business entity.

FIG. 2 illustrates a schematic diagram illustrating additional details of the system 100. As shown, the system 100 can include client devices 104a, 104b, server device(s) 108, and payment network 115. In general, the system 100 can allow a user of the client device 104a to send a payment to or receive a payment from a recipient of client device 104b. Additionally, the system can allow the user of the client device 104a to exchange messages with a user of the client device 104b.

As shown, the system 100 can include various components on the client devices 104a, 104b and the server device(s) 108. For example, FIG. 2 illustrates that the client devices 104a, 104b can each include a client application 202 with various components and the server device(s) 108 can include a network application 204 with various components. The components of the client applications 202 and the network application 204 can work together to allow the users to send remittances, receive remittances, and exchange messages as described in greater detail below.

As shown, the client application 202 can include a user interface manager 206, a user input detector 208, a message handler 210, a location detector 212, and a data manager 214. FIG. 2 illustrates that the network application 204 can include a communication manager 230, a status manager 232, a message database 234, a recipient identifier 236, a risk calculator 240, a remittance manager 242, a transaction database 244, a user profile database 246, and accounts 248. As described below, the network application 204 can also optionally include a social graph 250, which includes node information 252 and edge information 254. Each of the components 206-218, 230-240, and 236-254 can communicate with each other using any suitable communication technologies. It will be recognized that although components 206-218, 230-240, and 236-254 are shown to be separate in FIG. 2, any of components 206-218, 230-240, and 236-254 may be combined into fewer components, such as into a single facility or module, or divided into more components as may serve a particular embodiment. While FIG. 2 describes certain components as part of the client applications 202 and other components as part of the network application 204, the present invention is not so limited. In alternative embodiments, one or more of the components shown as part of the client application 202 can be part of the network application 204 or vice versa.

The components 206-218, 230-240, and 236-254 can comprise software, hardware, or both. For example, the components 206-218, 230-240, and 236-254 can comprise computer instructions stored on a non-transitory computer-readable storage medium and executable by at least one processor of the client devices 104a, 104b or the server device(s) 108. When executed by the at least one processor, the computer-executable instructions can cause the client device(s) 104a, 104b or the server device(s) 108 to perform the methods and processes described herein. Alternatively, the components 206-218, 230-240, and 236-254 can comprise hardware, such as a special purpose processing device to perform a certain function or group of functions. Additionally or alternatively, the components 206-218, 230-240, and 236-254 can comprise a combination of computer-executable instructions and hardware.

In one or more embodiments, the client application 202 can be a native application installed on the client device 104a, 104b. For example, client application 202 may be a mobile application that installs and runs on a mobile device, such as a smart phone or a tablet. Alternatively, the client application 202 can be a desktop application, widget, or other form of a native computer program. Alternatively, the client application 202 may be a remote application that the client device 104a, 104b accesses. For example, the client application 202 may be a web application that is executed within a web browser of the client device 104a, 104b.

As mentioned above, and as shown in FIG. 2, the client application 202 can include a user interface manager 206.

The user interface manager 206 can provide, manage, and/or control a graphical user interface (or simply "user interface") that allows a user to compose, view, and send messages as well as send remittances. For example, the user interface manager 206 can provide a user interface that facilitates the composition of a message, such as an instant message. Likewise, the user interface manager 206 can provide a user interface that displays messages received from other users.

More specifically, the user interface manager 206 may facilitate the display of a user interface (e.g., by way of a display device associated with the client device 104a, 104b). For example, the user interface may be composed of a plurality of graphical components, objects, and/or elements that allow a user to compose, send and receive messages or remittances. More particularly, the user interface manager 206 may direct the client device 104a, 104b to display a group of graphical components, objects and/or elements that enable a user to view a communication thread (e.g., FIG. 5B).

In addition, the user interface manager 206 may direct the client device 104a, 104b to display a one or more graphical objects or elements that facilitate user input for composing and sending a message. To illustrate, the user interface manager 206 may provide a user interface that allows a user to provide user input to the client application 202. For example the user interface manager 206 can provide one or more user interfaces that allow a user to input one or more types of content into a message. As used herein, "content" refers to any data or information to be included as part of a message. For example, the term "content" will be used herein to generally describe, text, images, digital media, files, location information, payment information and any other data that can be included as part of a message.

As discussed above, one example of content that can be included in a message is a payment from a sender user to a recipient user. In one or more embodiments, the user interface manager 206 can provide a user interface to allow a user to easily and efficiently define and send a payment to one or more other users. For example, the user interface manager 206 can provide one or more input fields and/or one or more user selectable elements with which a user can interact to create and send a payment.

In addition to the forgoing, the user interface manager 206 can receive instructions or communications from one or more components of the client application 202 to display updated message information, updated status of the payment, and/or updated available actions. The user interface manager 206 can update an available option based on whether a particular options is available at a particular point within the transaction process. The user interface manager 206 can add, remove, and/or update various other selectable actions within the sender and/or receiver status messages, as will be discussed below.

The user interface manager 206 can facilitate the input of text or other data to be included in an electronic communication or message. For example, the user interface manager 206 can provide a user interface that includes a keyboard. A user can interact with the keyboard using one or more touch gestures to select text to be included in an electronic communication. For example, a user can use the keyboard to enter a message to accompany and/or describe one or more other content items in an electronic communication. In addition to text, the user interface, including the keyboard interface, can facilitate the input of various other characters, symbols, icons, or other character information.

As further illustrated in FIG. 2, the client application 202 can include a user input detector 208. In one or more embodiments, the user input detector 208 can detect, receive, and/or facilitate user input in any suitable manner. In some examples, the user input detector 208 can detect one or more user interactions with respect to the user interface. As referred to herein, a "user interaction" means a single interaction, or combination of interactions, received from a user by way of one or more input devices.

For example, user input detector 208 can detect a user interaction from a keyboard, mouse, touch pad, touch screen, and/or any other input device. In the event the client device 104a, 104b includes a touch screen, the user input detector 208 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detector 208 may additionally, or alternatively, receive data representative of a user interaction. For example, user input detector 208 may receive one or more user configurable parameters from a user, one or more user commands from the user, and/or any other suitable user input. The user input detector 208 may receive input data from one or more components of the client application 202, from the storage on the client device 104a, 104b, or from one or more remote locations (e.g., the network application 204).

The client application 202 can perform one or more functions in response to the user input detector 208 detecting user input and/or receiving other data. Generally, a user can control, navigate within, and otherwise use the client application 202 by providing one or more user inputs that the user input detector 208 can detect. For example, in response to the user input detector 208 detecting user input, one or more components of the client application 202 allow a user to select a recipient for a message, compose a message, select content to include in a message, and/or send a message to the recipient. In addition, in response to the user input detector 208 detecting user input, one or more components of the client application 202 allow a user to navigate through one or more user interfaces to review received messages, contacts, etc.

In one or more embodiments, in response to the user input detector 208 detecting one or more user inputs, the client application 202 can allow the user to create a payment to send to one or more other users. For example, a user wanting to send a payment can interact with a payment element provided on a menu within a user interface. Upon detecting the user interaction with the payment element, the user input detector 208 can cause the user interface manager 206 to provide a user interface for creating a payment. Therefore, in response to the user input detector 208 detecting one or more user inputs, the client application 202 can allow a user to create a customized payment that defines a payment to be sent to another user, as will further be described below.

The user interface manager 206 may also provide a remittance indicator (e.g., a touch screen option or selectable element or icon) as part of a messaging interface. In one or more embodiments, the user input detector 208 can detect a user interaction with the remittance indicator. For example, the user input detector 208 may report the detected interaction with the remittance indicator to the user interface manager 206. In response to the reported interaction, the user interface manager 206 may then provide a one or more remittance interfaces in order to receive remittance information from the sender and recipient, as well as report remittance information to the sender and the recipient.

Additionally, the user interface manager 206 can provide one or more interfaces or interface updates to the recipient in order for the recipient to submit remittance information. For example, in one or more embodiments, user interface manager 206 can provide one or more interface or fields for collecting information from the recipient, such as an address, phone number, account number, pickup location, etc. In a particular embodiment, user interface manager 206 may provide one or more user interfaces or interface updates to the recipient for the purpose of collecting this required information.

Additionally or alternatively, the user interface manager 206 may provide one or more forms to the recipient for the purpose of collecting the remittance information. For example, in response to a social network notification, the user interface manager 206 may provide an interactive form containing one or more input controls. In one or more embodiments, the recipient may provide the required information via the one or more input controls and submit the required information to the social networking system.

As further illustrated in FIG. 2, the client application 202 can include a message handler 210 that manages messages provided to or sent from the client application 202. For example, the message handler 210 can interact with the user interface manager 206 and the user input detector 208 to coordinate the sending and receiving of messages using the client application 202. The message handler 210 may direct the sending and receiving of messages to and from the network application 204 over the course of an electronic messaging session among a plurality of participants. The message handler 210 may organize incoming and outgoing messages and direct the user interface manager 206 to display messages.

In one or more embodiments, the message handler 210 can facilitate receiving and sending data via the client application 202. In particular, message handler 210 can facilitate sending and receiving messages. For example, the message handler 210 can package content to be included in a message and format the message in any necessary form that is able to be sent through one or more communication channels and using an appropriate communication protocol, as described herein. Likewise, the message handler 210 can process messages the client device 204 receives from other users.

In addition to providing communication functions for the client application 202, the message handler 210 can provide access to message data. For example, the message handler 210 can access data that represents a list of contacts, or one or more groups of contacts, to include and recipients to a message. To illustrate, the message handler 210 can obtain and provide data representing a contact list to the user interface manager 206 to allow the user to search and browse a contact list, and ultimately select an individual contact or group of contacts to include as recipients of a message. In one or more embodiments, a social-networking system can maintain remote contact list data (e.g., a "friends list"), and the message handler 210 can access the contact list data on the social-networking system for use within the client application 202.

The message handler 210 may generate a list of contacts in a variety of methods. For example, in one or more embodiments, a contact list may include "friends" or "connections" associated with a user within a social-networking system. Alternatively, or additionally, a user can manually enter contact information to the contact list through the user interface. Moreover, a user can import contacts from various sources, including email, instant messages, text messages, telephone call logs, and other similar sources. The system 100 may maintain the contact list, or alternatively, the system 100 may access the contact list while it is maintained on a social-networking system.

The message handler 210 can also provide access to other local or remote data that the client application 202 can use to compose, send and receive messages. For instance, the message handler 210 can obtain access to files, images, audio, video and other content that a user can include in a message. Moreover, the message handler 210 can provide access to one or more functions of the sender client device 204 to provide the user the ability to capture or create content to include within a message. For example, the message handler 210 can activate a camera, a microphone, or other function that allows the user to capture content to include in a message.

The client application 202 can further include a location detector 212. The location detector 212 can access or identify a location of the client device 104a, 104b based on GPS information from the client device 104a, 104b, cell tower triangulation, WIFI received signal strength indication, WIFI wireless fingerprinting, radio-frequency identification, near-field communication, by analyzing messages, or based on data from other sources. The location detector 212 can then provide the location of the client device 104a, 104b to the network application 204. Additionally, the location detector 212 can receive indications of the location of other client devices from the network application 204.

As discussed above, the client device 104a can include a data manager 214, as illustrated in FIG. 2. The data manager 214 can maintain message data representative of data used in connection with composing, sending, and receiving messages between a user and one or more other users. For example, message data can include message logs, contact lists, content, past communications, and other similar types of data that the client application 202 can use in connection with providing the ability for users to communicate using the client application 202.

The data manager 214 may also maintain remittance data representative of information used to generate remittance transactions. For example, remittance data may include a remittance method data (i.e., a credential) such account data (e.g., bank or credit card account data). Furthermore, remittance data can include remittance preferences (e.g., a default remittance method). In general, remittance data can include any data for use in connection with generating a remittance transaction.

As briefly mentioned above, in addition to the client devices 104a, 104b, the system 100 can further include a network application 204 that is implemented in whole or in part on the server device(s) 108. In one or more embodiments of the invention, the network application 204 comprises a social-networking system (such as but not limited to FACEBOOK™), but in other embodiments the network application 204 may comprise another type of application, including but not limited to an e-mail application, search engine application, banking application, or any number of other application types that utilizes user accounts.

In one or more embodiments where the network application 204 comprises a social-networking system, the network application 204 may include a social graph 250 for representing and analyzing a plurality of users and concepts. Node storage 252 of the social graph 250 can store node information comprising nodes for users, nodes for concepts, nodes for transactions, and nodes for items. Edge storage 254 of the social graph 250 can store edge information comprising relationships between nodes and/or actions occurring within the social-networking system. Further detail regarding social-networking systems, social graphs, edges, and nodes is presented below with respect to FIGS. 17 and 18.

The communication manager 230 can process messages received from client applications 202. For example, the communication manager 230 can interact with a message handler 210 of a client application 202. The communication manager 230 can act as a director for messages sent back and forth among users in an electronic messaging conversation. The communication manager 230 may receive a message from client application 202, detect the intended recipient of the message, and send the message to the client application 202 (or device) associated with the intended recipient. One will appreciate that the communication manager 230 can direct a message for a recipient to multiple client devices associated with the recipient (i.e., each device upon which the user has installed a version of the client application 202).

Additionally, the communication manager 230 can also re-format or otherwise modify the content or format of a message based on the messaging protocol used by a destination communication device or a type. As such, in one or more embodiments the system 100 can allow participants using different communication platforms to exchange messages. For example, the communication manager 230 can receive a message in a first protocol (SMS, IM, XMPP, APNS, etc.), re-format the message into a second protocol, and send the reformatted message to the intended recipient(s).

The status manager 232 can track the status of users of the client applications 202 and/or the client devices 104a, 104b. For example the status manager 232 can identify when a user is logged into the client application 202, when a user is active on the client application 202, when a client device 104a, 104b associated with a user or user account is online or active. The status manager 232 can send indications (such as push notifications) to the client application 202 to notify the client application 202 of the status of users, device, messages, or payments. The user interface manager 206 can add, modify, or otherwise change or update status notifications based on indications received from the status manager 232. For example, the status manager 232 can send an indication to the client application 202 indicating that another user has accessed a message, received a payment, sent a payment, is active, a device or device type a co-user is active on (e.g., mobile vs. web), etc. The user interface manager 206 in turn an update a user interface to notify a user of the status.

The network application 204 may also include a message database 234. The message database 234 can maintain message data representative of content of messages from electronic messaging sessions among a plurality of participants. The message database 234 may maintain status data representative of the information mentioned above that the status manager 232 tracks. The message database 234 can thus provide an archive of messaging threads, which the network application 204 can provide to a user on demand or once a user logs into the client application 202 using a new computing device.

The network application 204 can further include a recipient identifier 236. The recipient identifier 236 can identify eligible and/or likely recipients for a remittance. For example, based on a selected destination country, the recipient identifier 236 can identify eligible co-users associated with a sender (i.e., friends) that are currently in the selected destination country (i.e., as indicated by a location detector 212 associated with co-user) or information in a profile for the user.

Still further, the recipient identifier 236 can provide a list of the co-users with the highest likelihood of being selected as a recipient for the remittance. The recipient identifier 236 can access or generate a likelihood of being selected for each of the co-users associated with the sender. The recipient identifier 236 can then provide a list of a number of the co-users with the highest likelihood of being selected. The likelihood of being selected as a recipient of a remittance can be based on a number of factors including country of residency, a strength of a relationship between the sender and the potential recipient (also known as an affinity or co-efficient score and described below in detail below), recent messages between the sender and the potential recipients, past payment transactions, etc.

Additionally, in one or more embodiments, the recipient identifier 236 can work with the risk calculator 240 to ensure that selected potential recipients are not likely fraudsters. For example, the risk calculator 240 may analyze social network data in order to determine a "realness" score for the sender. For example, in one or more embodiments, the recipient identifier 236 may not suggest co-users if it is unlikely that the co-user is a real person or if they have a risk score below a predetermined threshold. This may prevent scams including software posing as a real person. In one or more embodiments, the risk calculator 240 may determine a realness score for the sender based on whether the potential recipient has been tagged in media posted to the social networking system by one or more co-users, whether co-users of the potential recipient recognized the potential recipient's previous one or more birthdays (i.e., wished the potential recipient a "happy birthday"), the number or volume of messages exchanged between the potential recipient and co-users of the potential recipient via the social networking system, whether co-users of the potential recipient have indicated agreement or solidarity (i.e., "liked") with posts made by the potential recipient, and/or whether co-users of the potential recipient have commented on posts made by the potential recipient.

In addition to aiding the recipient identifier 236 in providing a list of potential recipients, the risk calculator 240 can perform one or more risk checks during a remittance process to help prevent fraud. For example, when a sender desires to initiate a remittance, the risk calculator 240 can preform an initial risk check to verify that the sender does not have an unacceptable risk level. If a sender's risk level is above a predetermined threshold, the remittance manager 242 can prevent the remittance transaction. If a sender's risk level is below the predetermined threshold, the remittance manager 242 can allow the remittance transaction to proceed. If the sender's risk level is near or at the predetermined threshold, the remittance manager 242 can request additional information, attached one or more stipulations or limitations to the remittance transaction, or otherwise modify the remittance transaction.

Thus, the risk calculator 240 can determine if the sender meets predetermined criteria for conducting a remittance transaction. In one or more embodiments, the predetermined criteria can include having been a member of the social networking system for a predetermined amount of time, live in a pre-approved origination country, have a predetermined level of social network activity with a destination country, have threshold realness score, etc.

The risk calculator 240 can also determine if the recipient meets predetermined criteria for receiving a remittance transaction. In one or more embodiments, the predetermined criteria can include having been a member of the social networking system for a predetermined amount of time, live in a pre-approved destination country, have a predetermined level of social network activity with the origination country, have threshold realness score, etc.

The risk calculator 240 can further perform a risk check based on a relationship between the sender and a selected recipient. For example, if the sender and the recipient are not friends on the social networking system, are not within a number of degrees of separation, etc. the risk calculator 240 can assign a high risk level to the transaction.

The remittance manager 242 of FIG. 2 can facilitate sending and receiving remittances between the client devices 104*a*, 104*b* and the remittance network 115. As generally explained above, the remittance manager 242 can coordinate a transaction via the remittance network 115 that corresponds to a requested remittance, monitor the status of the transaction, and provide status information regarding the transaction. More specifically, the remittance network 115 can authorize a transaction, fund a transaction, and/or settle an individual transaction or batch of transactions as described above with reference to FIG. 1. In one or more embodiments, the remittance manager 242 can use one or more application programming interfaces (API) to communicate relevant information with the remittance network 115.

To complete a transaction, the remittance manager 242 can access or obtain a payment credential for the sender and the recipient (such as deposit account information, debit card, credit card, gift card, electronic wallet). The remittance manager 242 can obtain a payment credential using a variety of methods. In one example embodiment, a user can register one or more deposit accounts or other payment credentials with the network application 204. Upon a user registering a deposit account or other payment credential, the user profile database 246 can maintain the payment credential.

In the event that a user profile does not include a payment credential, the remittance manager 242 can direct the communication manager 230 to send the recipient or the sender a message prompting the them to provide a payment credential as explained in greater detail below. The message may prompt the user to register a payment credential by providing one or more interactive fields that allows the user to provide payment credential details.

Additionally, or alternatively, if a user prefers not have a registered payment credential, the remittance manager 242 can generate a network account 248. In particular, the remittance manager 242 can generate an account number and associate the account number with the user profile. In one or more embodiments, the user may already have a network account 248, and therefore, the remittance manager 242 can use the previously created network account to complete the transaction. In particular, the network account 248 allows the remittance manager 242 to proceed immediately to process a transaction without delaying the payment process from the perspective of either the sender or the recipient.

The remittance manager 242 can debit (if sender) or deposit (if recipient) the payment amount to the network account 248. In one or more embodiments, the remittance manager 242 can cause the communication manager 230 to send the recipient a message providing a hyperlink and/or instructions to transfer the money from the network account to a registered deposit account or send the funds to an agent location for pick-up.

In addition to coordinating a transaction via the remittance network 115, the remittance manager 242 can also coordinate a transaction with respect to one or more system user accounts. In one or more embodiments, the network application 204 can support user cash accounts, such as gift card accounts, cash card accounts, electronic wallets, or similar types of user accounts. The sender can specify the sender's account as the method of payment, and likewise, the recipient can set the recipient's account as the method of distribution of the funds. Therefore, in at least some embodiments, the entire transaction, or substantially the entire transaction, can be processed within the network application 204.

In one or more embodiments, the remittance manager 242 can organize and process batches of credit card funding requests and batches of credit card refunding requests. In particular, due to a variety of fee structures associated with credit card transactions, the remittance manager 242 can process batches of credit card funding and refunding requests to minimize potential fees.

The remittance manager 242 of FIG. 2 may perform various functions with relation to coordinating the information received from the communication manger 230 to request and accept payment requests, and to coordinate the payment process. For example, the remittance manager 242 can create and store payment credentials. More specifically, a user (e.g., senders and recipients) may already have accounts with the network application, and thus already be registered users, or may still need to set up an account. In one embodiment, at least some of the users can also be members of a social-networking system and already have identifiers ("IDs") and user profiles associated with social-networking accounts that are also used when messaging using the system 100. Alternatively, other users may not be members of the social-networking system and need to create an account to become a registered member of the system 100. In this example, the remittance manager 242 can receive date from these users (via the client application 202) and create an account, and then create a unique ID and user payment profile for these users, which will be referenced later during the payment process. In some cases, the remittance manager 242 may also augment user profiles of previous social-networking users to include payment profile features that may have been absent.

In setting up or augmenting the account, a user can submit one or more payment credentials, such as a credit card, a debit card, a deposit account or other bank accounts, gift card accounts, store credit accounts, etc. When adding methods of payment, the user can be required to submit card and/or account numbers, expiration dates, security codes, transfer or routing identification numbers, and bank information required for money transfers. The user can also create an authorization code such as a personal identification number (PIN), or use a security code of a credit card, e.g., when providing only a single payment method, or provide some other authorization code. The user can also select a default method of payment.

The user payment profiles stored by the user profile database 246, accordingly, can include user IDs created uniquely for each registered user (whether as a social-networking user and/or as a messaging user). The user profile database 246 can provide storage for payment credentials of users of the network application 204. For example, the user can create an "account" with the network application 204, which allows a user to provide the payment information to the network application 204. The network application 204 can then save that payment information in the user profile database 246. In one or more embodiments user profile database 246 can store in relation to the user one or more of: a first name, a middle name, a last name, a payment card number (e.g., a credit card, debit card), an expiration date (year and/or month) of the payment card, a card security code of the payment card (e.g., a Card Verification Value (CVV or CVV2)), a billing address (including street name, house number, city, state or province, zip code, country, etc.) associated with the credit card, a phone number associated with the credit card, one or more shipping addresses (including similar fields as the billing address). When the payment card comprises a debit card, the profile storage module can also store a personal identification number (PIN) for the debit card. In an embodiment where the network application 204 comprises a social-networking system, the payment information stored in the user profile database 246 may be associated with a node of the node information 252 that represents the user.

In any event, upon receipt of a remittance request from a sender, the remittance manager 242 can then generate a transaction package that includes a transaction ID associated with a remittance amount, the sender, and the recipient. The transaction package can also include a remittance method, and related information, unless the sender selected to send a remittance to the recipient with an alternative remittance method, in which case the transaction package can include payment information for the alternative payment method. The remittance manager 242 may then send the transaction package to the remittance network 115 to initiate the payment authorization process.

The transaction database 244 of FIG. 2 can provide storage for each transaction (such as in the form of a graph object), attempted or completed, the transaction ID, a date, an amount of the transaction, the payment method used, associated messages interchanged between sender and recipient related to the transaction, and any other information gathered on the transaction. With this information, the remittance manager 242 can provide, upon request, a summary of one or more transactions to users as a history of payments requested, payments declined and payments completed.

The remittance manager 242 can perform various other additional steps and methods in order to effectively manage the payment process. In one or more embodiments, for example, upon receiving a remittance request the remittance manager 242 can generate a transaction identifier (or simply "transaction ID") and associate the transaction identifier with the remittance request and/or the payment information within the remittance request. For instance, upon generating a transaction ID, the remittance manager 242 can send the transaction ID and the payment information to a transaction database 244. The transaction database 244 can include a data table or similar data matrix that stores transaction information according to transaction ID.

In one or more embodiments, after a transaction ID is associated with a particular remittance request, the transaction ID can be included or embedded within substantially all communications within system 100 relating to the particular payment. As such, the transaction ID allows the remittance manager 242 to manage and process a large number of payments in an organized fashion. For example, the remittance manager 242 can include instructions to include the transaction ID in any information sent to the client devices 104a, 104b. In return, the messaging handlers 210 can also include the transaction ID in any information sent from the client devices 104a, 104b to allow the remittance manager 242 to efficiently and reliably identify a particular transaction to which the information corresponds.

As previously mentioned, the network application 204 can include a transaction database 244 that maintains transaction information for each remittance request received via a client device 104a. For example, transaction information can include a transaction ID associated with one or more sender identifiers, recipient identifiers, payment amounts, payment methods (e.g., sender accounts), deposit methods (e.g., recipient accounts), transaction history, current transaction status, as well as other transaction information. In one or more embodiments, the transaction information is maintained in the form of one or more graph objects that are updated with any updates or actions with respect to a transaction.

In addition to the foregoing, the network application can include a rate manager 249. The rate manager 249 can poll the remittance network 115 for current exchange rates. The remittance manager 242 can use the exchange rates to calculate a payment amount for a remittance. Additionally or alternatively, the rate manager 249 can poll the fund transfer system 122 for the rates that the fund transfer system 122 will charge for facilitating the remittance. The rate manager 249 can poll for rates at predetermined intervals or in response to specific remittance requests.

As discussed, the systems and components discussed above with reference to FIGS. 1-2 can allow users of a message system to easily, effectively, and securely send and receive remittance via system 100. FIGS. 3A-3E illustrate example process diagrams of one or more example embodiments of processes implemented by system 100 discussed above. Consistent with system 100 illustrated in FIGS. 1 and 2, FIGS. 3A-3E illustrate a sender client device 104a with a client application 202, a recipient client device 104b with a client application 202, server device(s) 108 that supports a network application 204, and a remittance network 115.

In one or more embodiments, the remittance process begins a sender client device 104a providing a login UI 302. The sender can log into/authenticate with the remittance manager 242 by submitting login information 304 via a user login UI 302 presented on a sender client device 104a. Upon receiving the login information 304, the network application 204 can authenticate the user. For example, the network application 204 can verify that the received login information 304 (i.e., username and password) matches a username and password stored by the user profile database 246.

Alternatively to authenticating with a username and password, the client application 202 can obtain, identify, or otherwise discover a user identifier for the sender for the network application 204. For example, the client application 202 can access an obfuscated (e.g., hashed, encrypted, or otherwise algorithmically transformed) user identifier of the user existing on the computing device 104a of the sender. This user identifier can identify a user profile/account for that user of the network application 204 (e.g., a social networking application). In one or more embodiments, the user identifier is accessed from a portion of shared memory accessed by or reserved by the network application 204, and may only exist if the user is currently "logged on" to the network application 204. In one or more other embodiments, the user identifier is accessed from a cookie (e.g., HyperText Transfer Protocol (HTTP) cookie) or from application cache (e.g., a HyperText Markup Language version 5 (HTML5) application cache) on the user's computing device 104a.

The client application 202 can send the obfuscated user identifier with a request to initiate a remittance (e.g., selection of a remit funds control 516). The network application 204 can then verify that the obfuscated user identifier is valid. This process may serve as the authentication for the sender, as the existence of a proper obfuscated user identifier for the network application 204 on the user's computing device 104a indicates that the sender has already been authenticated by the network application 204.

In the event that the network application 204 does not validate the sender or the payment credential, the network application 204 can send a communication to the sender client device 104a to cause the client application 202 to present an error message to the sender that indicates the remittance could not be authorized. In one or more embodiments, the error message can include a prompt for the sender to provide additional authorization information, agree to terms and conditions, or otherwise verify their identify. After which the sender client device 104a can send a revised remittance request to the network application 204. The network application 204 can then attempt to validate the sender. If the network application 204 cannot validate the sender, then the network application 204 may terminate the remittance transaction.

Upon validating the sender, the risk calculator 240 may perform a sender risk check 306. For example, as part of the sender risk check, the risk calculator 240 can determine whether the sender has been a member of the social networking system for a predetermined amount of time, whether the sender lives in a country from which remittances may be sent (e.g., the United States), determine whether the sender has an adequate level of communication activity via the social networking system in countries where remittances may be sent, determine if the sender has performed previously successful remittances, determine whether the sender has engaged in fraudulent activity, and/or determine a realness score for the sender.

In one or more embodiments, the risk calculator 240 verifies that the sender meets basic requirements for performing a remittance. For example, the risk calculator 240 can require that the sender lives or is currently in a country that qualifies as an originating country for a remittance. The risk calculator 240 can verify the user lives in a qualifying country based on information for the user in the user profile database 246 or the social graph 250. Alternatively, the status manager 232 can determine a current location of the sender client device 104a based on data provided by the location detector 212. The risk calculator 240 can then verify that the current location of the sender client device 104a is a valid location for initiating a remittance.

If the sender lives or is located in a country that qualifies for initiating a remittance, the risk calculator 240 can calculate a risk score for the sender. The risk calculator 240 can base the risk score on one or more of the above-mentioned or other factors. One will appreciate that the risk calculator 240 can have access to data about the sender maintained by the social networking system/social graph 250 that provides information to which a typical remittance provider does not have access. Thus, the risk calculator 240 can make an informed decision about whether to allow the sender to initiate a remittance to reduce fraud.

As mentioned above, the risk calculator 240 can use the length of time the sender has been a member of the network application 204 or the social networking system in calculating a risk score for the sender. The risk calculator 240 can determine the length of time the sender has been a member based on information about the sender in the user profile database 240 and/or the social graph 250. If the sender has just recently become a member, this can indicate that the sender may not be trustworthy, may be a bot, or otherwise may be a risk. Alternatively, the sender having been a member for a long period of time can indicate that the sender has not just created an account to perform remittance or conduct a fraudulent transaction or is otherwise trustworthy.

Additionally, the risk calculator 240 can use a level of activity with countries where remittances may be sent. For example, the risk calculator 240 can determine if the sender has lived in one or more countries that qualify for receiving a remittance, has check-in or otherwise visited an eligible destination country, has posted pictures taken in an eligible destination country, has "friends" or relatives that live in an eligible destination country, mention an eligible destination country in posts or messages, share content about a eligible destination country, "like" pages or content related to an eligible destination country, etc. A high level of activity with one or more eligible destination countries can indicate that the sender is not being deceived into sending money to a fraudulent recipient, is not otherwise being deceived, is not engaging in fraudulent activities, or has not had their account compromised, etc. The risk calculator 240 can determine the sender's level of activity with eligible destination countries by parsing and searching data in the social graph 250, the message database 234, and/or the user profile database 246.

The risk calculator 240 can also use whether determine if the sender has performed previously successful remittances. In particular, the risk calculator 240 can access a transaction history for the sender in the transaction database 244. Previous successful transactions can indicate that the sender is trustworthy, has valid payment credentials, or otherwise is a low risk. On the other hand, multiple failed transactions or previous fraudulent activity can indicate that the sender is untrustworthy or has a high-risk level.

In addition, the risk calculator 240 may also determine the sender's "realness" score as part of the sender risk check 306. In one or more embodiments, the risk calculator 240 may determine a realness score for the sender based on whether the sender has been tagged in media posts to the social networking system by one or more co-users, whether friends of the sender recognized the sender's previous one or more birthdays (i.e., wished the sender a "happy birthday"), the number or volume of messages exchanged between the sender and co-users of the sender, whether friends of the sender have indicated agreement or solidarity (i.e., "liked") posts made by the sender, whether friends of the sender have commented on posts made by the sender, the number of friends of the sender, whether the sender has posted pictures to the social networking system, whether the sender has completed a user profile (provided work info, interests, education information, etc.), whether other users have indicated that the sender is a family member, or other activities of the user on the social networking system. One will appreciate in light of the disclosure herein that the realness score can be a combination of the above-identified factors. Thus, a user can have a high realness score without having necessarily performed all of or even most of the above-identified activities.

Thus, the sender risk check 306 can allow the network application 204 to reduce, fraud, abuse, and other criminal activity by only allow low risk senders to initiate remittance/payment transactions. Furthermore, by including a number of different factors, the risk calculator 240 can allow senders lacking in one factor or area to nonetheless have a high enough risk score to initiate a transaction. For example, a sender may not have a high level of activity with an eligible destination country, which would indicate a high-risk score. The risk calculator 240 can determine, however, that the sender has a spouse or other close family member with a high level of activity with respect to the eligible destination country. Thus, the risk calculator 240 can balance the factors in determining a risk score for the sender.

Additionally, the risk calculator 240 can apply different weights to different factors when calculating the sender risk score 306. For example, the risk calculator 240 can give more weight to the realness score than a length of membership. Thus, if a sender has a high-risk realness score, but has only been a member for a small amount of time, the risk calculator 240 can give the sender a low-risk score.

In embodiments in which the risk calculator 240 determines that the sender has a risk score that is above a predetermined threshold, the remittance manager 242 send a remittance denial 308 to the sender client device 104a. In response to the remittance denial 308, the client application 202 can provide a remittance denial user interface such as that described below in relation to FIG. 5D.

Figure 3A:
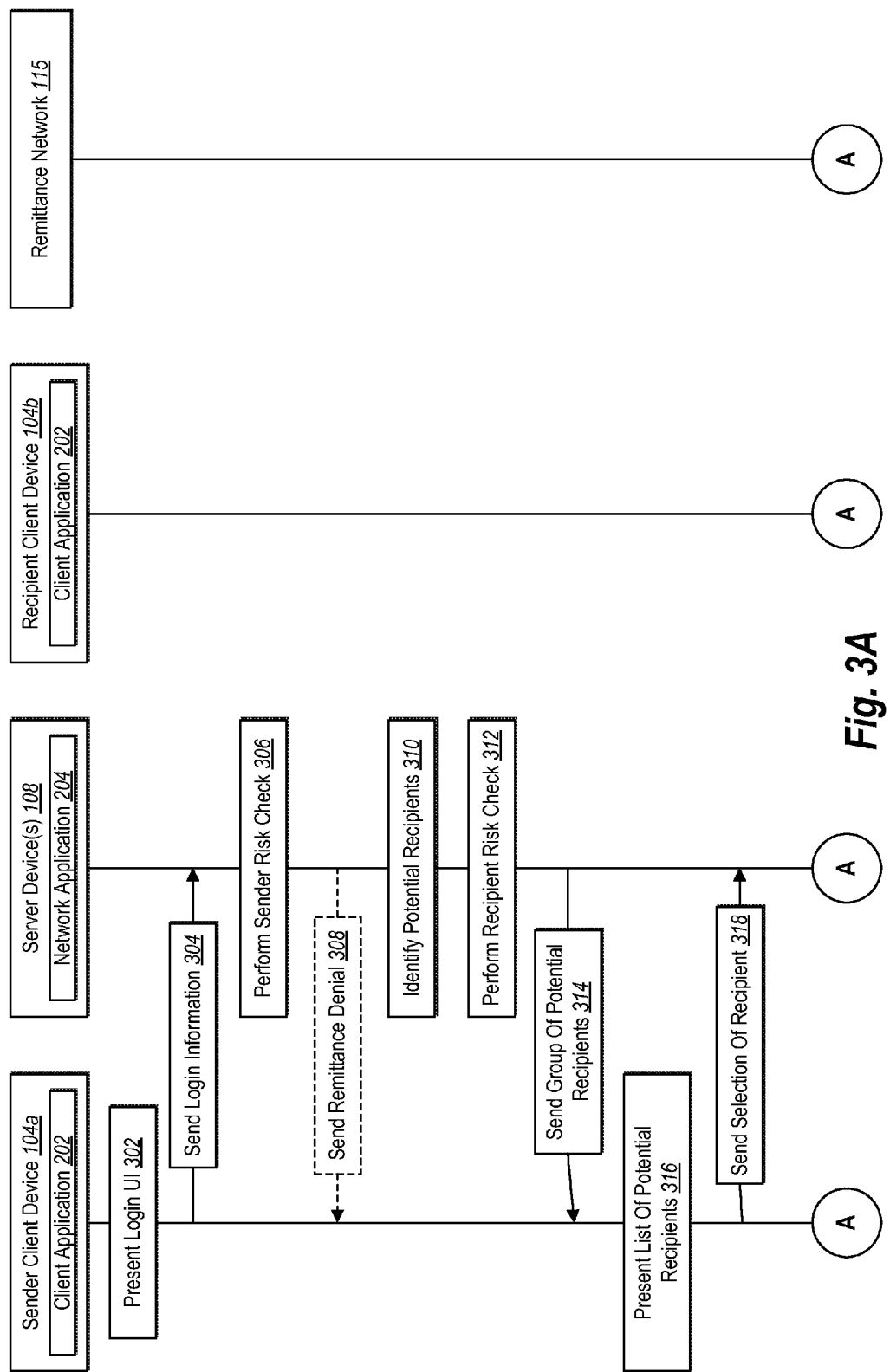
FIGS. 3A-3E illustrate a sequence-flow diagram illustrating interactions as part of a remittance process between a sender and a recipient in accordance with one or more embodiments.
Figure 3B:
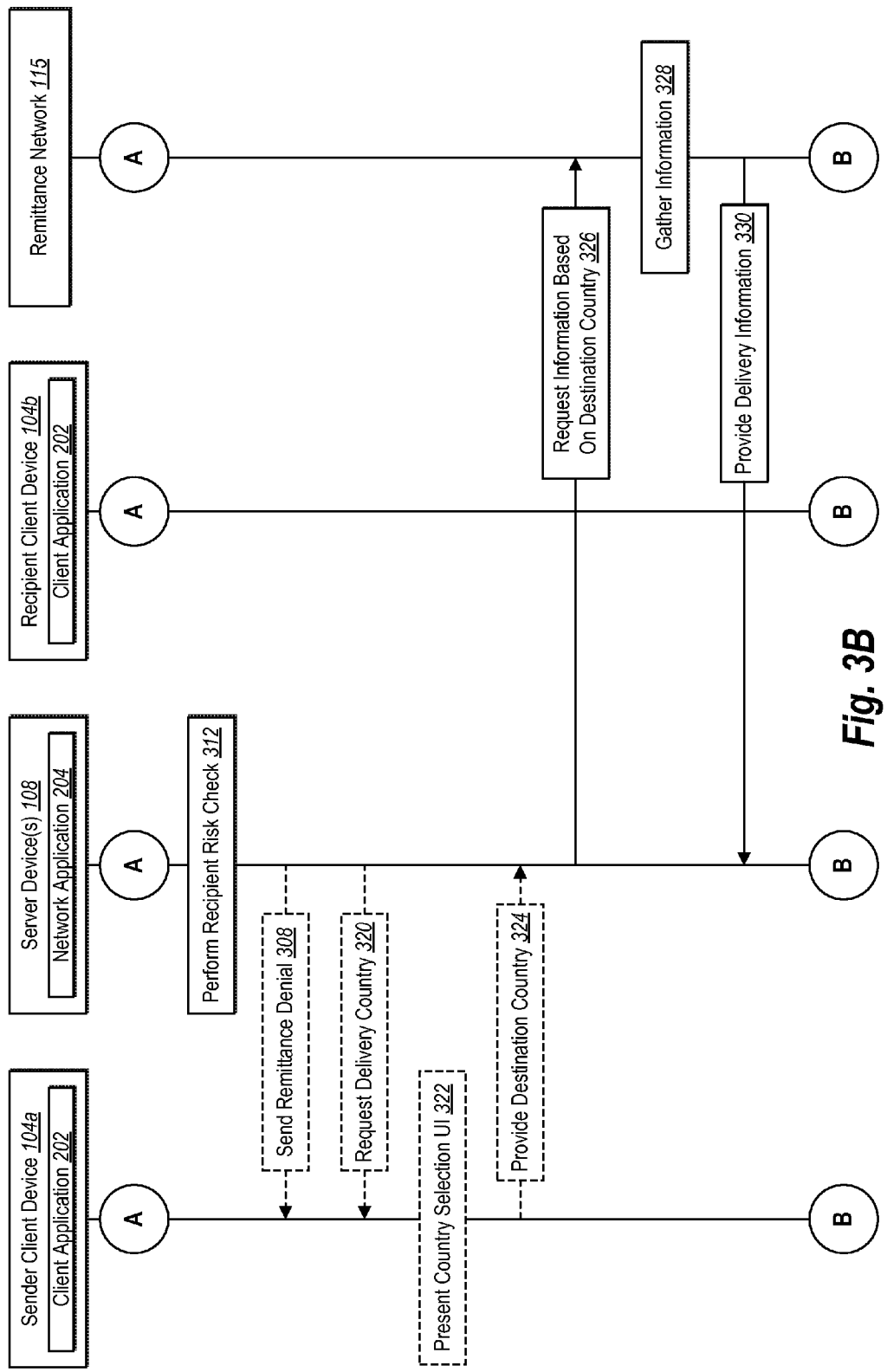
Figure 3C:
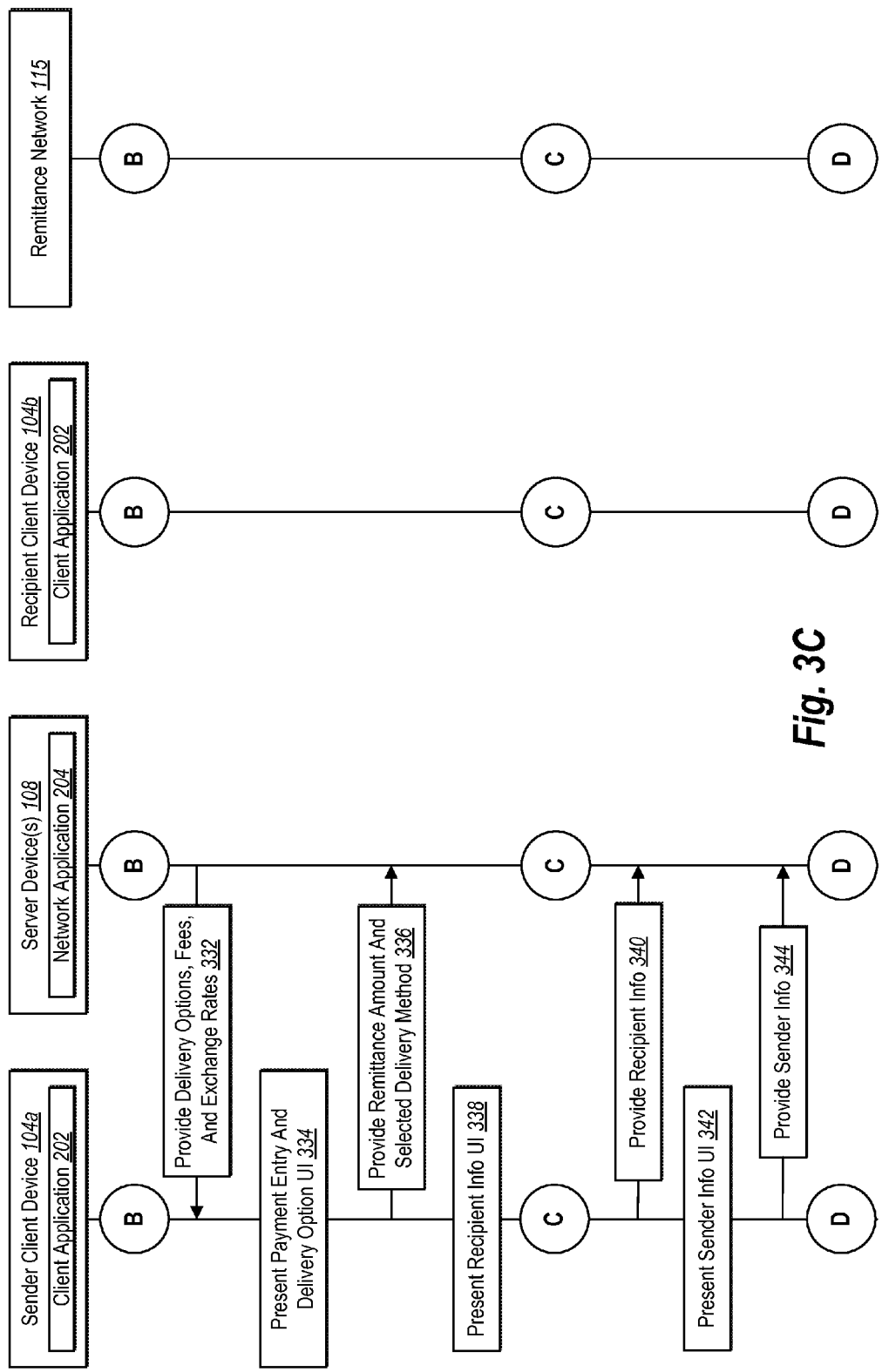
Figure 3D:
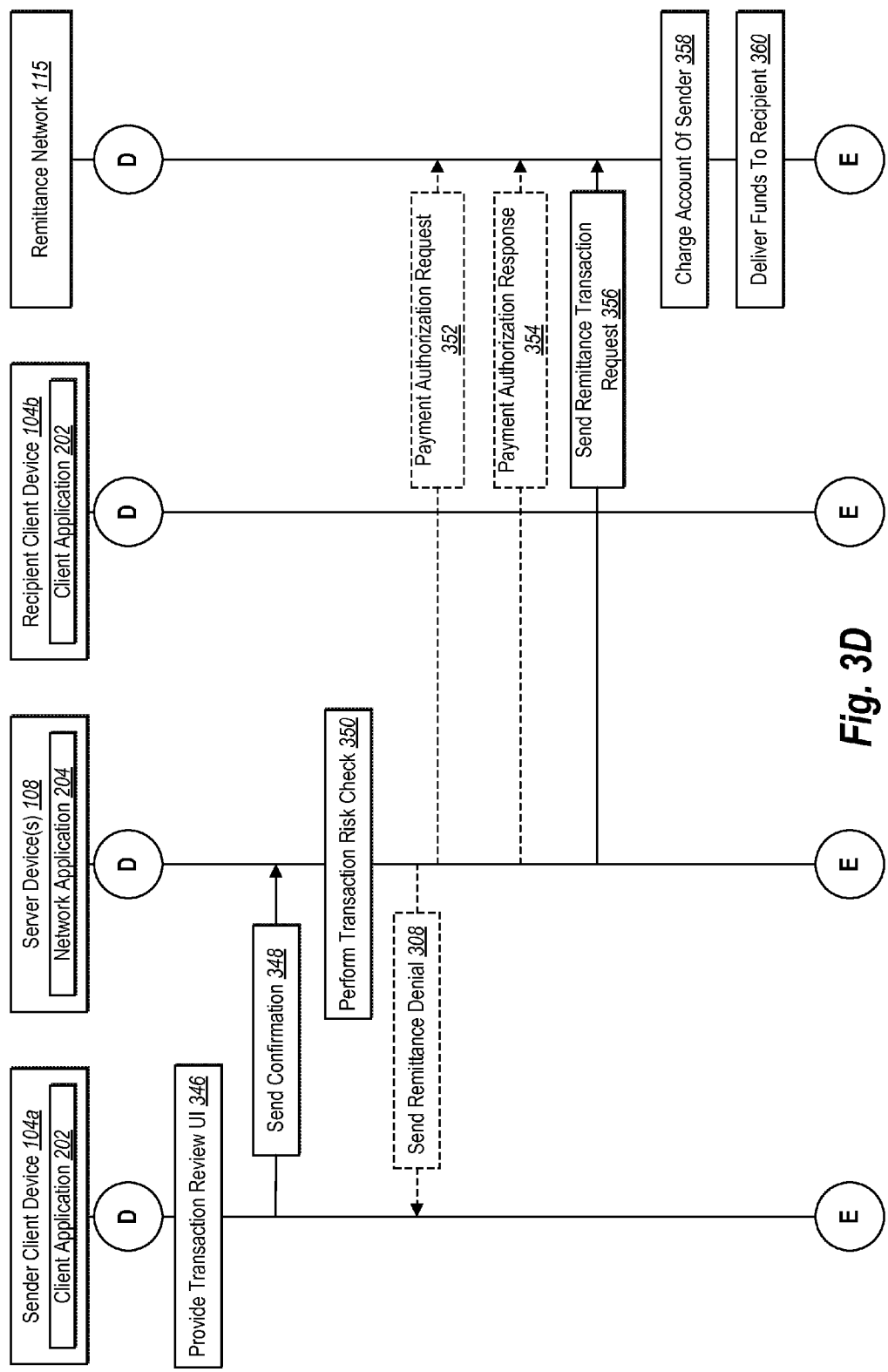

Alternately, in embodiments in which the risk calculator 240 determines that the sender has a risk score below the predetermined threshold, the remittance manager 242 can allow the remittance to proceed. In particular, as shown by FIG. 3A, the recipient identifier 236 can identify potential recipients 310. For example, the recipient identifier 236 can search through a list of co-users associated with the sender via the social networking system to identify likely recipients. In one or more embodiments, the sender may select recipients from a list of social networking system co-users (e.g., social network "friends") or from a contact list stored on the sender client device 104a.

In order to identify the potential recipients, the recipient identifier 236 can identify co-users associated with the user who reside in or are located in a destination country eligible to receive remittances. The recipient identifier 236 can verify potential recipients live in a qualifying country based on information for the users in the user profile database 246 or the social graph 250. Alternatively, the recipient identifier 236 can determine a current location of a recipient client device 104b based on data provided by the location detector 212. The recipient identifier 236 can then verify that the current location of the recipient client device 104b is a valid location for receiving a remittance.

After identifying friends or other users associated with the sender that reside or are located in an eligible destination country, the recipient identifier 236 can determine an relationship coefficient between the sender and each of the potential recipients identified as residing or being located in an eligible destination country. The recipient identifier 236 can access a previously calculated relationship coefficient maintained by the social networking system. Alternatively, the recipient identifier 236 can calculate a relationship coefficient between the sender and each identified potential recipient.

As described in greater detail below, a relationship coefficient may represent or quantify the strength of a relationship between particular objects (in this case users) associated with the social networking system. Relationship coefficients (also referred to as "affinity coefficients") are described in detail below with reference to FIGS. 17 and 18. In summary, a relationship coefficient can take into account various information from the social graph 250 to quantify the strength of a relationship between the sender a given potential recipient. For example, a relationship coefficient can take into account information including, but not limited to, the number, frequency, and/or length of electronic communications between the sender and a particular potential recipient, social network posts by the sender tagging the particular potential recipient (or vice versa), media uploads (e.g., photographs, videos, etc.) by the sender tagging the particular potential recipient, social network location check-ins by the sender or the particular potential recipient where both parties are either in the same location or in the same geographical area, a real-world relationship between the sender and the particular potential recipient (i.e., mother, son, father, cousin, close friend, acquaintance), the sender and the particular potential recipient being in the same group, the sender and the particular potential recipient being tagged in the same photograph, the sender and the particular potential recipient being checked-in at the same location, the sender and the particular potential recipient attending the same event, the sender and the particular potential recipient liking posts by each other, or other suitable actions. Although this disclosure describes measuring relationship coefficient in a particular manner, this disclosure contemplates measuring affinity coefficient in any suitable manner.

The recipient identifier 236 can identify a group of potential recipients that reside or are located in an eligible destination country that have a highest relationship coefficient with respect to the sender. Optionally, in one or more embodiments, the risk calculator 240 may also determine a recipient risk check 312. The recipient risk check 312 can be similar and take into consideration the same factors discussed above in relation to the sender risk check 306 in order to calculate a risk score for each potential recipient. The recipient identifier 236 can then identify potential recipients that have a risk score that exceeds a predetermined threshold. The recipient identifier 236 can the remove such potential recipients from the group of potential recipients. Once the high-risk recipients are removed from the group, the network application 204 can send the group of potential recipients 314 to the client application 202 of the sender client device 104a. The group of potential recipients 314 sent to the sender client device 104a can comprise a predetermined number of recipients (i.e., the ten recipients with the highest affinity coefficient with respect to the sender that have an acceptable risk score and that live or are located in an approved destination country).

The recipient identifier 236 can also rank the recipients in the group. In particular, the recipient identifier 236 can rank them in accordance with the likelihood that the sender will select the recipient. For example, the recipient identifier 236 can rank the recipients in accordance with the affinity coefficients. Additionally, the recipient identifier 236 can review past transactions can rank recipient(s) to whom the sender has previously send remittances higher. For example, the recipient identifier 236 can identify that the sender sends a particular recipient a remittance at the first of every month. In view of this, the recipient identifier 236 can rank this particular recipient at the top of the list or above other recipients with similar affinity co-efficient scores.

Additionally, the network application 204, based on data in the social graph 250, can identify or infer that a potential recipient has had, or is about to have, a life event or a payment event for which the sender may reasonably desire to send a payment. For example, the network application 204 can identify that a potential recipient has or will have a birthday, wedding, anniversary, graduate from a school, lives in a country with an upcoming holiday, or other event. Based on the detection of a payment event, the recipient identifier 236 can rank the particular recipient at the top of the list or above other recipients with similar or even higher affinity co-efficient scores.

The user interface manager 206 can then present the group of potential recipients 314 as a list of potential recipients 316 in a recipient selection user interface. The user can then select a desired recipient from the recipient selection user interface. If the recipient that the sender desires to send a remittance to is not in the list of potential recipients, the client application 202 can allow the user to query the network application 204 for a particular user as described below relation to FIGS. 6A-6B. In particular, the sender can enter a query. The client application 202 can send the query to the network application 204. The recipient identifier 236 can then search the user profile database 246 or the social graph 250 for users that satisfy the query. The network application 204 can then return the potential recipients that satisfy the query to the sender client device 104a. The sender can then select the desired recipient.

The user input detector 208 can detect a selection of a recipient. In response to which, the client application can send the selection of the recipient 318 to the network application 204. If the user selects a recipient that was not in the group of potential recipients 314 previously determined to have an acceptable risk score, the risk calculator 240 can perform a recipient risk check 312 on the selected recipient 318 as described above. If the selected recipient 318 has a risk score above the predetermined threshold, the network application can send a remittance denial 308 as described above.

If the selected recipient 318 has an acceptable risk score, the remittance manager 242 may determine whether the selected recipient lives in or is located in an eligible destination country. As a result, if a recipient lives in a country where the remittance process may not provide remittances, the remittance manager 242 can send a remittance denial 308. Alternatively, if the selected recipient 318 does not live in an eligible country, the remittance manager 242 may notify the client application via a delivery country request 320. In response to the delivery country request 320, the user interface manager 206 can provide a country selection UI from which the sender can select an eligible country to which the remittance for the sender will be delivered. The client application 202 can then send the selected destination country 324 to the remittance manager 242.

In any event, upon determining the destination country, the remittance manager 242 can requested remittance information 326 based on the destination country from the remittance network 115. For example, the remittance manager 242 can request a currency exchange rate, available delivery methods, and/or applicable fees. The remittance network 115 can gather the request information 328 and provide the delivery information 330 to the network application 204. In alternative embodiments, the network application 204 can maintain or store one or more pieces of the delivery information such that the network application 204 need not query the remittance network 115 for every transaction. For example, the remittance manager 242 can query the remittance network 115 in accordance with a predetermined schedule to obtain delivery information (e.g., current exchange rates).

In response to the recipient of the delivery information 330, the remittance manager 242 can send the available delivery options, fees, and exchange rates 332 to the client application 202, which in turn can present payment entry and delivery option UIs 334 to the sender. In one or more embodiments, the sender may submit the remittance amount in the currency of the sender's country of residence. Alternately, the payment entry UI may allow the sender to adjust the remittance amount based on an exchange rate between the country of the sender and the country of the selected recipient. Next, the sender client device 104a may present a delivery option UI by which the sender may select and submit a remittance delivery method. In one or more embodiments, the remittance manager 242 may allow remittances to be processed via a local agent, a bank account, credit card, gift card, or mobile wallet. The client application 202 can send a remittance amount and a selected delivery mechanism 336 to the remittance manager 242.

At this point the client application 202 can provide a recipient information UI 338 to gather information about the recipient to aid in delivery of the remittance. The sender can enter this information and the client application 202 can provide the recipient info 340 to the remittance manager 242. Alternatively, as described below in relation to FIGS. 4A-4B, the sender can contact the recipient to obtain the recipient info or have the network application 204 obtain the recipient information directly from the recipient. Alternatively, the network application 204 may have this information on file already for the recipient.

Once the recipient information is received, the user interface manager 206 can provide a sender information UI 342. The sender can enter or provide sender information (e.g., a payment credential or other information) to allow the remittance manager 242 to process with the remittance. In one or more embodiments, sender information may include name information, location information, debit card information, and notification information. If the remittance manager can fund remittances in a variety of ways, sender information may also include credit card information or mobile wallet information. The client application 202 can send the sender information 344 to the remittance manager 242. Alternatively, the network application 204 may have this information on file already for the sender.

Before the remittance manager 242 begins processing the requested remittance transaction, the remittance manager 242 may first request that the sender review the remittance transaction details. For example, the user interface manager 206 can provide a transaction review UI 346 that includes the details of the transaction. After the sender reviews the remittance transaction details, the sender may submit a confirmation 348 to the remittance manager 242. In one or more alternative embodiments, the sender may, at this point, also edit the remittance transaction details.

Once all the remittance transaction information is submitted and reviewed, the risk calculator 240 may perform a transaction risk check 350. The transaction risk check 350 can gauge risk or fraud potential based on sender and recipient legal names, the selected delivery method, the country of delivery, the payment credential provided by the sender and/or recipient, and other gathered information. Furthermore, the transaction risk check 350 can be based on a relationship between the sender and the recipient (or lack thereof).

For example, in one or more embodiments, the transaction risk check 350 can involve determining a risk level for the requested transaction. In a particular embodiment, the determined risk level for the requested transaction may fall within one of five predetermined ranges. For instance, the network application 204 may handle the requested transaction differently depending on the range within with the risk level for the requested transaction falls. In one or more embodiments, a no risk level (e.g., a risk level of 0-1) may fall into the "pass" range, a low risk level (e.g., a risk level of 2-4) may fall into the "verify messaging system account" range, an intermediate risk level (e.g., a risk level of 5-6) may fall into the "pause for review" range, a high risk level (e.g., a risk level of 7-8) may fall into the "pause for proof of identity" range, and an extreme risk level (e.g., a risk level of 9-10) may fall into the "blocked" range. Each range will be discussed in more detail below.

Requested remittance requests with a risk level in the "pass" range will be processed by the network application 204 without any further action on the sender's part. For example, in one or more embodiments, the network application 204 will assign a no risk level to a remittance transaction when the network application 204 has determined both the sender and the recipient have low or no risk level. As discussed above, the network application 204 determines risk level for senders and recipients based on social network interactions, relationship coefficients, and transaction histories. Additionally, the network application 204 may take social network usage into account. For example, if the sender and/or the recipient have made regular usage of the social network over a fairly long period of time, the network application 204 is less likely to assign the sender and/or recipient a high-risk level.

Requested remittance requests with a risk level in the "verify messaging system account" range may require further confirmation from the sender before processing. For example, the network application 204 may assign a low risk level to a remittance transaction request if the network application 204 identifies information indicating the sender's messaging system account might be compromised. For instance, information maintained by the message database 234 may indicate atypical activities in the sender's messaging system account such as, but not limited to, frequent messaging with co-users who have not been members of the social network for very long, increased remittance requests to new co-users, posts and messages from the sender's social network account containing advertisements or pornography, etc.

In one or more embodiments, the network application 204 may require the sender to complete a challenge in order to prove the sender's messaging system account has not been compromised. For example, the network application 204 may send a code or challenge question (e.g., a Captcha challenge) based on the sender's social network profile or the sender's list of co-users. In one or more embodiments, the network application 204 may send the code or challenge to the sender via email or text message. In a particular embodiment, the network application 204 may proceed with processing the requested remittance transaction in response to the sender successfully responding to the code or challenge. If the sender cannot successfully respond to the code or challenge, the remittance manager can send a remittance denial 308.

Requested remittances with a risk level in the "pause for review" range may require further manual review before processing. For example, the network application 204 may assign an intermediate risk level to a remittance transaction request if the network application 204 determines a possible problem with the transaction. Possible remittance transaction problems may include, but are limited to, a problem with the method by which the sender is funding the remittance (e.g., the sender does not have enough money to fund the remittance), or a problem with the selected method of remittance (e.g., the selected local agent is no longer operational, the recipient's bank account is no longer active, etc.). If the network application 204 determines there is a problem with the remittance transaction, the network application 204 may send the remittance transaction request to another body for manual review.

When the network application 204 moves the remittance transaction request to manual review, the user interface manager 206 may inform the sender that the request is being reviewed. Upon completion of the manual review, the network application 204 may provide the result of the manual review to the sender. For example, if the manual review indicates the remittance request may proceed, the network application 204 may inform the sender via the user interface manager 206. In one or more embodiments, if the manual review indicates the remittance request is denied, the remittance manager can send a remittance denial 308.

Requested remittance requests with a risk level in the "pause for proof of identity" range may require further information from the sender before processing. For example, the network application 204 may assign a high-risk level to a remittance transaction request if the network application 204 determines a possible problem with the sender's identity. In other words, the network application 204 may have determined a realness score that indicates the sender is not a real person, or is not the person the account being used is assigned. Alternatively, while each of the sender and the recipient individually passed the sender risk check and the recipient risk check the combination of the sender and the recipient can indicate a problem or fraud. In order to satisfy the identity proof requirement, the network application 204 may require the sender to submit an image of a photo ID (e.g., such as a passport, or other government issued ID). If the sender does not provide the required image in a predetermined amount of time, the remittance manager can send a remittance denial 308.

The risk calculator 240 may not process requested remittance transactions with a risk level in the "blocked" range. For example, the risk calculator 240 may assign an extreme risk level to a remittance transaction request if the risk calculator 240 determines either the sender and/or the recipient is a known to engage in fraudulent activity. In one or more embodiments, the risk calculator 240 may make this determination based on information maintained by the message database 234, the user profile database 246, the transaction database 244, and/or by information communicated from the remittance network 115. In one embodiment, the network application 204 may block senders and/or recipients who have previously been blocked. In response to the risk calculator 240 determining that the remittance will be blocked, the remittance manager can send a remittance denial 308.

In response to the risk calculator 240 determining that the remittance transaction passes the transaction risk check 350, the user interface manager 206 may provide a confirmation to the sender. Optionally, as indicated by 352, the network application 204 can send an authorization request against the sender's payment credential (e.g., payment card of the sender) for the amount of the payment or another amount (e.g., $0.01 or $100.00) to the remittance network 115, which can approve or deny payment card authorization. The remittance network 115 can then forward the payment credential authorization response to the network application 204, as indicated by 354. One will appreciate that the optional authorization request can take place earlier or later in the timeline. In alternative implementations, the network application 204 can send an authorization request against the payment credential of the sender for the amount of the payment as part of the transaction risk check 350.

To complete the remittance, the network application 204 can send a remittance transaction request 356 to the remittance network 115 to process the funding of the remittance. In particular, the remittance transaction request 356 can provide payment information and instructions to charge 358 the payment amount to the sender's payment credential. Additionally, the instructions can instruct the remittance network 115 to credit deliver the funds 360 to the recipient using the selected delivery method.

Figure 3E:
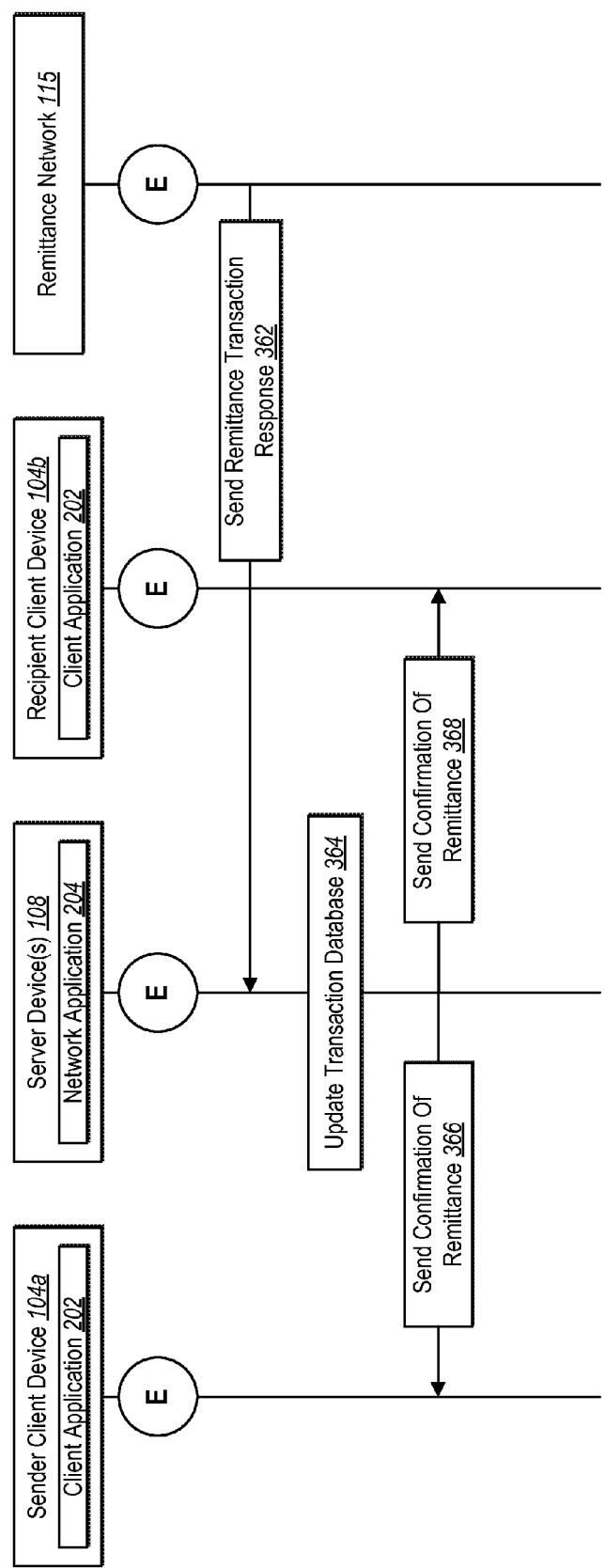

Upon delivery the remittance (e.g., deposing funds into recipient bank account, delivering funds into an electronic wallet, or delivering the funds via an agent), the remittance network 115 can send the network application 204 a remittance transaction response 362, as shown in FIG. 3E. Specifically, the remittance transaction response 362 can indicate the funding of the payment was successful. The network application 204 can then updated the transaction database 364, send a confirmation notification or message 366 to the sender, and send a confirmation notification or message 368 to the recipient.

As mentioned above, the sender may not have the recipient's information. Thus, rather than inputting the recipient's information, the sender may request that the recipient provide the information either to the sender or to the network application 204. In light of the fact that the sender may not know the requested information and/or the recipient may not want to share the requested information, it may be easier and more secure for the network application 204 to obtain the requested information directly from the selected recipient.

Figure 4A:
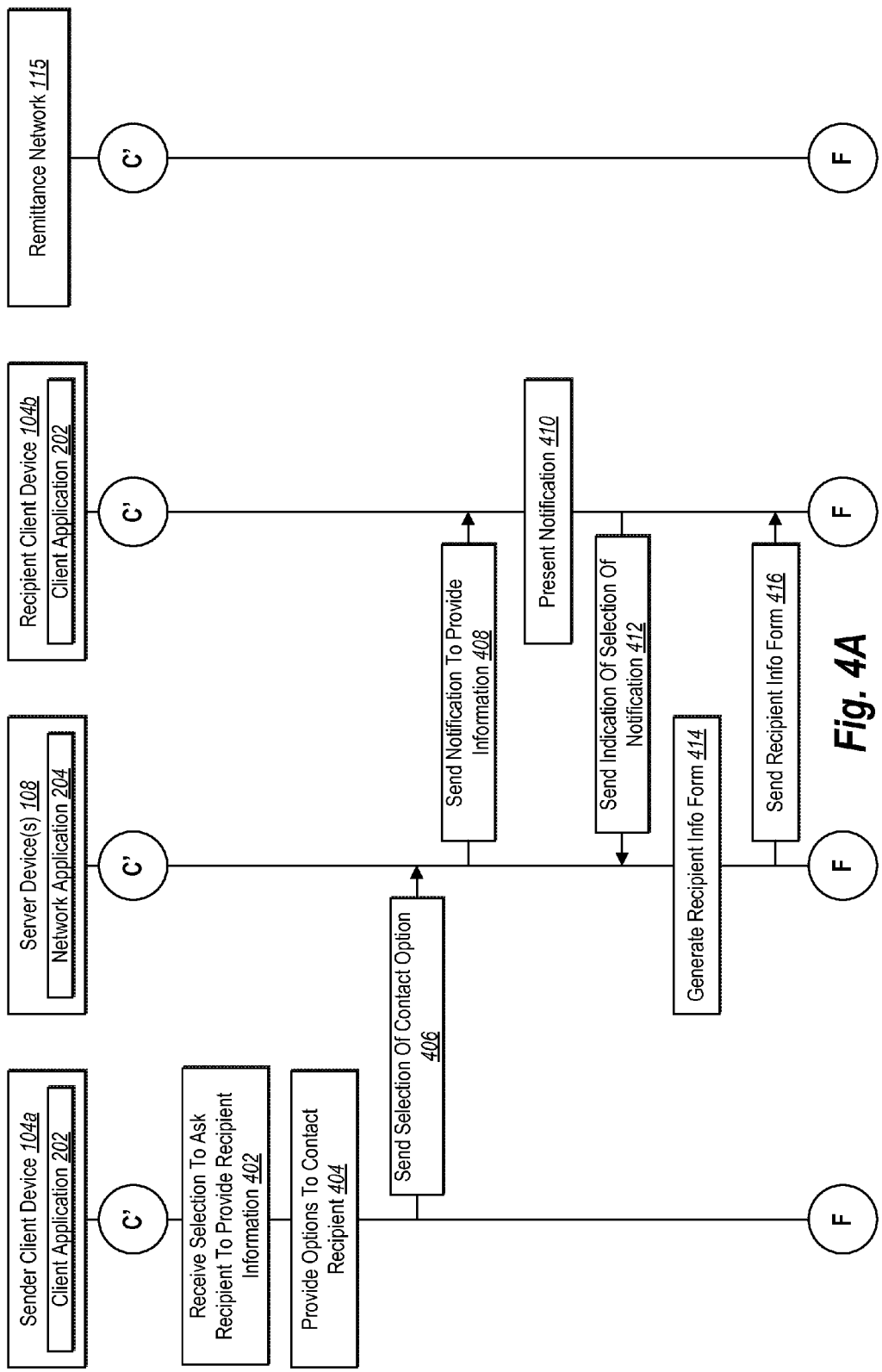
FIG. 4A-4B illustrates a sequence-flow diagram steps for selecting a previous recipient and completing a remittance between a sender and the selected recipient.
Figure 4B:
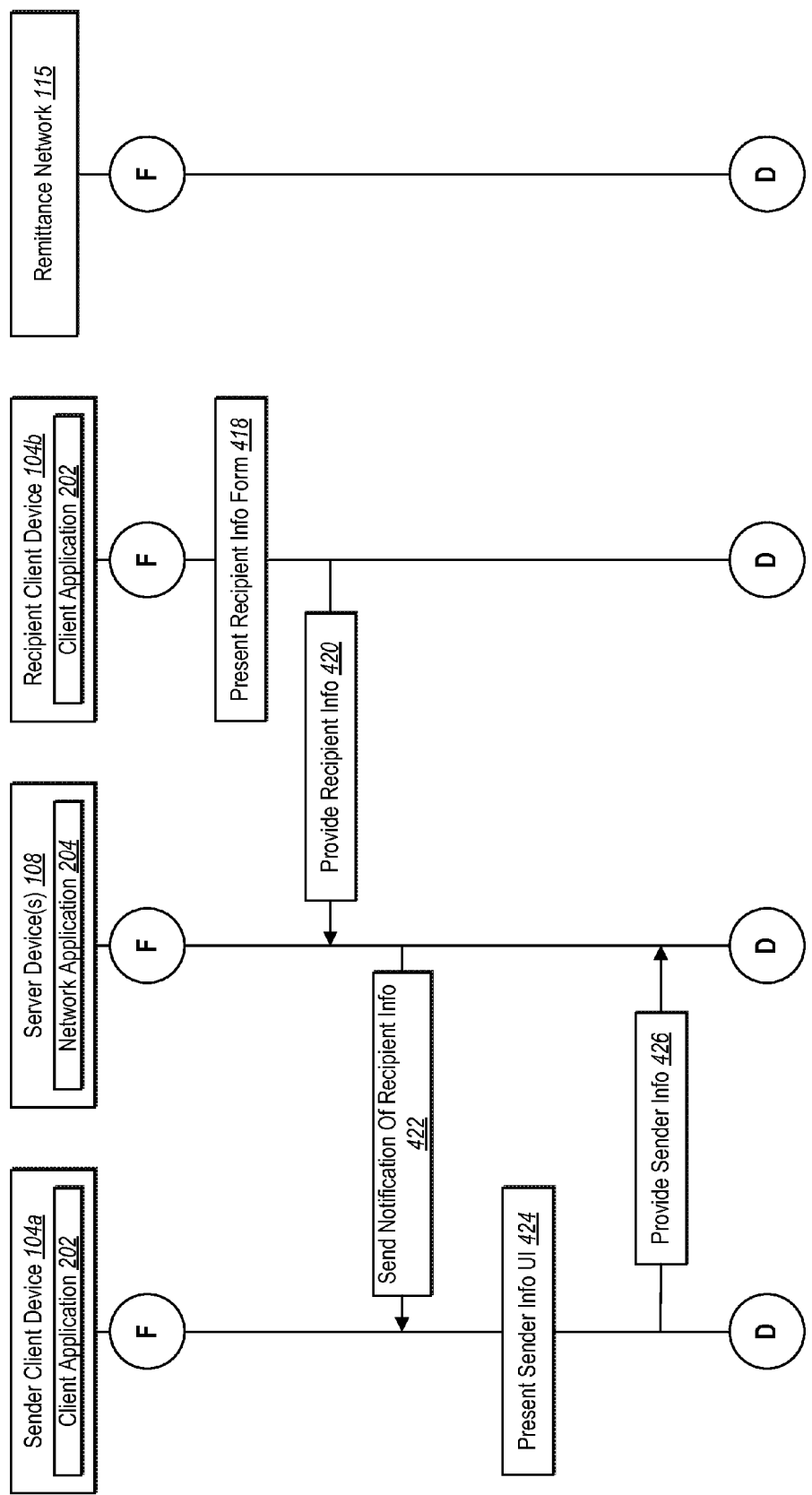

FIGS. 4A-4B illustrate a diagram flow for obtaining information from the recipient. The user input detector 208 can receive a selection to ask the recipient to provide the recipient information 402. In response to the request, the user interface manager 206 can provide various options to contact the recipient 404. For example, the user interface manager 206 can provide one or more controls that allow the sender to open a messaging session with recipient or have the network application 204 obtain the information from the recipient.

Upon the receipt of a selection of the option 406 to have the network application 204 retrieve the information, the network application 204 can send a notification to provide the information 408 to a recipient client device 104b associated with the recipient. The recipient client device 104b can present the notification 410. In response to an indication of the selection of the notification 412, the remittance manager 242 can generate a recipient information form 414. The remittance manager 242 can then send 416 the recipient information form to the recipient client device 104b.

The user interface manager 206 may provide 418 the recipient with the recipient information form. Thus, the recipient may provide the needed recipient information without having to share potentially sensitive information with the sender, or having to store the information in the user profile database 246. Once the recipient has provided the recipient information 420, the network application 204 can send a notification 422 informing the sender that the recipient has provided the recipient information and that the remittance process will proceed to the next step.

Furthermore, in one or more embodiments, the network application 204 may continuously monitor the exchange rate between the sender's country and the recipient's country. It is possible that if the recipient does not immediately provide the needed recipient information, that the exchange rate between the sender's country and recipient's country might change. If a change has occurred, the remittance manager 242 can update the remittance amount and inform the sender of the change.

Once the recipient information is received, the user interface manager 206 can provide a sender information UI 424. The sender can enter or provide sender information (e.g., a payment credential or other information) to allow the remittance manager 242 to process with the remittance. In one or more embodiments, sender information may include name information, location information, debit card information, and notification information. If the remittance manager can fund remittances in a variety of ways, sender information may also include credit card information or mobile wallet information. The client application 202 can send the sender information 426 to the remittance manager 242. Alternatively, the network application 204 may have this information on file already for the sender. At this point, the transaction can continue as outlined in FIGS. 3D-3E.

As will be described in more detail below, the components of the system 100 as described with regard to FIGS. 1 and 2, can provide, along and/or in combination with the other components, one or more graphical user interfaces. In particular, the components can allow a user to interact with a collection of display elements for a variety of purposes. In particular, FIGS. 5A-9I and the description that follows illustrate various example embodiments of the user interfaces and features that are in accordance with general principles as described above.

For example, FIGS. 5A-9I illustrate various views of GUIs provided by the client application 202 to facilitate electronic messaging and sending and receiving payments. In some examples, a client device (i.e., client device 104a, 104b) can implement part or all of the system 100. For example, FIG. 5A illustrates a client device 500 that may implement one or more of the components of the client application 202. As illustrated in FIG. 5A, the client device 500 is a handheld device, such as a mobile phone device (e.g., a smartphone). As used herein, the term "handheld device" refers to a device sized and configured to be held/operated in a single hand of a user. In additional or alternative example, however, any other suitable computing device, such as, but not limited to, a tablet device, a handheld device, larger wireless devices, laptop or desktop computer, a personal-digital assistant device, and/or any other suitable computing device can perform one or more of the processes and/or operations described herein.

The client device 500 can include any of the features and components described below in reference to a computing device 1600 of FIG. 16. As illustrated in FIG. 5A, the client device 500 includes a touch screen display 502 that can display or provide user interfaces and by way of which user input may be received and/or detected. As used herein, a "touch screen display" refers to the display of a touch screen device. In one or more embodiments, a touch screen device may be a client device 104a, 104b with at least one surface upon which a user may perform touch gestures (e.g., a laptop, a tablet computer, a personal digital assistant, a media player, a mobile phone). Additionally or alternatively, the client device 500 may include any other suitable input device, such as a touch pad or those described below in reference to FIG. 16.

As noted previously, the system 100 can integrate an electronic messaging system and an electronic remittance system. FIG. 5A illustrates a people or contacts user interface 504 provided by the user interface manager 206 on the touch screen 502. The contacts user interface 504 can provide a list of contacts of a user ("Rupal") of the client device 500. In particular, the contacts user interface 504 can list "friends" or contacts 505 with which the user is connected or associated within the system 100.

The contacts user interface 504 can further provide one or more statuses of each of the contacts 505. For example, the contacts user interface 504 can indicate whether a given contact or co-user is active (e.g., logged into the client application 202, connected to the Internet, recently performed an action using the client application 202) by a first status indicator 507. The first status indicator 507 can comprise a graphical user interface object such as an icon.

In one embodiment, the first status indicator 507 comprises a dot of a first color (e.g., green) next to a name of each co-user who is active. Along related lines, the first status indicator 507 can also include a dot of a second color (e.g., grey) next to users who are inactive. Alternatively, if a user is inactive, the contracts user interface 504 may not include any dot or first status indicator 507 to signal that the user is inactive.

The contacts user interface 504 can indicate what the type of device a contact or co-user is currently using via a device indicator 508. The device indicator 508 can comprise a graphical user interface object such as an icon. For example, as shown the device indicator 508 can comprise the words "Web" indicating that a co-user is active or logged into the client application 202 using a personal computer. Along similar lines, the device indicator 508 can include the word "Mobile" to indicate that a given contact is active or logged into the client application 202 using a mobile device, such as a mobile phone. Additionally or alternatively, the device indicator 508 can indicate a brand or model of the client device of a given co-user.

Depending upon privacy settings of given co-users (i.e., users can chose whether to share this information or not), the contacts user interface 504 can further include a payment status indicator 509. The payment status indicator 509 can indicate whether a given co-user is enrolled or capable of receiving or sending electronic payments using the system 100. For example, the presence of a payment status indicator 509 next to the name of a given co-user can indicate that the given co-user has a payment credential associated with their account or profile with the system 100 or network application 204. The payment status indicator 509 can comprise a graphical user interface object such as an icon. For instance, as shown by FIG. 5A, the payment status indicator 509 can comprise a dollar sign or other symbol commonly associated with payment transactions.

The client application 202 can receive notifications or indications of the statuses of the contacts associated with the user of the client device 500 from the status manager 232 of the network application 204. For example, the client application 202 can send notifications or status updates to the network application 204 to indicate when the client application 202 is active or client device 500 is online. The status manager 232 can then send the statuses of contacts associated with a given user to the client devices 104a associated with the given user. Along related lines, the status manager 232 can determine if a given user has a payment credential associated with their profile and can provide indications to the client device 500 of contacts of the user who have the ability to send and receive payments without having to enter a payment credential.

One will appreciate in light of the disclosure herein the integration of an electronic messaging system and an electronic remittance system can provide significant advantages over conventional payment applications. In particular, a user can access a contacts user interface 504 and determine which co-users are active, and thus, available to chat about a payment transaction or even notice the receipt of a payment. Furthermore, the contacts user interface 504 can optionally allow a user to know which co-users have a payment credential. Thus, the contacts user interface 504 can inform the user whether a co-user will be able to "instantly" receive a payment or whether the user may need to invite the co-user to enroll.

As described above, the system 100 can facilitate receiving and sending data. In one or more embodiments, the communication manager 230 facilitates receiving and sending electronic communications between the computing devices 104a, 104b, 500. Also in one or more embodiments, the user interface manager 206 displays electronic communications sent and received via the communication manager 230. In one or more embodiments, the user interface manager 206 can display electronic communications sent and received via the communication manager 230 in a communication thread within the messaging graphical user interface. For example, a user can interact with a contact list in the list of contacts of the contacts user interface 504 in order to open a messaging graphical user interface that facilitates exchanging messages with the contact. For example, FIG. 5B illustrates a messaging graphical user interface 510 provided by the user interface manager 206 on the touchscreen 502 upon the user selecting the contact "Neha" from the contacts user interface 504.

As shown, the messaging graphical user interface 510 can include a communication thread 511 that includes electronic messages 512a sent from an account of a user of the communication device 500. Similarly, the communication thread 511 can include electronic messages 512b received by the account of a co-user (i.e., "Neha"). In one or more embodiments, the user interface manager 206 organizes the communication thread 511 such that new messages are added to the bottom of the communication thread 511 so that older messages are displayed at the top of the communication thread 511. In alternative embodiments, the user interface manager 206 may organize the messages 512a, 512b in any manner that may indicate to a user the chronological or other relationship between the messages 512a, 512b.

The user interface manager 206 provides a variety of electronic communication characteristics to help a user distinguish between electronic communications in the communication thread 511. For example, as illustrated in FIG. 5B, the user interface manager 206 displays the electronic messages 512a sent from an account of the user of the client device 500 pointed toward one side (i.e., the right side) of the messaging graphical user interface 510. On the other hand, the user interface manager 206 displays the electronic messages 512b received by the messaging handler 210 pointed toward the opposite side (i.e., the left side) of the messaging graphical user interface 510. In one or more embodiments, the positioning and orientation of the electronic messages 512a, 512b provides a clear indicator to a user of the client device 500 of the origin of the various electronic communications displayed within the messaging graphical user interface 510.

Another characteristic provided by the user interface manager 206 that helps a user distinguish electronic communications may be a color of the electronic communications. For example, as shown in FIG. 5B, the user interface manager 206 displays sent electronic messages 512a in a first color and received electronic messages 512b in a second color. In one or more embodiments, the first and second colors may be black and white, respectively, with an inverted typeface color. In an alternative embodiment, the user interface manager 206 may display the electronic messages 512a, 512b with white backgrounds and different colored outlines.

In yet another alternative embodiment, the user interface manager 206 may display the electronic messages 512a, 512b with backgrounds of different patterns, in different fonts, in different sizes or in any other manner that may distinguish the sent electronic messages 512a from the received electronic messages 512b. For example, in one or more embodiments, the user interface manager 206 displays sent electronic messages 512a with white typeface on a blue background. Likewise, in one or more embodiments, the user interface manager 206 displays received electronic messages 512b with black typeface on a grey background.

As mentioned above, the user interface manager 206 may also provide a message input control palette or toolbar of controls 514. As illustrated in FIG. 5B, the user interface manager 206 displays the message input control palette or toolbar of controls 514 as part of the messaging graphical user interface 510. In one or more embodiments, the message input control palette or tool bar 514 includes a variety of selectable message input controls that provide a user with various message input options or other options. For example, in FIG. 5B, the message input control palette or toolbar of controls 514 includes a text input control, a remit funds control 516, a camera viewfinder input control, a multimedia input control, a symbol input control, and a like indicator control. In one or more alternative embodiments, the message input control palette or toolbar of controls 514 may provide the input controls in a different order, may provide other input controls not displayed in FIG. 5B, or may omit one or more of the input controls shown in FIG. 5B.

As will be described below in greater detail, a user may interact with any of the input controls in order to compose and send different types of electronic communications. For example, if a user interacts with the text input control, the user interface manager 206 may provide a touch screen display keyboard 538 in a portion of the messaging graphical user interface 510 that the user may utilize to compose a textual message 513. Similarly, if a user interacts with the multimedia input control, the user interface manager 206 may provide a multimedia content item display area (e.g., for displaying digital photographs, digital videos, etc.) within a portion of the messaging graphical user interface 510. Likewise, if a user interacts with the camera viewfinder input control, the user interface manager 206 may provide a digital camera interface within a portion of the messaging graphical user interface 510 that the user may utilize to capture, send, and add a digital photograph or digital video to the communication thread 306.

The remit funds control 516 can be located within the toolbar of controls 514, or may be offset elsewhere within the messaging graphical user interface 510 (such as in the top portion or within the input keyboard 538). In this way, a different placement of the remit funds control 516 may call more or less attention to the availability of an option to send remittances to a co-user or friend. Furthermore, the remit funds control 516 can be located as a sub-option after selecting one of the other selectable controls from the toolbar of controls 514. In an alternative embodiment, the remit funds control 516 may only become active in response to detecting an electronic communication directed toward remitting funds.

A user may interact with any of the message input controls in order to compose and send a message or a payment to one or more co-users via the system 100. For example, in FIG. 5B, a user's finger is shown interacting with the remit funds control 516. In one or more embodiments, the user input detector 208 can detect interactions (e.g., a tap touch gesture) of the user's finger or other input device with the remit funds control 516. Upon the user input detector 208 detecting a tap touch gesture on the remit funds control 516, the user interface manager 206 may display a remittance login user interface 522 within a portion of the messaging user interface 510 as shown by FIG. 5C.

Figure 5D:
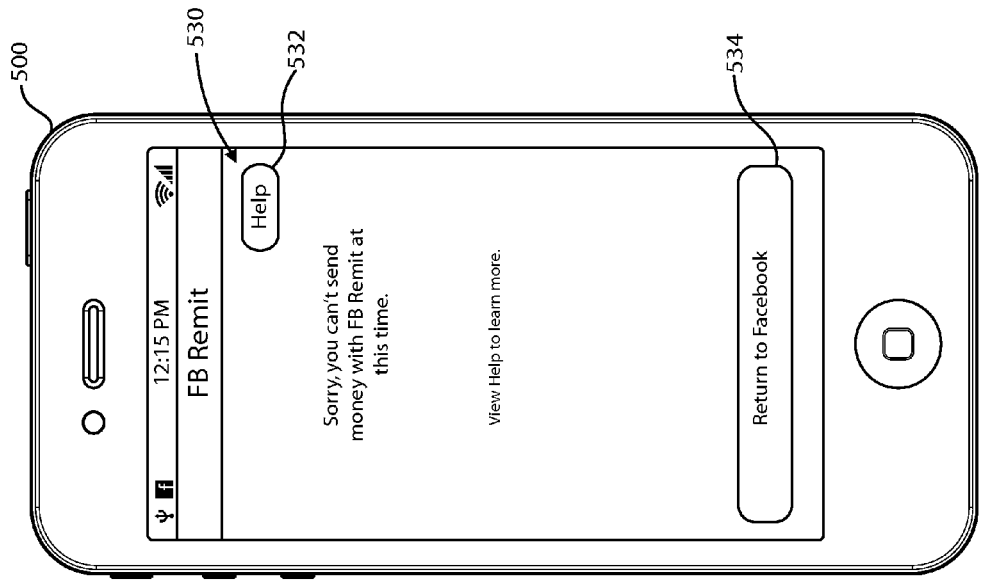
FIGS. 5A-5Q illustrate user interfaces for performing a remittance in accordance with one or more embodiments.
Figure 5C:
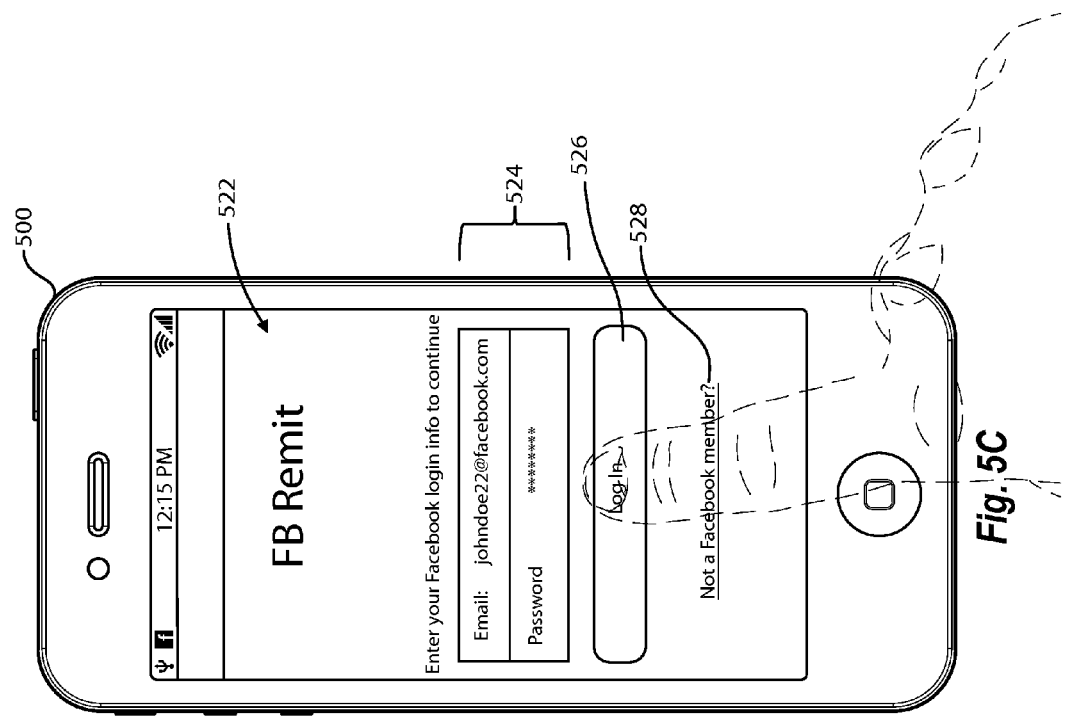

As shown in FIG. 5C, the remittance login user interface 522 may include login input boxes 524, a login control 526, and a new account control or selectable option 528. Additionally or alternatively, the remittance login user interface 522 may also include explanatory text regarding the remittance process, as well as other pictures, icons, or text. In a particular alternative embodiment, the user interface manager 206 may precede the remittance login user interface 522 with an animated sequence.

As shown in FIG. 5C, the remittance login user interface 522 includes various login elements. For example, in one or more embodiments, the user interface manager 206 can initiate the remittance process in response to a user entering an email and password into the login input boxes 524 and tapping the login option or selectable element 526. In a particular embodiment, the system 100 may require same login information to the social network system over which the sender and recipient are messaging, as in FIG. 5B. In an alternative embodiment, a user may not have the necessary login information to initiate the remittance process and may tap the account link 528 in order to set up a new account with either the network application 204, the social networking system, or both. In one or more embodiments, if the user tries to login in with false or incorrect credentials, the user interface manager 206 may present the user with a standard error message informing the user that the email or password is incorrect.

In response to detecting an interaction with the login option or selectable element 526 and verifying the validity of the information, the risk calculator 240 can determine a risk level associated with the sender. For example, in one or more embodiments, the system 100 may only allow senders with a low risk level to initiate a remittance process. For instance, the risk calculator 240 may assign a high-risk level to a sender who does not meet basic requirements. In a particular embodiment, the risk calculator 240 may determine whether the sender has been a member of the social network system for a predetermined amount of time, whether the sender lives in a country from which remittances may be sent, and whether the sender has a predetermined level of social network co-user or "friend" activity in a country where remittances may be sent. If the risk calculator 240 determines that the sender meets these basic requirements, the remittance process may proceed.

In addition to meeting basic requirements, the risk calculator 240 may also determine the sender's "realness" score, as discussed above. In one or more embodiments, the risk calculator 240 may determine a realness score for the sender based on whether the sender has been tagged in media posts to the social networking system by one or more co-users, whether co-users of the sender recognized the sender's previous one or more birthdays (i.e., wished the sender a "happy birthday"), the number or volume of messages exchanged between the sender and co-users of the sender via the social networking system, whether co-users of the sender have indicated agreement or solidarity (i.e., "liked") with posts made by the sender, and/or whether co-users of the sender have commented on posts made by the sender. If the risk calculator 240 determines the sender is a real person, the remittance process may proceed.

If the risk calculator 240 determines that the sender does not meet the basic requirements (i.e., that the risk score for the sender is above a predetermined threshold value), the system 100 can prevent the sender from proceeding with the remittance process. For example, the user interface manager 206 can provide a remittance denial user interface 530 to deny the sender further access to the remittance process. For example, as shown in FIG. 5D, the remittance denial user interface 530 can indicate to the sender that the remittance process is not allowed to proceed. In one or more embodiments, the remittance denial user interface 530 can include a help option or selectable element 532 and a return option or selectable element 534. In response to a detected interaction with the help option or selectable element 532, the user interface manager 206 may provide further information to the sender regarding why the remittance process is being denied (e.g., the sender has not been a member of the messaging system for long enough) and what the sender can do to remedy the problem. In response to a detected interaction with the return option or selectable element 534, the user interface manager 206 return to the messaging graphical user interface 510, as in FIG. 5B.

If the risk calculator 240 determines the sender has a low risk level, the risk calculator 240 may allow the sender to proceed with the remittance process. For example, in FIG. 5E, the user interface manager 206 provides a destination country selection user interface 536 that includes a list of serviced country indicators 538. In one or more embodiments, the network application 204 may only allow or support remittances to be sent to certain countries. For instance, as shown in FIG. 5E, the list of serviced country indicators 538 includes indicators for India, the Philippines, and Kenya. In one or more alternative embodiments, the list of serviced country indicators 538 may include additional country indicators 538, such that the list of country indicators 538 is scrollable or otherwise navigable.

It should be noted that in one or more embodiments, the sender may not be able to send a remittance to a friend or family member who lives in non-approved country. This may be due to limitations based on the infrastructure of a developing country, the availability of remittance methods in a developing country, or the capabilities of the network application 204. If, at a future time, the network application 204 is able to remit funds to additional countries, the list of serviced country indicators 538 may change.

In response to a detected interaction with any of the serviced country indicators 538, the user interface manager 206 may present a list of potential recipients to the sender. For example, in one or more embodiments, in response to a detected interaction with the country indicator 538 for India, the recipient identifier 236 may identify a list of co-users who qualify to be potential recipients. For example, the recipient identifier 236 can identify users associated with the sender who live in India. In one or more embodiments, recipient identifier 236 may order the list of co-users associated with the sender according to various factors, as discussed above. The recipient identifier 236 can provide the list of recipients to the client application 202, which in turn can present the list in the recipient selection user interface 540 as shown in FIG. 5F.

Figure 5F:
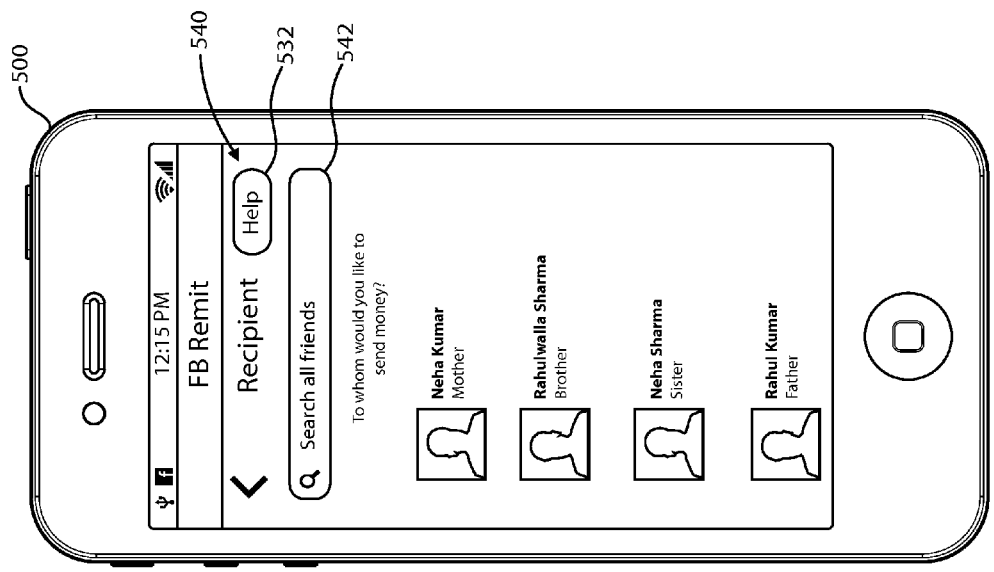
Figure 5E:
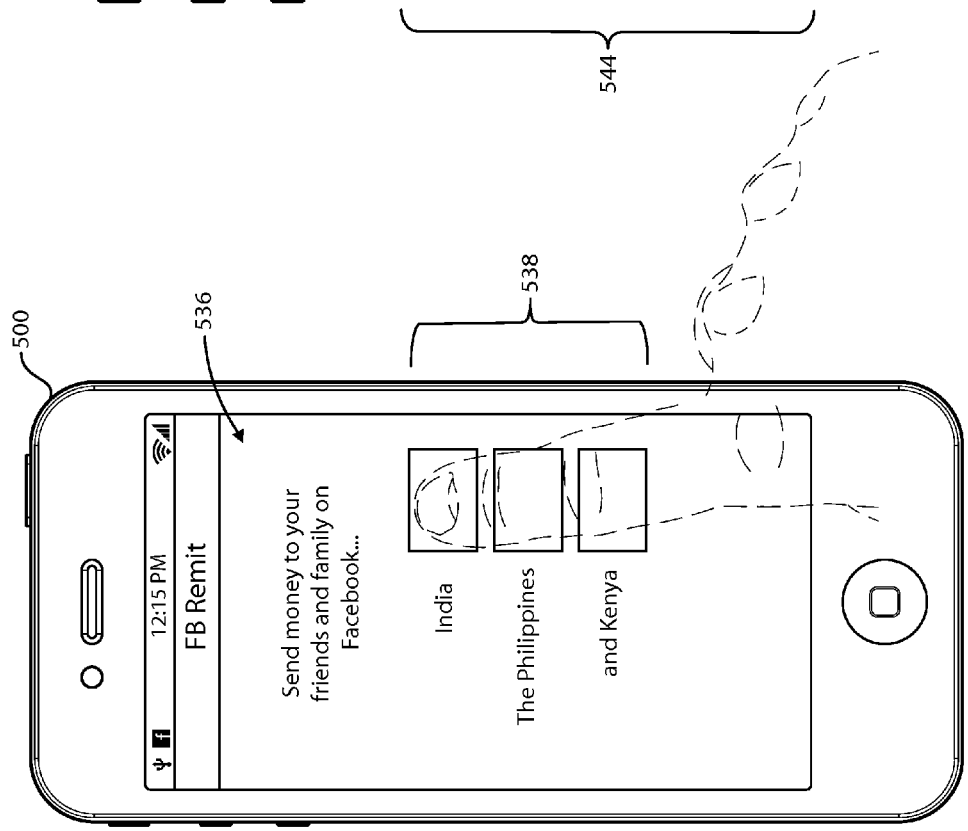

Rather than having the user select the destination country, in one or more embodiments, the system 100 can provide the recipient selection user interface 540 as shown in FIG. 5F after confirming that the sender passed the initial risk check. As shown, the recipient selection user interface 540 can include a suggested recipient list 544. In one or more embodiments, the user interface manager 206 may also include a help option or selectable element 532 and a search input box 542 as part of the recipient selection user interface 540. In additional or alternative embodiments, the sender may search for a specific recipient by inputting a name into the search input box 542, as will be described in greater detail below with reference to FIGS. 6A-6D.

The recipient identifier 236 may identify co-users to include in the suggested recipient list 544 based on a variety of factors. For example, in one or more embodiments, the recipient identifier 236 may analyze information in the message database 234 to identify interactions between the sender and one or more potential recipients, as described above. In a particular embodiment, an interaction between a sender and a potential recipient may be defined as an electronic communication between a sender and a potential recipient (e.g., a text message, a social network message, etc.), a social network post by the sender tagging the potential recipient (or vice versa), a media upload (e.g., an uploaded photograph or video, etc.) by the sender tagging the potential recipient (or vice versa), or a social media location check-in by either the sender or the potential recipient where both parties are either in the same location or are in the same geographic area. Additionally, in one or more embodiments, the analysis performed by the recipient identifier 236 may also take into account the relationship coefficient described above.

Additionally, the recipient identifier 236 may identify the suggested recipient list 544 based on other information stored by the social graph 250. For example, in some embodiments, the recipient identifier 236 may identify potential recipients based on their "real-world" relationships with the sender. For instance, as shown in FIG. 5F, the top listed potential recipient, "Neha Kumar," is listed as the sender's mother. Other listed potential recipients also have similarly close real-world relationships with the sender. In one or more embodiments, the recipient identifier 236 may identify this type of relationship data based on information maintained by the social graph 250.

As part of the process of identifying co-users for the suggested recipient list 544, the risk calculator 240 can assign a risk level to each potential recipient in the suggested recipient list 544. As discussed above with reference to a risk check for the sender, in one or more embodiments, the risk calculator 240 assigns a high-risk level to potential recipients who have few interactions, relationships, and transaction history with the sender. Additionally, the risk calculator 240 may assign a high-risk level to potential recipients who have not been a member of the social network system for a predetermined amount of time, or who are known to have been involved in fraudulent activities. Furthermore, the risk calculator 240 may assign a high-risk level to potential recipient who do not live in the in the United States, or in a serviced country (i.e., countries indicated by country indicators 538 in FIG. 5E).

Figure 5H:
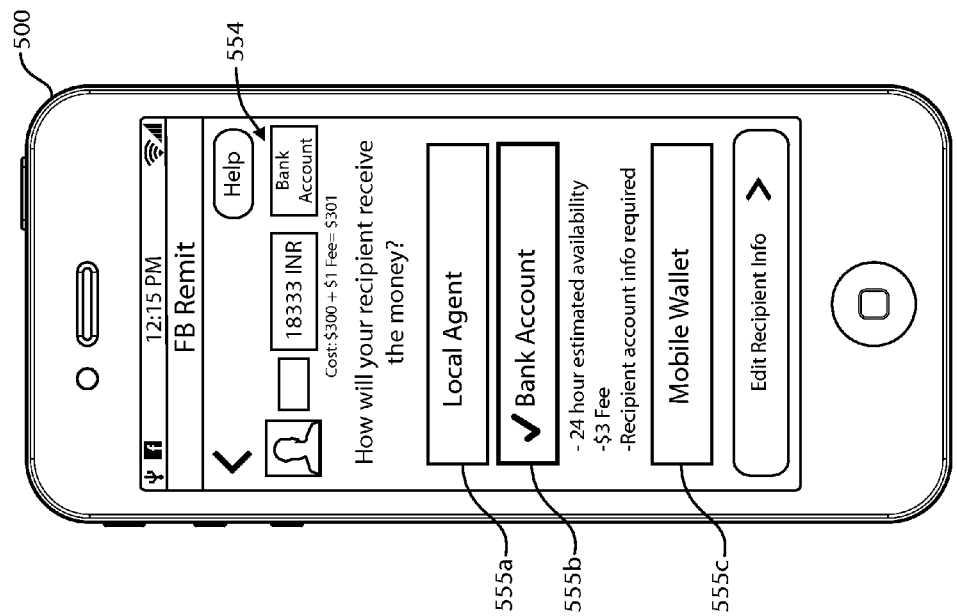
Figure 5G:
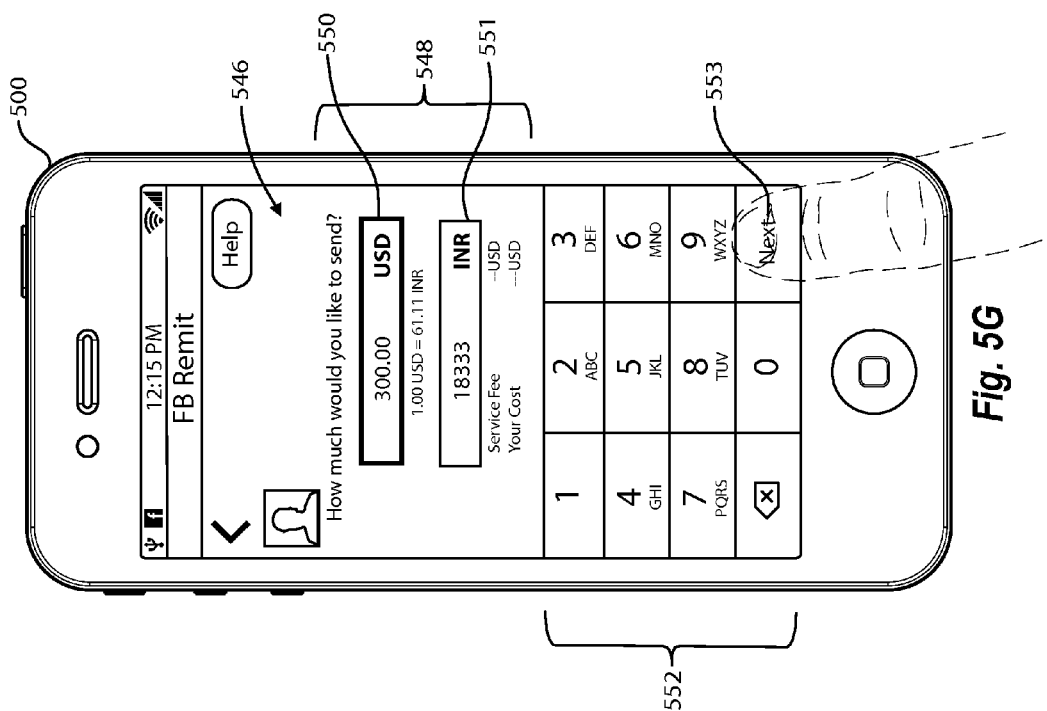

In one or more embodiments, in response to a successful recipient selection (i.e., the selection of "Neha Kumar"), the user interface manager 206 may provide a remittance calculation interface 546, as shown in FIG. 5G. For example, as shown in FIG. 5G, the user interface manager 206 can display a remittance calculator 548 and number keypad 552 as part of the remittance calculation interface 546. By utilizing these display elements, a sender may quickly and easily determine how much money to send in one currency in order to provided the needed funds in another currency.

For example, as shown in FIG. 5G, the remittance calculator 548 may include a remittance send amount control 550 and a remittance receive amount control 551. In one or more embodiments, the sender may input an amount into the remittance send amount control 550 (e.g., "300.00 USD"), and the user interface manager 206 will update the remittance receive amount control 551 to display the inputted amount in a different currency (e.g., "18333 INR"). In one embodiment, the user interface manager 206 may select the currency displayed in the remittance receive amount control 551 based on a country associated with the selected recipient. Alternatively, the user interface manager 206 may display a currency in the remittance receive amount control 551 based on a determination of the network application 204. Additionally, the user interface manager 206 may display other fees and costs associated with the remittance transaction as part of the remittance calculator 548, thus informing the sender of the total cost of the remittance.

In one or more embodiments, the exchange rate between the currency associated with the remittance send amount control 550 and the remittance receive amount control 551 may be provided by the remittance network 115 via the communication manager 230. For example, currency exchange rates generally fluctuate on a daily or more frequent basis, and in one or more embodiments, the remittance network 115 may provide the most current exchange rates. In one or more embodiments, the user interface manager 206 may display the most current exchange rate between the two currencies as part of the remittance calculator 548 (e.g., "1.00 USD=61.11 INR"). Additionally, in one or more embodiments, the sender may manually specify the currencies associated with the remittance send amount control 550 and the remittance receive amount control 551. In one embodiment, the sender may manually specify a currency by tapping on the listed currency. In response to the detected user interaction, the user interface manager 206 may display a dropdown list of all supported currencies.

The sender may enter the desired remittance amount into the remittance send amount control 551 by typing the amount on the number keypad 552. In one or more embodiments, the messaging communication manager 254 may recognize and save remittance information from within one or more electronic communications. For example, from within electronic communications between the sender and "Francesca" provided by the messaging manager 232 (see FIG. 5B), the messaging communication manager 254 may identify the intended remittance recipient, Francesca, as well as the remittance amount, $300 USD. In one or more embodiments, once the sender logs into the remittance system, as described below, the remittance manager 250 may utilize the saved remittance information from the one or more electronic communications. In one or more alternative or additional embodiments, the remittance manager 240 may also determine remittance transaction information based on social network profiles or identities associated with the sender and the recipient (i.e., country of residence, legal name, address, email, phone number, etc.).

In response to entry of a remittance amount, the user interface manager 206 may update the remittance send amount control 550 with the typed amount, and the remittance receive amount control 551 with a converted amount based on the typed amount multiplied by the current conversion rate. In one embodiment, if the sender selects the currency in the remittance receive amount control 551 to be the same as the currency in the remittance send amount control 550, the amounts in both controls will be the same (i.e., no conversion rate will be applied). If the risk level associated with the selected recipient is such that a limit is placed on the amount of the remittance, any entered amount higher than the limit will trigger an error message. Additionally, in one or more embodiments, the sender may only be able to remit a certain amount on a daily basis. If the entered amount puts the sender over the daily amount, an error message may be triggered.

Once the sender is satisfied with the amounts displayed in the remittance send amount control 550 and the remittance receive amount control 551, the sender may advance the remittance process by tapping on the next option or selectable element 553. As with other interfaces described herein, in response to any changes or updates to a graphical user interface, all user selections and configurations may be saved by the network application 204 and/or the client application 202. For example, as shown in FIG. 5G, in response to the interaction with the next option or selectable element 553 by the user's finger, the network application 204 can save the amount 300.00 USD to send to the remittance network 115 later in the remittance process. In one or more embodiments, the client application 202 may also save all inputted remittance information in case the sender needs to edit the remittance information at a later point before submitting the remittance request for processing.

As shown in FIG. 5G, in response to the detected interaction with the next option or selectable element 553, the user interface manager 206 may provide a remittance method selection interface 554, as shown in FIG. 5H. For instance, as shown in FIG. 5H, the remittance method selection interface 554 may include remittance amount information, as well as remittance methods 555a, 555b, and 555c. The remittance amount information may include the input amount, as described with reference to FIG. 5G, as well as recipient information, a selected remittance method, and/or costs, fees, and totals associated with the remittance.

In one or more embodiments, available remittance method indicators may include, but are not limited to, a local agent remittance method indicator 555a, a bank account remittance method indicator 555b, and a mobile wallet remittance method indicator 555c. Additional or alternative embodiments may include fewer or more remittance method indicators based on the network application 204, the destination country, or other factors. In one embodiment, in response to a detected interaction with the local agent remittance method indicator 555a, the user interface manager 206 may provide a list of information associated with this remittance type below the local agent remittance method indicator 555a. Additionally, it should be noted that selecting the local agent remittance method indicator means the remittance will be processed in a method similar to a traditional wire transfer. In other words, the remitted funds will be sent from the sender to a local agent (e.g., an office located near the recipient) for the recipient to pick up. This option is discussed further below with reference to FIGS. 8A-8C.

It should be noted that the sender may edit information associated with the selected recipient by tapping the edit recipient option or selectable element. For example, as shown in FIG. 5H, in response to a detected user interaction with the edit recipient option or selectable element, the user interface manager 206 may display a user interface associated with recipient selection, such as illustrated in 5F. In other words, in one or more embodiment and in response to a selection of the edit recipient option or selectable element, the remittance process will move back to the recipient selection step. In one or more alternative embodiments, selecting the edit recipient option or selectable element may simply allow the sender to edit the remittance amount.

As shown in FIGS. 5I-5J, in response to a detected interaction with the bank account remittance method indicator 555b, the user interface manager 206 may provide a list of information associated with this remittance type below the bank account remittance method indicator 555b. In one or more embodiments, selecting the bank account remittance method indicator 555b means the network application 204 will direct the remittance to be transferred from the bank account of the sender to a bank account associated with the recipient. In one embodiment, the user interface manager 206 may update the remittance method listed as part of the remittance amount information in response to a selection of the bank account remittance method indicator 555b.

For example, if the sender selected the bank account remittance method (as in FIG. 5J), the network application 204 may request information regarding the selected recipient that will enable the remittance of funds to a bank account associated with the recipient. As shown in FIG. 5I, the user interface manager 206 may provide a recipient information interface 556a that includes text fields for the sender to enter the recipient's name information 557, the recipient's location information 558, the recipient's bank account information 561, and the recipient's notification information 563. It will be understood that FIG. 5J contains the bottom portion of the same interface illustrated in FIG. 5I.

In response to the sender tapping a bank dropdown control 559 in FIG. 5I or 5J, the user interface manager 206 may provide an expanded bank dropdown list. In one or more embodiments, the remittance manager 250 may only operate in conjunction with certain banks. In other words, it may not be possible for a sender to remit funds to a recipient via any bank in a given location. Accordingly, the network application 204 may provide a list of serviced banks to the user interface manager 206 for display as part of the recipient information interface 556a, 556b. In response to a detected selection of a bank from the expanded bank dropdown list, the user interface manager 206 may populate the bank dropdown control 559 with the selected bank and remove the expanded bank dropdown list.

The network application 204 may provide transaction information notifications to the sender and to the recipient periodically through the remittance transaction. For example, the network application 204 may send transaction information notifications when a remittance is verified, when a recipient provides requested information, when a remittance is being processed, when a remittance is ready for pick-up, or when a remittance is completed. In one or more embodiments, the network application 204 will provide the transaction information notifications as social network messages or notifications. Additionally, the network application 204 may provide the transaction information notifications in other ways. For example, as shown in FIG. 5J, the sender may provide recipient notification information 563 (such as a telephone number or an email address) such that the network application 204 may send transaction information notifications to the recipient via text message or email. Alternately, the sender may provide additional notification information by tapping the add option notification methods link 562.

Alternately, rather than inputting the recipient's information, the sender may request that the network application 204 obtain the required information directly from the recipient. For example, in one or more embodiments, the sender and the recipient are associated with each other via the network application 204. In light of the fact that the sender may not know the requested information and/or the recipient may not want to share the requested information, it may be easier and more secure for the network application 204 to obtain the requested information directly from the selected recipient. For instance, in response to the sender taping the recipient request link 560 as shown in FIG. 5I, the network application 204 may contact the selected recipient directly for the requested information.

In one or more embodiments, the network application 204 can contact the selected recipient via a social network message and/or notification, which may contain a link to an online form where the recipient may enter the needed information. While waiting for the recipient to respond to the social network message and/or notification, the network application 204 may pause and/or save the remittance process for the sender. In other words, in one or more embodiments, the sender may leave the remittance process until the network application 204 notifies the sender that the recipient has provided the needed information. Alternately, in response to a detected interaction with the recipient request link 560, the user interface manager 206 may provide a messaging window wherein the sender may compose an instant message to the recipient requesting the recipient provide the necessary information. The network application 204 may provide a link to a form for filling in the necessary information along with the instant message. This process is described further below with reference to FIGS. 7A and 7B.

Once the necessary recipient information is provided whether by the sender or the recipient, the network application 204 may save the inputted information and the remittance process may continue. For example, the sender can select the enter sender information option 564. In one or more embodiments, the option 564 for entering sender information may be disabled until recipient information is provided.

Alternatively, when the recipient provides the information, the network application 204 can provide a notification to the sender. Upon selection of the notification, the user interface manager 206 can provide the sender information interface 566a, 566b described below. In still further embodiments, the recipient may have a payment credential on file with the network application 204. In such embodiments, the user interface manager can skip providing the recipient information interface 556a, 556b and directly provide the sender information interfaces 566a, 566b.

Figures 5K, 5L:
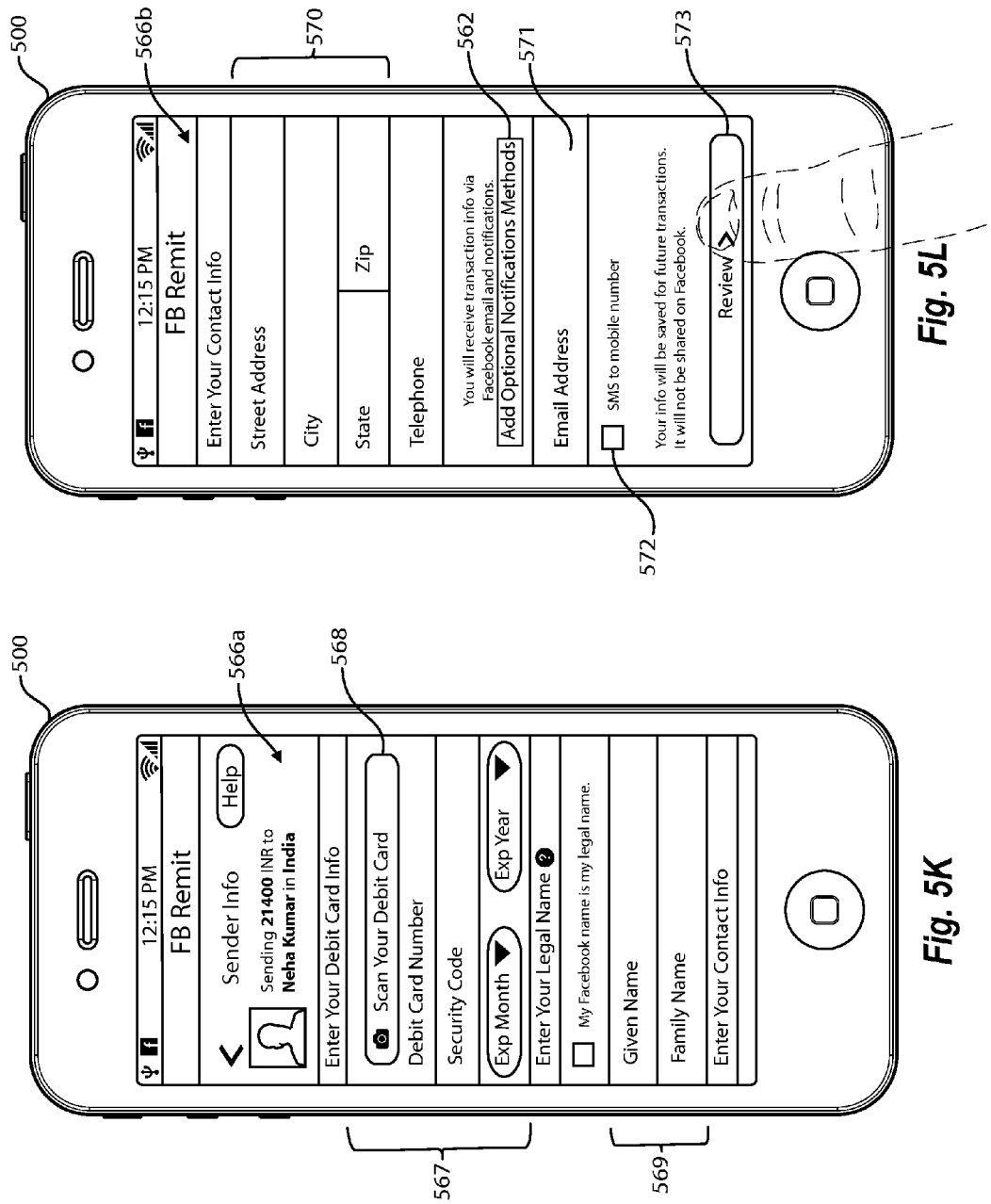

As illustrated in FIGS. 5K and 5L, the user interface manager 206 may provide sender information interfaces 566a and 566b. In one or more embodiments, the user interface manager 206 can include input controls for debit card information 567, name information 569, location information 570, and notification information 571 as part of the sender information interfaces 566a and 566b. It will be understood that the sender information interface 556b of FIG. 5L is the bottom portion of sender information interface 556a of FIG. 5K.

In order to fund the remittance transaction, the network application 204 may require debit card information from the sender or another payment credential. For example, as shown in FIG. 5K, the sender may enter debit card information via the scan option or selectable element 568. In one or more embodiments, in response to a detected interaction with the scan option or selectable element 568, the user interface manager 206 may open a scanning interface. For example, the scanning interface may work in conjunction with a camera of the mobile device 500 in order to take a picture of the sender's debit card. In one embodiment, the scanning interface may recognize the debit card number, expiration month, and expiration year based on the picture of the sender's debit card. In that embodiment, the user interface manager 206 may replace the scan option or selectable element 568 with the recognized debit card number, in addition to displaying the debit card's security code, expiration month, and expiration year within the debit card information 567. In one or more alternative embodiment the user interface manager 206 may provide text input controls for a user to manually enter the debit card information 567.

Although FIG. 5K illustrates an embodiment wherein the network application 204 requires debit card information 567 from the sender in order to fund the requested remittance, in other embodiments the network application 204 may fund remittances in other ways. For example, in one or more alternative embodiments, the network application 204 may fund remittances from a sender's bank account. In that embodiment, the user interface manager 206 may provide text input controls for bank account information as part of the sender information interface 566a, as shown in FIG. 5K. In yet other alternative embodiments, the network application 204 may fund remittances from a sender's credit card or mobile wallet. In those embodiments, the user interface manager 206 may provide appropriate corresponding input controls as part of the sender information interface 566a, 566b.

In one or more embodiments, the network application 204 may also require additional information from the sender besides the sender's debit card information. For example, as shown in FIGS. 5K and 5L, the user interface manager 206 may provide input controls for name information 569 as well as location information 570. In one or more embodiments, this information may be needed by the network application 204 in order for correct processing of the remittance.

As discussed above, the network application 204 may notify the sender as the remittance request passes through different processing steps. As shown in FIG. 5L, the network application 204 may automatically notify the sender regarding the remittance via the social network. In one or more embodiments, the sender may also receive notifications in other ways by providing additional notification information 571. For example, the network application 204 may send notifications to the sender via email if the sender provides an email address. Additionally, in one embodiment, the network application 204 may send notifications to the sender via text message if the sender taps the SMS checkbox 572.

In one or more alternative embodiments, the network application 204 may identify part or all of the required recipient and sender information (as described in FIGS. 5I-5L) from profiles maintained by the network application 204. For example, in one or more alternative embodiments, the network application 204 may maintain profiles for the sender and recipient containing information such as their legal names, addresses, phone numbers, and email addresses. In a particular embodiment, the network application 204 may even maintain profile information including credit card information or mobile wallet information. In that case, the user interface manager 206 may automatically populate known profile information into the appropriate input controls described in reference to FIGS. 5I-5L.

Once the sender has entered the information requested by the network application 204, as illustrated in FIGS. 5K and 5L, the sender may review the remittance request before the network application 204 processes the remittance request by tapping the review option or selectable element 573. For example, in response to a detected interaction with the review option 573 in FIG. 5L, the user interface manager 206 may provide a review interface 574, as shown in FIG. 5M. For instance, as shown in FIG. 5M, the user interface manager 206 may display remittance request details such as, but not limited to, remittance information 576, recipient information 577, sender information 578, and transaction terms 579. In one or more embodiments, the user interface manager 206 displays the information submitted by the sender as in FIGS. 5G and 5H as the remittance information 576 in FIG. 5M. Similarly, in one or more embodiments, the user interface manager 206 displays the information submitted by the sender as in FIGS. 5I and 5J as the recipient information 577 in FIG. 5M. Also, in one or more embodiments, the user interface manager 206 displays the information submitted by the sender as in FIGS. 5K and 5L as the sender information 578 in FIG. 5M.

If the sender finds an error or decides to change any of the information displayed as in FIG. 5M, the sender may edit any of the information 576, 577, or 578. For example, in response to a detected interaction with any of the edit options or selectable elements 575, the user interface manager 206 may update the review interface 574 to display the corresponding input controls for the sender to edit. In one embodiment, if the sender edits the recipient information 577 by selecting a new recipient, the network application 204 may trigger the process for determining a risk level for the new recipient, as described above.

The network application 204 can provide transaction terms 579 to the user interface manager 206 for display as part of the review interface 575. In one or more embodiments, the transaction terms 579 can inform the sender of various responsibilities and agreements the sender is either assuming or waiving as a result of utilizing the network application 204 to perform a remittance. In a particular embodiment, the user interface manager 206 may not enable the send money option or selectable element 582 until the sender taps the transaction terms checkbox 580. In one or more embodiments, the network application 204 will recognize the tapping of the transaction terms checkbox 580 as an indication that the sender agrees to the transaction terms.

The sender may cancel the remittance transaction by clicking the cancel option or selectable element 581. For example, in one or more embodiments, in response to a detected interaction with the cancel option 581, the user interface manager 206 may display the recipient selection interface 540, as in FIG. 5F. In a particular embodiment, in response to a detected interaction with the cancel option or selectable element 581, the network application 204 may discard any saved information entered by the sender during the remittance process. In one or more alternative embodiments, the network application 204 may cancel the remittance transaction, but may also save the information submitted by the sender such that the sender may access the information at a later time.

In order to initiate the remittance transaction, the sender may tap the send money option or selectable element 582 of FIG. 5M. For example, in response to a detected interaction with the send money option or selectable element 582, the network application 204 may utilize the submitted information (e.g., the transaction information 576, the recipient information 577, and the sender information 578) to interface with the remittance network 115 in order to process the remittance transaction. However, in one or more embodiments and prior to interfacing with the remittance network 115, the network application 204 may determine additional risk level for the requested remittance transaction.

For example, in one or more embodiments, the network application 204 may determine a risk level for the requested transaction. In a particular embodiment, the determined risk level for the requested transaction may fall within one of five predetermined ranges. For instance, the network application 204 may handle the requested transaction differently depending on the range within with the risk level for the requested transaction falls. In one or more embodiments, a no risk level (e.g., a risk level of 0-1) may fall into the "pass" range, a low risk level (e.g., a risk level of 2-4) may fall into the "verify messaging system account" range, an intermediate risk level (e.g., a risk level of 5-6) may fall into the "pause for review" range, a high risk level (e.g., a risk level of 7-8) may fall into the "pause for proof of identity" range, and an extreme risk level (e.g., a risk level of 9-10) may fall into the "blocked" range. Each range will be discussed in more detail below.

Requested remittance requests with a risk level in the "pass" range will be processed by the network application 204 without any further action on the sender's part. For example, in one or more embodiments, the network application 204 will assign a no risk level to a remittance transaction when the network application 204 has determined both the sender and the recipient have low or no risk level. As discussed above, the network application 204 determines risk level for senders and recipients based on social network interactions, relationship coefficients, and transaction histories. Additionally, the network application 204 may take social network usage into account. For example, if the sender and/or the recipient have made regular usage of the social network over a fairly long period of time, the network application 204 is less likely to assign the sender and/or recipient a high-risk level.

Requested remittance requests with a risk level in the "verify messaging system account" range may require further confirmation from the sender before processing. For example, the network application 204 may assign a low risk level to a remittance transaction request if the network application 204 identifies information indicating the sender's messaging system account might be compromised. For instance, information maintained by the message database 234 may indicate atypical activities in the sender's messaging system account such as, but not limited to, frequent messaging with co-users who have not been members of the social network for very long, increased remittance requests to new co-users, posts and messages from the sender's social network account containing advertisements or pornography, etc.

In one or more embodiments, the network application 204 may require the sender to complete a challenge in order to prove the sender's messaging system account has not been compromised. For example, the network application 204 may send a code or challenge question (e.g., a Captcha challenge) based on the sender's social network profile or the sender's list of co-users. In one or more embodiments, the network application 204 may send the code or challenge to the sender via email or text message. In a particular embodiment, the network application 204 may proceed with processing the requested remittance transaction in response to the sender successfully responding to the code or challenge. If the sender cannot successfully respond to the code or challenge, the user interface manager 206 can update the review interface 574 to inform the sender that the requested remittance transaction is blocked.

Requested remittances with a risk level in the "pause for review" range may require further manual review before processing. For example, the network application 204 may assign an intermediate risk level to a remittance transaction request if the network application 204 determines a possible problem with the transaction. Possible remittance transaction problems may include, but are limited to, a problem with the method by which the sender is funding the remittance (e.g., the sender does not have enough money to fund the remittance), or a problem with the selected method of remittance (e.g., the selected local agent is no longer operational, the recipient's bank account is no longer active, etc.). If the network application 204 determines there is a problem with the remittance transaction, the network application 204 may send the remittance transaction request to another body for manual review.

When the network application 204 moves the remittance transaction request to manual review, the user interface manager 206 may inform the sender that the request is being reviewed. For example, as shown in FIG. 5N, in response to the network application 204 moving the remittance request to manual review, the user interface manager 206 may provide a transaction overview interface 583 that displays the pending transaction progress indicator 584, showing that the remittance request is currently "In Review." In one or more embodiments, the user interface manager 206 may also include information informing the sender of when a result may be expected, or a customer contact the sender may utilize. In response to a detected interaction with the "OK" option or selectable element 585, the user interface manager 206 may provide the recipient selection interface 540, as in FIG. 5F.

Upon completion of the manual review, the network application 204 may provide the result of the manual review to the sender. For example, if the manual review indicates the remittance request may proceed, the network application 204 may inform the sender via the user interface manager 206 that the remittance request will proceed. In one or more embodiments, if the manual review indicates the remittance request is denied, the user interface manager 206 may provide an interface that indicates to the sender that the remittance transaction request has been blocked by the network application 204.

Figure 5O:
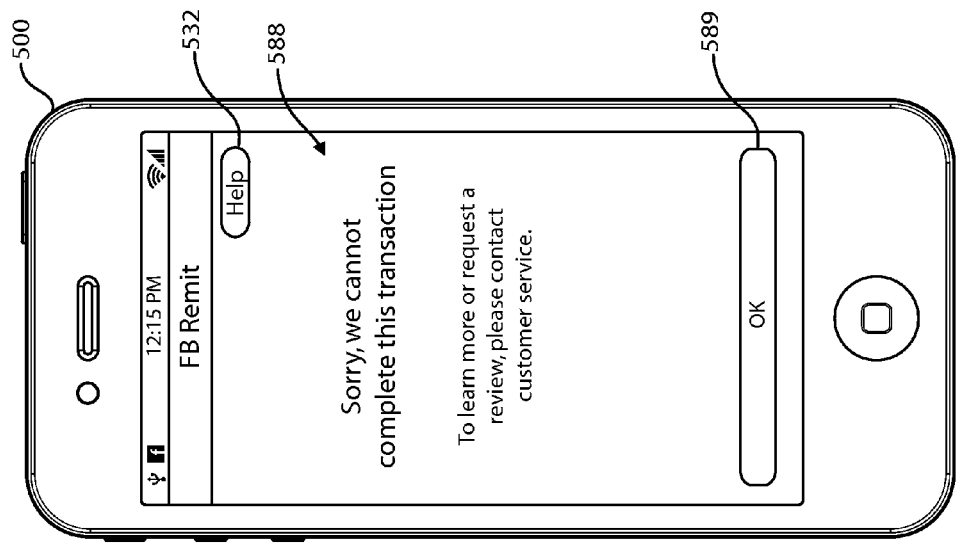
Figure 5P:
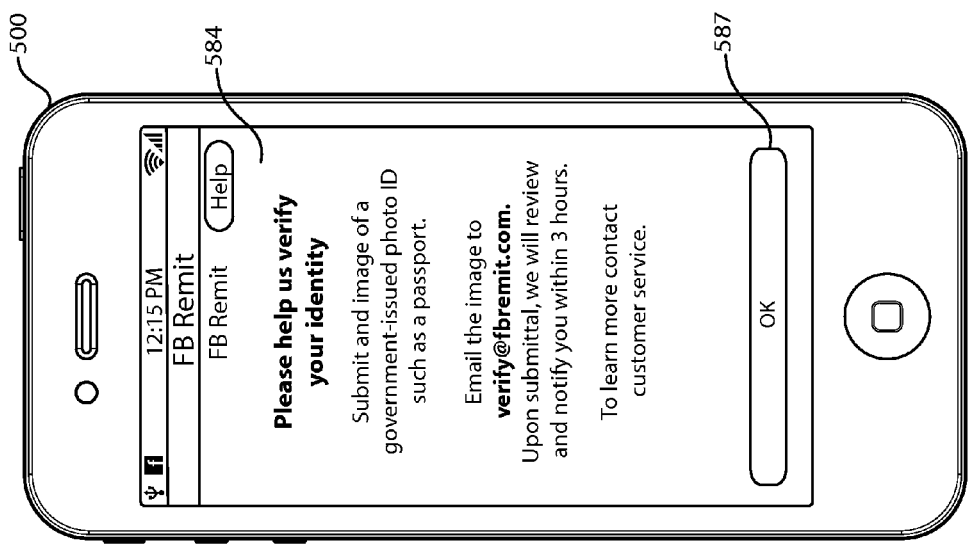

For example, as shown in FIG. 5P, in response to the network application 204 blocking a remittance request, the user interface manager 206 may provide a blocked interface 588 that includes a message informing the sender that the remittance transaction cannot continue. In one or more embodiments, the sender may access further information regarding the determination to block the transaction by tapping the help option or selectable element 532. In response to a detected interaction with the "OK" option or selectable element 589, the user interface manager 206 may provide the recipient selection interface 540, as in FIG. 5F. In one or more alternative embodiments, the network application 204 may notify the sender of the success or failure of the manual review via email or text message.

Requested remittance requests with a risk level in the "pause for proof of identity" range may require further information from the sender before processing. For example, the network application 204 may assign a high-risk level to a remittance transaction request if the network application 204 determines a possible problem with the sender's identity. In other words, the network application 204 may have determined a realness score that indicates the sender is not a real person, or is not the person the account being used is assigned. In order to satisfy the identity proof requirement, the network application 204 may require the sender to submit an image of a photo ID (e.g., such as a passport, or other government issued ID).

For example, as shown in FIG. 5O, in response to the network application's 204 determination that a photo ID is needed, the user interface manager 206 may provide an identity confirmation interface 584 with a message informing the sender that the sender must submit an image of a government-issued photo ID. In one or more embodiments, the network application 204 may accept a submitted image via an email. In one or more alternative embodiments, the user interface manager 206 may include one or more photo input controls for facilitating direct input of the required image. In one or more embodiments, once the sender submits the required image, the network application 204 may move the transaction remittance request to manual review, and inform the sender accordingly. If the sender does not provide the required image in a predetermined amount of time, the network application 204 may block the remittance transaction request, as discussed above with reference to FIG. 5P.

The network application 204 may not process requested remittance transactions with a risk level in the "blocked" range. For example, the network application 204 may assign an extreme risk level to a remittance transaction request if the network application 204 determines either the sender and/or the recipient is a known to engage in fraudulent activity. In one or more embodiments, the network application 204 may make this determination based on information maintained by the message database 234, the user profile database 246, the transaction database 244, and/or by information communicated from the remittance network 115. In one embodiment, the network application 204 may block senders and/or recipients who have previously been blocked. In response to the network application 204 determining that the remittance will be blocked, the user interface manager 206 may provide the blocked interface 588 that includes a message to that effect, as in FIG. 5P as described above.

Figure 5Q:
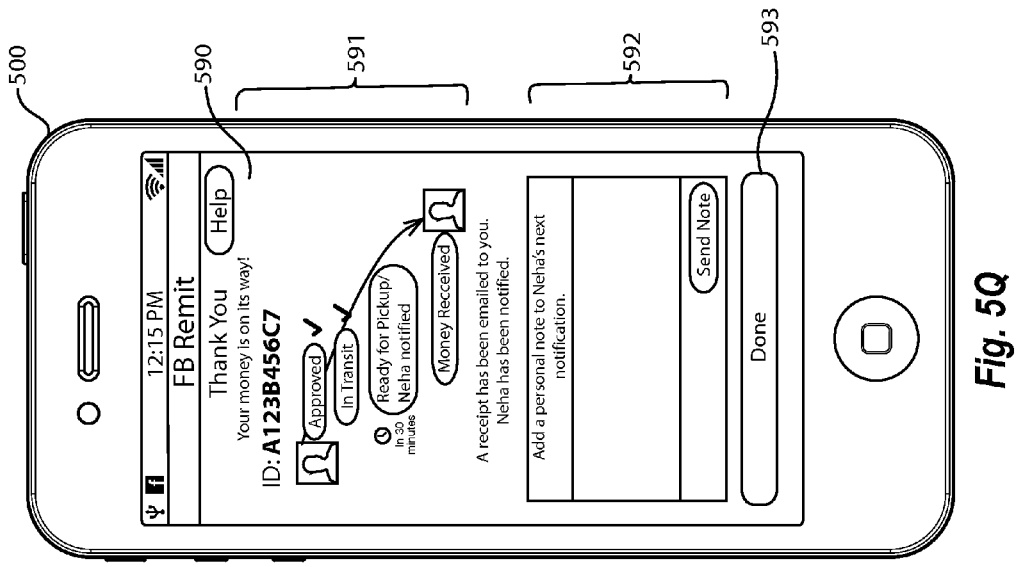

In response to the network application 204 determining that the remittance transaction request may proceed, the user interface manager 206 may provide a confirmation to the sender. For example, as shown in FIG. 5Q, the user interface manager 206 may provide a confirmation interface 590 to confirm the remittance for the sender. In one or more embodiments, the user interface manager 206 may display a pending transaction progress indicator 591 and a message input control 592. As discussed above, the network application 204 may provide this confirmation to the sender and/or recipient in a social network notification. In one embodiment, the network application 204 may add a personal note to the remittance in response to the sender adding text to the message input control 592. In response to the sender tapping the done option or selectable element 593, the user interface manager 206 may provide the recipient selection interface 540, as in FIG. 5F.

FIGS. 5E-5Q illustrate an embodiment for remitting funds to a recipient suggested by the network application 204, as shown in FIG. 5F. However, as mentioned above, in additional or alternative embodiments, the sender may search for a specific recipient, rather than choosing a recipient suggested by the network applications 204. For example, as shown in FIG. 6A, the user interface manager 206 may provide a search interface 600a including the help option or selectable element 530, the search input box 542, and an input keyboard 520. In one or more embodiments, the user may utilize the input keyboard 526 to start typing in the name of an intended remittance recipient.

In response to the detected typing on the input keyboard 520, the network application 204 may identify potential recipients who match the name being input by the user. For example, as shown in FIG. 6B, in response to the user typing "Vil" via the input keyboard 520 in FIG. 6A, the network application 204 identifies a suggested recipient list 604 including potential recipient's whose names include the letters "Vil." In one or more alternative embodiments, the user interface manager 206 may not present the suggested recipient list 604 in alphabetical order, but rather may present the potential recipients according to their identified risk levels, the relationship coefficients they have with the sender, and/or their country of residence, as discussed above.

In response to a detected interaction between the sender's finger and potential recipient from the suggested recipient list 604, the network application 204 may determine a risk level for the selected recipient. For example, as shown in FIG. 6B, the user has selected "Francesca Villanueva" from the suggested recipient list 604. In one or more embodiments, in response to this selection, the network application 204 may determine a risk level for the selected recipient based on factors such as the interactions between the selected recipient and the sender, relationships between the selected recipient and the sender, a realness score, and/or a relationship coefficient, as discussed above.

Based on the determined risk level for the selected recipient, the network application 204 may proceed in one of a variety of ways. For example, if the network application 204 determines a low or no risk level associated with the selected recipient, the network application 204 may allow the remittance transaction to simply proceed. Alternatively, if the network application 204 determines an intermediate risk level associated with the selected recipient, the network application 204 may allow the remittance transaction to proceed with certain limitations. In one or more embodiments, the network application 204 may place limitations on a remittance transaction such as a limit on the remittance amount (e.g., $2999 USD or less), or a limit on the countries a remittance may be sent to (e.g., if a selected recipient is active in multiple countries, she may only receive remittances in one country).

Alternatively, if the network application 204 determines a high-risk level associated with the selected recipient, the network application 204 may block the remittance transaction. For example, as shown in FIG. 6C, in response to a determination that a high-risk level is assigned to the selected recipient, the user interface manager 206 may provide a blocked interface 606 including a message informing the sender that the remittance transaction cannot proceed. In one or more embodiments, the sender may access further information regarding the transaction block by tapping the help option or selectable element 530. In response to the network application 204 blocking the remittance transaction, the sender may return to the messaging graphical user interface 510, as shown in FIG. 5B, by tapping the return option or selectable element 608.

If however, the network application 204 determines the remittance transaction may proceed according to a no, low, or intermediate risk level associated with the selected recipient, the network application 204 may next determine whether the selected recipient lives in a supported country. As discussed above, the network application 204 may only support remittances in certain countries. In one or more embodiments, the network application 204 may determine where the selected recipient lives by analyzing data maintained by the user profile database 246, provided by the location detector, or the social graph 250. If the network application 204 determines that the selected recipient does not live in a supported country, the network application 204 may request that the sender remit funds to the selected recipient in a supported country.

Figure 6D:
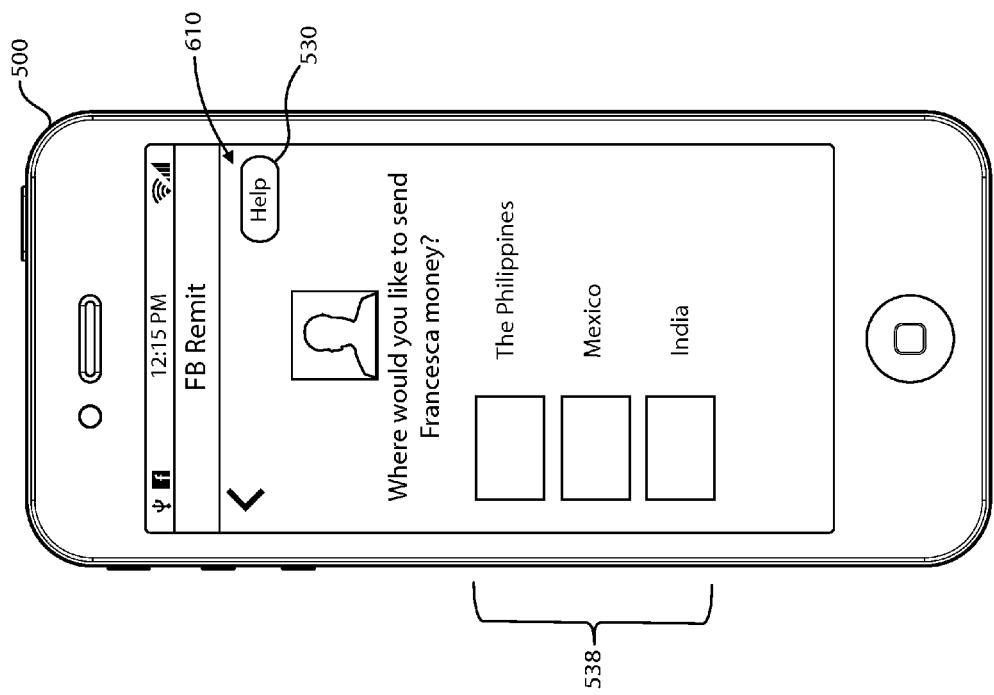
Figure 6C:
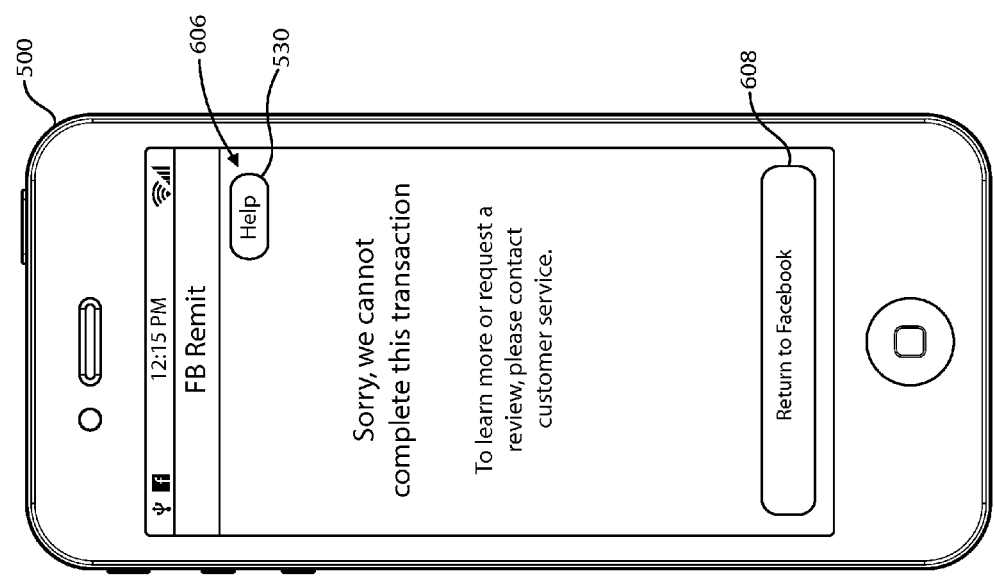

For example, as shown in FIG. 6D, the network application 204 has determined that the selected recipient, "Francesca Villanueva," does not live in a supported country. In response to this determination, the user interface manager 206 may provide a country selection interface 610 including a list of serviced country indicators 538 along with the help option or selectable element 530. In one or more embodiments, the sender may select one of the serviced country indicators 538, thus indicating to the network application 204 that the selected recipient's remittance funds will be processed in the selected country, rather than in the country of the selected recipient's residence. At this point the user interface manager 206 can provide the remittance calculation interface 546, as shown in FIG. 5G. From which point, the remittance process can proceed as outline above in relation to FIGS. 5G-5Q.

As mentioned above, rather than inputting the recipient's information, the sender may request that the recipient provide the information. In light of the fact that the sender may not know the requested information and/or the recipient may not want to share the requested information, it may be easier and more secure for the network application 204 to obtain the requested information directly from the selected recipient. For instance, in response to the sender taping the recipient request link 560 as shown in FIG. 5I, the user interface manager can provide a recipient contact interface 700, as shown in FIG. 7A.

The recipient contact interface 700 may include an open messenger option or selectable element 702, a send message option or selectable element 704, a send email option or selectable element 706, and a send SMS option or selectable element 708. The recipient contact interface 700 may also include the help option or selectable element 530. In one or more embodiments, the sender may activate various controls by tapping any of the options or selectable elements 702, 704, 706, and 708. For example, in response to the sender tapping the open messenger option or selectable element 702, the user interface manager 206 may provide the messaging graphical user interface 510, as shown in FIG. 5B. Thus, the sender may communicate directly with the recipient in the messaging graphical user interface 510 in order to gather the necessary recipient information directly from the recipient. For example, the sender and ask the user for the needed or desired information via an electronic message. The sender can then enter the provided information into the recipient information user interface 556a, 556b as provided by the user.

Alternatively, in response to the sender tapping the send message option or selectable element 704, the user interface manager 206 may provide text input controls for the sender to compose a social media message. The network application 204 may send the composed social media message directly to the recipient via the social network. Similarly, in response to the sender tapping the send email option or selectable element 706, the user interface manager 206 may provide text input controls for the sender to compose a standard email to send to the recipient at an email address stored in the user profile database 246. Additionally, in response to the sender tapping the send SMS option or selectable element 708, the user interface manager 206 may provide text input controls for the sender to compose a text message to deliver to the recipient at a phone number associated with the recipient.

In one or more embodiments, in response to the sender selecting any of the contact methods described above with regard to FIG. 7A, the recipient may receive a notification at a mobile device associated with the recipient. For example, as shown in FIG. 7B, in response to the sender tapping the send message option or selectable element 704, as shown in FIG. 7A, the recipient may receive a notification at a mobile device 500a. In one or more embodiments, the user interface manager 206 associated with the recipient may provide a notification interface 718 containing a list of notifications 714. In an embodiment, the user interface manager 206 may display the notification interface 718 in response to the user tapping the notification option or selectable element 710. Additionally, in an embodiment, the user interface manager 206 may provide a notification indicator 712 superimposed over the notification option or selectable element 710, so as to inform the recipient that there is a new notification.

In one or more embodiments, the user interface manager 206 may organize the list of notifications 714 in a variety of manners. For example, the user interface manager 206 may organize the list of notifications 714 chronologically (e.g., first-in-first-out), by alphabetically (e.g., by sender), by type (e.g., by comments, "likes," remittances, etc.), and so on. In response to a user tapping any of the notifications in the list of notifications 714, the user interface manager 206 may provide an interface with further information related to the selected notification.

For example, as shown in FIG. 7B, in response to a user tapping the notification 716 containing the message, "Rupal Sharma wants to send you a remittance . . . ," the user interface manager 206 may provide the recipient with the recipient information interfaces 556a, 556b as illustrated in FIGS. 5I and 5J. Thus, the recipient may provide the needed recipient information without having to share potentially sensitive information with the sender, or having to store the information in the user profile database 246. Once the recipient has provided the recipient information, the sender may receive a similar notification as illustrated in FIG. 7B, informing the sender that the recipient has provided the recipient information and that the remittance process will proceed to the next step.

Furthermore, in one or more embodiments, the network application 204 may continuously monitor the exchange rate between the sender's country and the recipient's country. It is possible that if the recipient does not immediately provide the needed recipient information, as notified in FIG. 7B, that the exchange rate between the sender's country and recipient's country might change. In that case, rather than proceeding to the sender information interfaces 566a and 566b as the next step in the remittance process, the user interface manager 206 may provide the calculation interface 546, as shown in FIG. 5G. Thus, utilizing the calculation interface 546, the sender may alter the remittance amount in order to provide more or less remittance funds to the recipient, depending on the currency exchange rate.

Figure 8B:
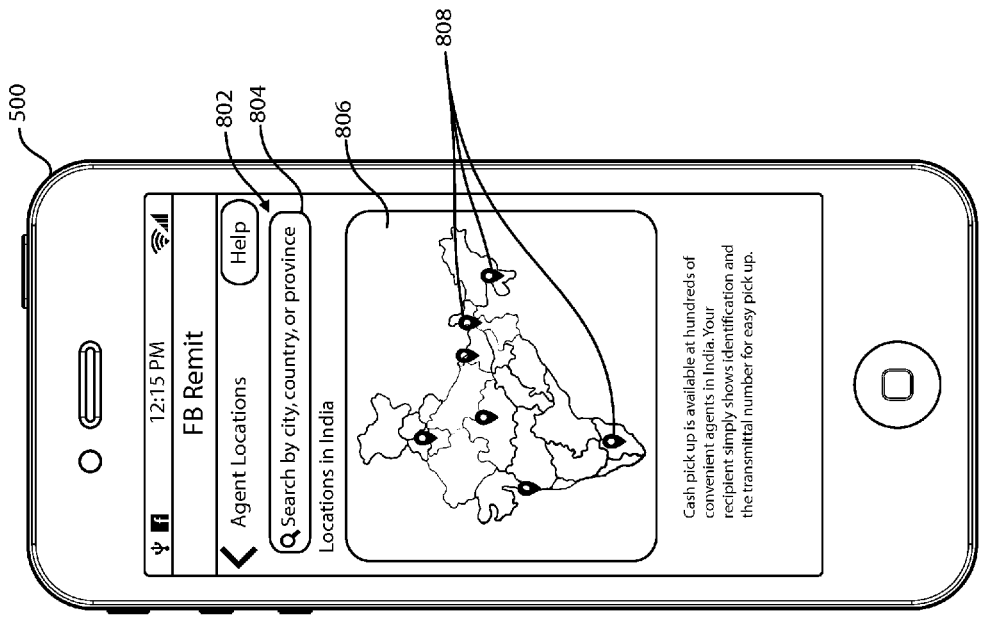
FIGS. 8A-8C illustrate user interfaces for preforming a remittance using an agent in accordance with one or more embodiments.
Figure 8A:
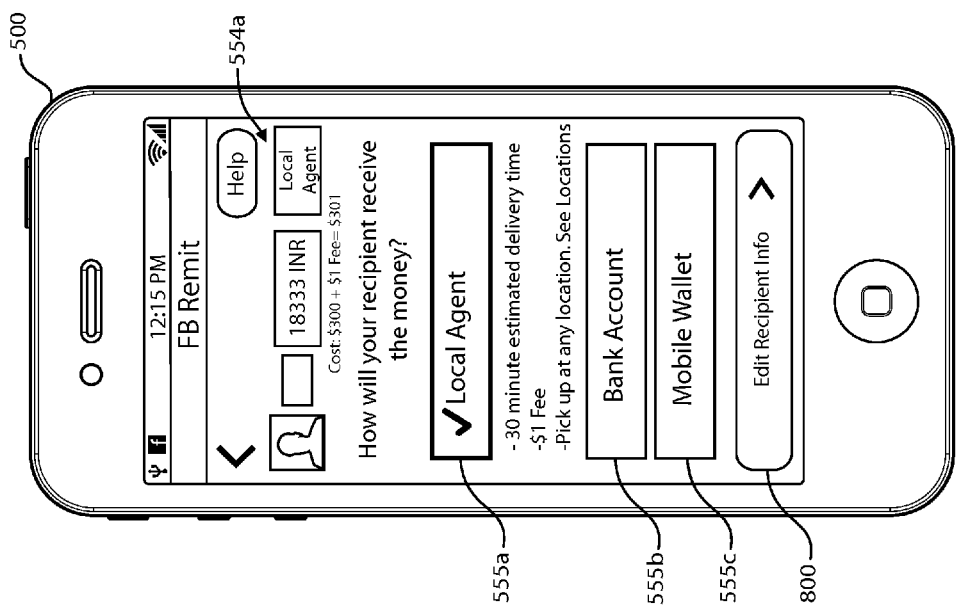

As mentioned above, with reference to FIG. 5H, the sender may select one of several remittance methods. Also as mentioned above, the sender may select the "local agent" method of remitting funds. For example, as shown in FIG. 8A, the user interface manager 206 may provide the remittance method selection interface 554a listing the remittance methods 555a, 555b, 555c. In response to a detected user interaction with the local agent remittance method indicator 555a, the user interface manager 206 may provide a list of information associated with this remittance type below the local agent remittance method indicator 555a. In one or more embodiments, selecting the location agent remittance method indicator 555a means the network application 204 will direct the remittance to be transferred to the recipient via a local agent.

However, before the network application 204 can proceed with the local agent method of remittance, the network application 204 may need further information. For example, in response to a detected user interaction with an edit recipient info option or selectable element 800 in FIG. 8A, the user interface manager 206 may provide a local agent selection interface 802, as shown in FIG. 8B. In one or more embodiments, the local agent selection interface 802 can include a search input box 804 and a selectable map display 806. In one or more embodiments, the user interface manager 206 can provide the search input box 804 and the selectable map display 806 in order to facilitate the sender selecting a local agent location where the remitted funds may be delivered. In one embodiment, the user interface manager 206 may provide a list of agent locations in response to the sender entering search terms into the search input box 804. The network application 204 may provide possible agent locations to the user interface manager 206.

In another embodiment, the user may select an agent location using the selectable map display 806. For example, as shown in FIG. 8B, the network application 204 may provide agent location information to the user interface manager 204 along with a geographic area associated with the selected recipient. In one or more embodiments, the user interface manager 204 may generate the selectable map display 806 with one or more agent location indicators 808 superimposed over the provided geographic area. Thus, in one embodiment, the sender may select an agent location via one of the agent location indicators 808.

In further embodiments, the network application 204 can detect the location of a client device 104b associated with the recipient. The network application 204 can then provide the location to the client application 202 of the sender's client device 104a. In such embodiments, the selectable map display 806 can provide an indication of the location of the recipient as well as the location of location agents where the recipient can retrieve or pick up a remittance. One will appreciate in light of the disclosure herein that this can allow the sender to select the local agent nearest to the current location of the recipient.

Figure 8C:
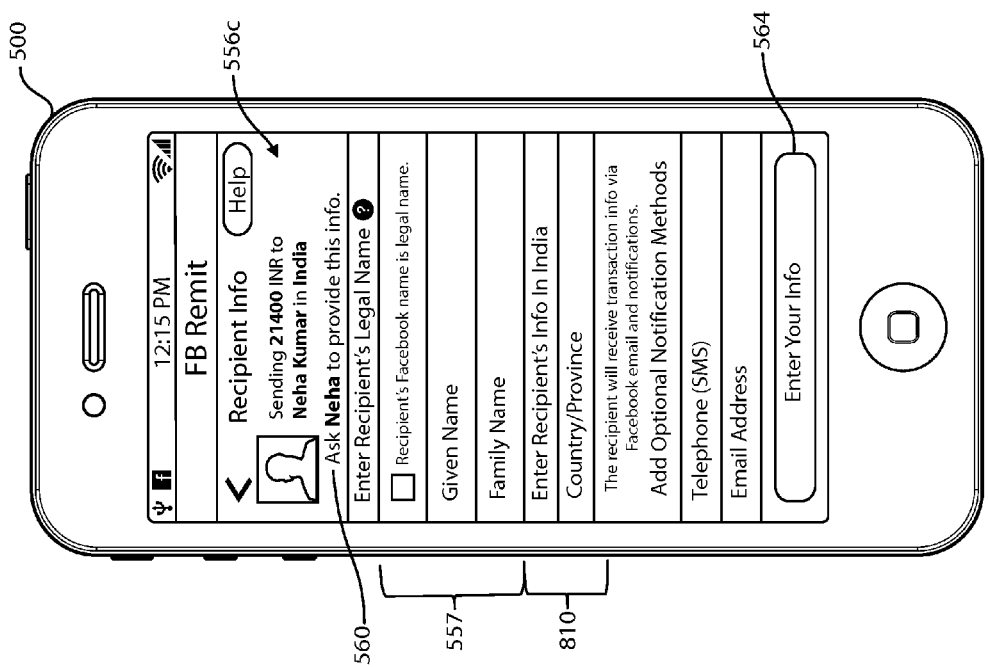

If the user selects the local agent method of remittance, the network application 204 may require different recipient information than that described above with regard to FIGS. 5I and 5J. For example, as shown in FIG. 8C, the user interface manager 206 may provide a different embodiment of the recipient information interface 556c that includes text fields for the sender to enter the recipient's name information 557, as well as the recipient's location information 810 relative to the local agent selected in FIG. 8B. As described above, the sender may request the recipient provide the necessary information by tapping the recipient request link 560. Once the sender or recipient provides the necessary recipient information, the remittance process may process in response to the sender tapping the sender information option or selectable element 564.

The recipient selection process described above with reference to FIGS. 5E and 5F includes steps for a sender who is remitting funds to a recipient for the first time. However, in one or more alternative or additional embodiments, the sender may remit funds to a recipient to whom the sender has previously remitted funds. In that case, as described above with reference to FIGS. 5C and 5D, the sender may provide login credentials and the network application 204 may perform an initial risk check to determine whether the sender may remit funds.

Figures 9A, 9B:
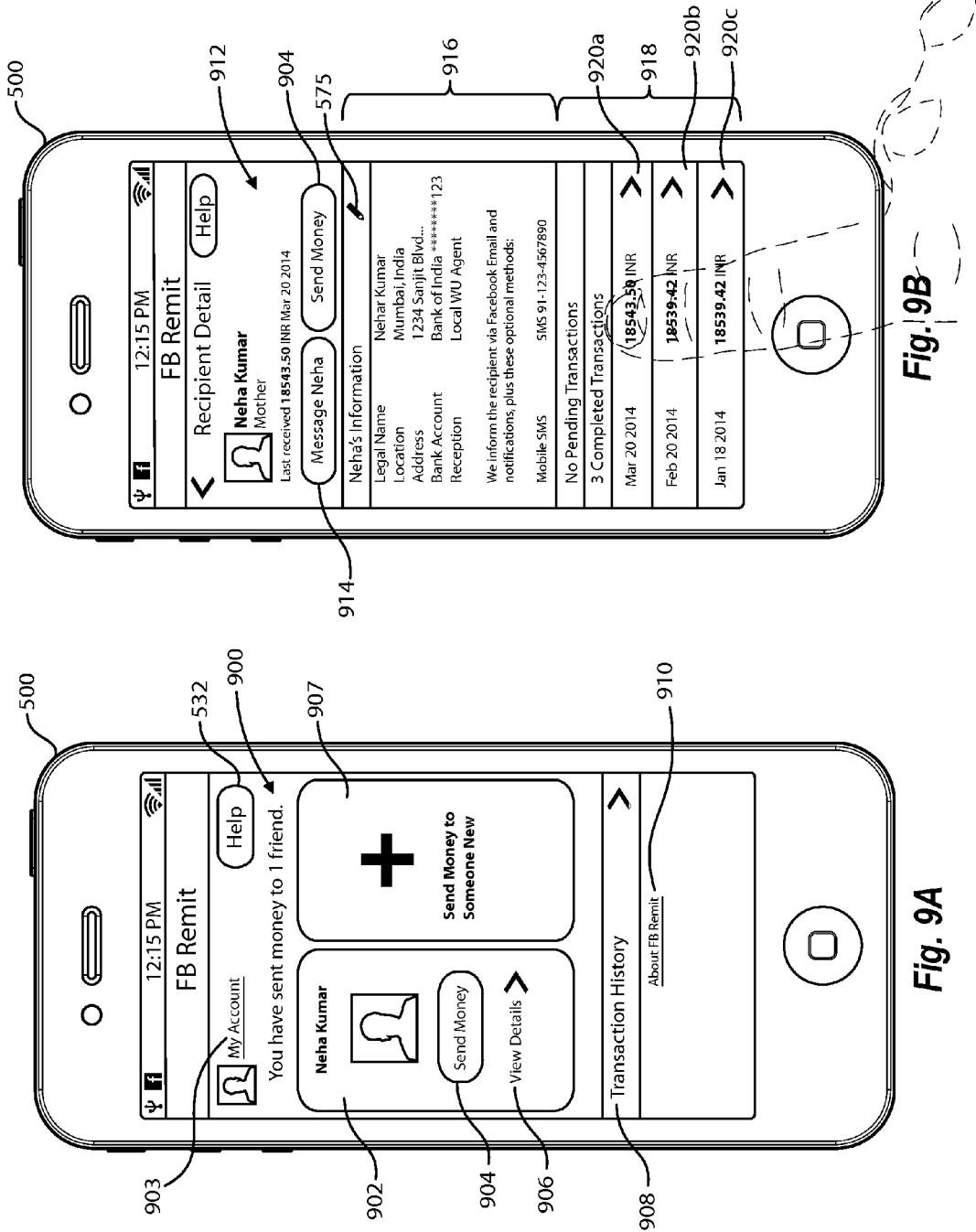

If the sender's login credentials are accepted and the risk level associated with the sender is not higher than a predetermined threshold, the user interface manager 206 may provide a previous recipient selection interface 900 to allow the sender to select a recipient. As shown in FIG. 9A, the sender may have previously remitted funds to one recipient. In one or more embodiments, the previous recipient selection interface 900 may include a previous recipient profile 902, as well as a new recipient indicator 907 along with a transaction history option or selectable element 908, a view details link 906, an account link 903, and the help option or selectable element 532. It should be noted that by providing the previous recipient profile 902, the network application 204 may be indicating either that the sender has once remitted funds to the recipient associated with the previous recipient profile 902, or that the sender has made multiple remittances to the recipient associated with the previous recipient profile 902.

The network application 204 may provide previous recipient information to the user interface manager 206. For example, as shown in FIG. 9A, the user interface manager 206 includes the previous recipient profile 902 as part of the previous recipient selection interface 900. In one or more embodiments, the previous recipient profile 902 includes information such as, but not limited to, a previous recipient's name, a profile picture associated with the previous recipient, and a send option or selectable element 904. In one or more embodiments, the sender may initiate a remittance of the same amount previously remitted to the recipient associated with the previous recipient profile 902 by simply selecting the send option or selectable element 904. Additionally in other embodiments, the previous recipient profile 902 may also include additionally information such as the remittance amount of the most recent remittance transaction, the residence or location of the featured recipient, a relationship between the featured recipient and the sender (e.g., "mother," "best friend," etc.). Alternatively, additional information regarding the featured recipient may be accessed via a detected interaction with the view details link 906.

Upon a detected interaction with the view details link 906, the user interface manager 206 may provide a more complete overview of the sender's remittance relationship with the featured recipients. For example, as illustrated in FIG. 9B, the user interface manager 206 may provide a remittance overview interface 912 including recipient information 916, as well as recipient transaction information 918. In one or more embodiments, recipient information 916 may include information such as the recipient's legal name, location, address, bank account information, preferred transaction method (i.e., wire transfer, bank account, mobile wallet), email address, and mobile SMS. Additionally, in one or more embodiments, the recipient transaction information 918 may include a listing of completed and pending remittance transactions. Furthermore, in one or more embodiments, the sender may edit the recipient information 916 by selecting the edit option or selectable element 575.

From the user interface illustrated in FIG. 9B, the sender may initiate a messaging session with the featured recipient or may proceed with the remittance transaction. For example, as shown in FIG. 9B, the user interface manager 206 may include a send option or selectable element 904 and/or a message option or selectable element 914 as part of the remittance overview interface 912. In one or more embodiments, the sender may initiate a remittance transaction with the featured recipient by interacting with the send option or selectable element 904. Additionally, the sender may initiate a messaging session with the featured recipient by interacting with the message option or selectable element 914. In response to a detected user interaction with the message option or selectable element 914, the user interface manager 206 may update the display of the mobile device 500 to include the messaging graphical user interface 510 of FIG. 5B. Thus, in one or more embodiments, the sender may communicate directly with the featured recipient before initiating the remittance transaction.

In one or more embodiments, the user interface manager 206 can include one or more selectable transaction indicators 920a-920c as part of the recipient transaction information 918. For example, in response to a detected interaction with the transaction indicator 920a as shown in FIG. 9B, the user interface manager 206 can provide a specific transaction detail interface 912 including specific transaction details, as shown in FIG. 9C. As illustrated in FIG. 9C, the network application 204 may provide to the user interface manager 206 specific transaction details stored by the transaction database 244. In one or more embodiments, the user interface manager 206 may display a specific transaction detail interface 922 including specific transaction details 924 such as, but not limited to, the status of the transaction (e.g., "completed," "in progress," "pending," etc.), any fees associated with the transaction, the total cost of the transaction (i.e., remittance plus fees), the dates the transaction was sent and received, and the reception method of the remittance. The user interface manager 206 may include information regarding the remittance, fees, and total costs in various currencies (e.g., remittance may be listed in the currency of the recipient, while the fees and total costs are listed in the currency of the sender).

Although not illustrated in FIG. 9B, the network application 204 may provide a selectable option to automate the remittance process for a particular recipient. For example, a sender may make regular remittances to a particular recipient in the same amount. In one or more embodiments, the network application 204 may analyze the recipient transaction information 918 to determine that regular remittances are made to the selected recipient in the same amount. In response to this analysis, the network application 204 may provide the sender the option to automatically continue the regular remittances. In that case, the "turn on" the automatic remittances for the selected recipient, which will continue indefinitely until the sender "turns off" that option.

With reference again to FIG. 9A, the user interface manager 206 may also include a new recipient indicator 907. For example, as shown in FIG. 9A, the user interface manager 206 can include the new recipient indicator 907 such that the sender may initiate a first-time remittance transaction for a new recipient. In one or more embodiments, in response to a detected interaction with the new recipient indicator 907, the user interface manager 206 may provide the destination selection user interface 536, as shown in FIG. 5E.

In one or more embodiments, the sender may have transacted remittances with two or more recipients. For example, as shown in FIG. 9D, the user interface manager 206 may provide previous recipient selection interface 900a including previous recipient profiles 902 and 902a. In one or more embodiments and as discussed above, the sender may access information specific to each featured recipient of the previous recipient profiles 902 and 902a by selecting one of the previous recipient profiles 902 and 902a. In an alternate embodiment, the sender may have previously remitted funds to more than two recipients. In that embodiment, the user interface manager 206 may provide two or more previous recipient profiles 902 in a list that is scrollable, grouped into subgroups, or otherwise organized and viewable.

In addition to the other elements discussed above, the user interface manager 206 may provide an account link 903 as part of the previous recipient selection interface 900a. For example, as shown in FIG. 9D, the user interface manager 206 may include the selectable account link 903. Although shown in FIG. 9D at the top of the previous recipient selection interface 900a, the user interface manager 206 may display the selectable account link 903 at any location within the previous recipient selection interface 900a.

In response to a detected selection of the account link 903 in FIG. 9D, the user interface manager 206 may provide an account overview including account information associated with the sender. For example, as illustrated in FIG. 9E, the user interface manager 206 may provide an account overview interface 926 including sender account information 928. In one or more embodiments, the sender account information 928 can include the sender's payment information (e.g., debit card information, bank account information, credit card information, etc.), the sender's personal information (e.g., legal name, address, phone number, email address, etc.), and any privacy settings associated with the sender. Additionally, the sender may edit any of the sender account information 928 by tapping on the edit option or selectable elements 575. In alternative embodiments, the sender account information 928 may include other or additional sender information, such as mobile wallet settings, automated remittance settings, etc. Furthermore, in one or more alternative embodiments, the sender account information 928 may be augmented with sender information taken from a social network profile or identity provided by the user profile database 246.

In one or more embodiments, the sender may have transacted remittances with two or more recipients, and may have one or more pending remittance transactions. For example, as shown in FIG. 9F, the user interface manager 206 may provide the previous recipient selection interface 900b including two or more previous recipient profiles 902 and 902a as well as a pending transaction progress indicator 928. Additionally, the user interface manager 206 may include other elements as part of the previous recipient selection interface 900a such as the help option or selectable element 532, the account link 903 and the transaction history option or selectable element 930.

The network application 204 can provide information to the user interface manager 206 in order to keep the sender apprised of the progress of all pending transactions. For example, as shown in FIG. 9F, the user interface manager 206 can include the pending transaction progress indicator 929 as part of the previous recipient selection interface 900b. In one or more embodiments, the pending transaction progress indicator 929 is a graphical representation of the various complete and incomplete steps in a remittance transaction with a certain recipient. For instance, as shown in FIG. 9F, the pending transaction progress indicator 929 indicates to the sender that the current pending transaction with "ID: A 123B456C7" in the amount of "18200 INR" has been verified and is in transit. In one or more embodiments, the user interface manager 206 may indicate completed steps with a checkmark, a color change, or any similar indicator. The user interface manager 206 may display incomplete steps adjacent to timing indicators (e.g., "in 30 minutes"), indicating when a certain step is scheduled or predicted to occur. In one or more embodiments, as each step of the remittance transaction is completed, the user interface manager 206 may update the pending transaction progress indicator 929 to reflect the step completion.

Figure 9H:
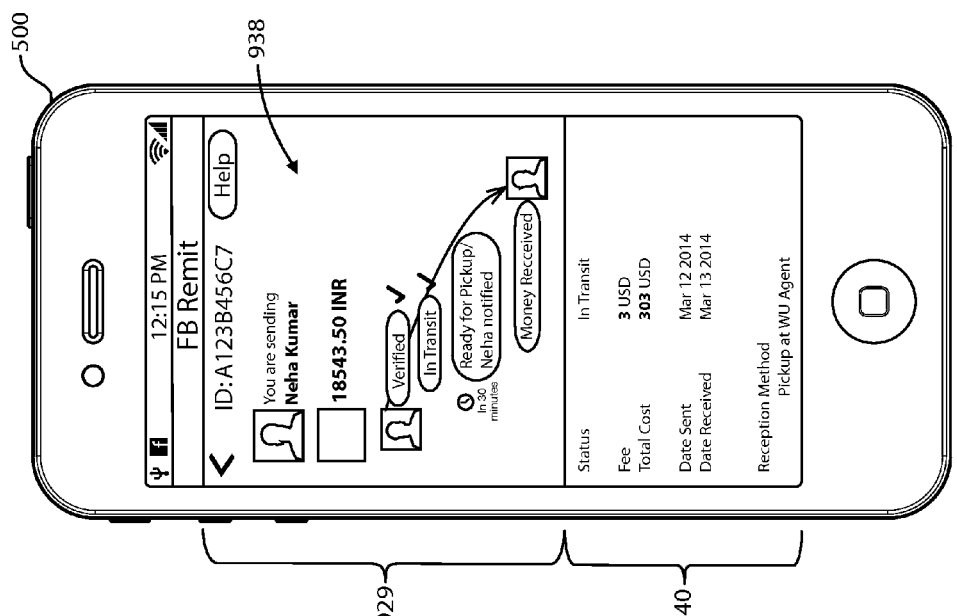
Figure 9G:
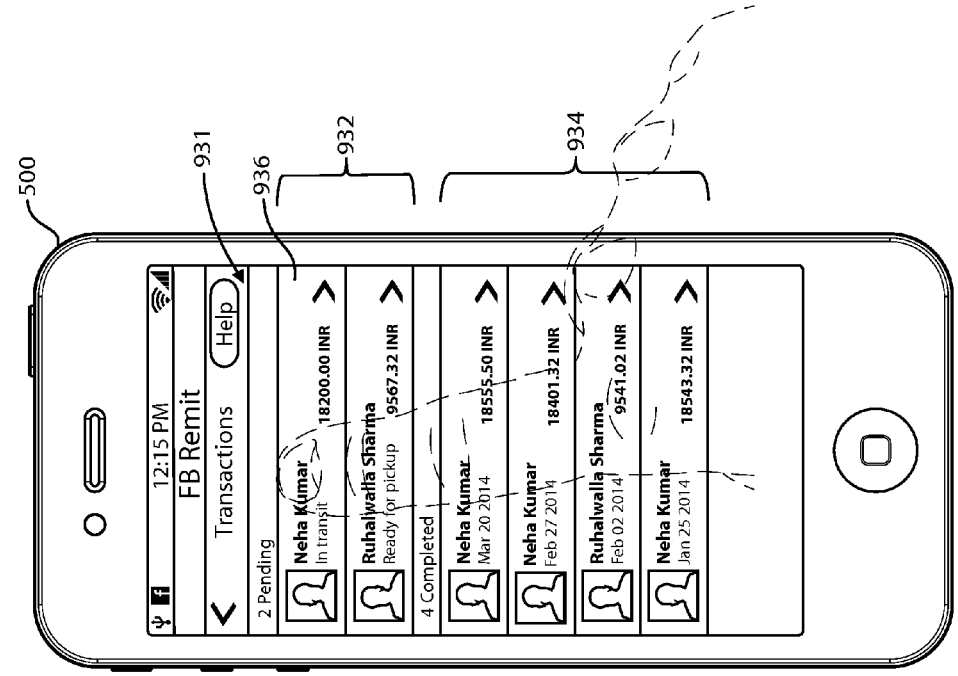

As with FIGS. 9A and 9D, the user interface manager 206 may also provide the transaction history option or selectable element 930 as part of the previous recipient selection interface 900b. In one or more embodiments, and in response to a detected interaction with the transaction history option or selectable element 930, the user interface manager 206 may provide a transaction overview displaying a listing of all remittances transacted by the sender. For instance, as shown in FIG. 9G, the user interface manager 206 may provide a transaction overview interface 931 including a listing of both pending transactions 932 and completed transactions 934. In one or more alternative embodiments, the user interface manager 206 may organize the transaction listing chronologically, according to recipient, and/or may make the transaction listing searchable or filterable. Furthermore, as discussed above, in response to a detected selection of any of the completed transactions 934, the user interface manager 206 may provide the specific transaction detail interface 922, as illustrated with reference to FIG. 9C.

As mentioned above, the sender may also view specific details of pending remittance transactions. For example, in response to a detected interaction by the sender's finger with the pending transaction 936, the user interface manager 206 can provide pending transaction details including specific details regarding the selected pending transaction 936. For instance, as shown in FIG. 9H, the user interface manager 206 can provide a pending transaction detail interface 938 including a pending transaction progress indicator 929 as well as specific transaction details 940. In one or more embodiments, the pending transaction progress indicator 929 of FIG. 9H may indicate the same information as discussed above with regard to FIG. 9F. Alternately or additionally, the pending transaction progress indicator 929 of FIG. 9H may indicate even more information, such as the details associated with each step in the remittance transaction process. In one or more embodiments, the specific transaction details 940 may include status information, fee and cost information, date information, reception method information, and other information pertinent to the transaction.

Figure 9I:
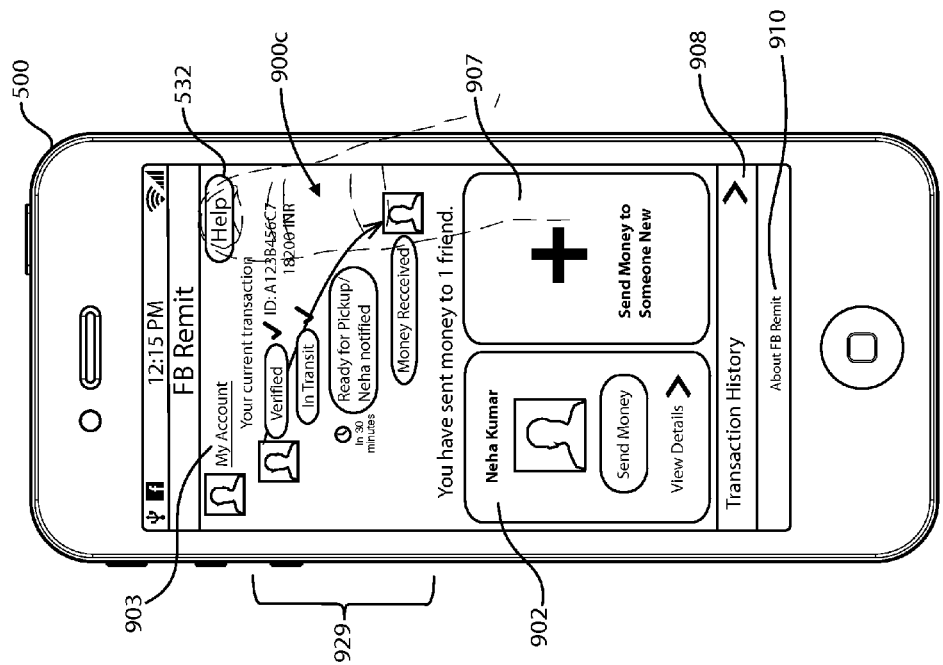

In one or more embodiments, the sender may have completed a remittance with a previous recipient and may have a currently pending remittance transaction. For example, as shown in FIG. 9I, the user interface manager 206 can provide the previous recipient selection interface 900c including the previous recipient profile 902, the new recipient indicator 907, and the pending transaction progress indicator 929, in addition to the help option or selectable element 532, the account link 903, the transaction history option or selectable element 908, and the about link 910. Thus, in one or more embodiments, the sender may view details from previous and pending remittance transactions or initiate a transaction for a new recipient from a single user interface, as described above.

The user interface manager 206 may include the help option or selectable element 532 as part of most of the remittance interfaces. For example, as shown in FIG. 9I, the user interface manager 206 includes the help option or selectable element 532 at the top of the previous recipient selection interface 900c. In one or more embodiments, in response to a detected interaction of the help option or selectable element 532, the user interface manager 206 may provide an interface including one or more information categories. In a particular embodiment, the one or more information categories offer information and support to a sender attempting to remit funds. The one or more information categories may be selectable, scrollable, expandable, etc. In one or more alternative embodiments, the information categories may change depending upon the user interface from which the sender tapped the help option or selectable element 532.

Additionally, the user interface manager 206 may provide extra information and details about the remittance process. For example, in response to a detected user interaction of the about option or selectable element 910, as shown in FIG. 9I, the user interface manager 206 can display various information categories related to the remittance process. Thus, the sender may read about several issues related to the remittance process including the remittance manager network application 204.

It may be assumed, in one or more embodiments described herein, if a sender has remitted funds to a certain recipient in the past, that the risk level associated with that past recipient is sufficiently low. However, in one or more embodiments, the network application 204 may continually calculate risk levels for selected recipients, regardless of whether or not the sender has remitted funds to those selected recipients previously. This may be particularly useful if, for example, subsequent to a first successful remittance, a recipient moves to a non-serviced country, the interaction data between the sender and the recipient changes significantly, the recipient becomes known to be fraudulent, etc.

FIGS. 1-9I, the corresponding text, and the examples, provide a number of different systems and devices for electronically remitting funds via a social network. In addition to the foregoing, embodiments can also be described in terms of flowcharts comprising acts and steps in a method for accomplishing a particular result. For example, FIGS. 10-15 may be performed with less or more steps/acts or the steps/acts may be performed in differing orders. Additionally, the steps/acts described herein may be repeated or performed in parallel with one another or in parallel with different instances of the same or similar steps/acts.

Figure 10:
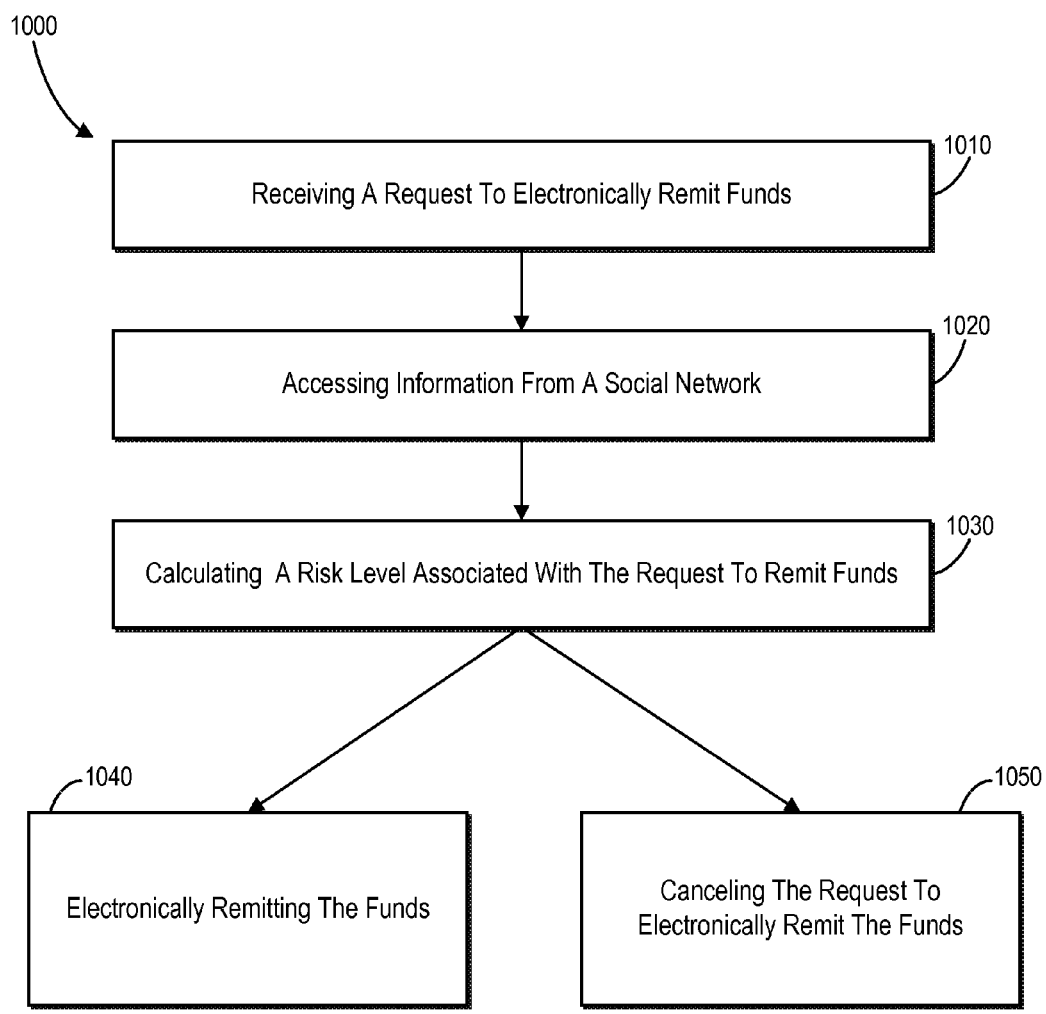
FIG. 10 illustrates a flowchart of a series of acts in a method of performing a risk check as part of a process of performing an electronic remittance.

FIG. 10 illustrates a flowchart of one example method 1000 of electronically remitting funds via a social network. The method 1000 includes an act 1010 of receiving a request to electronically remit funds. In particular, the act 1010 can involve receiving a request, from a sender 102a, to electronically remit funds to a recipient 102b, wherein the sender 102a and the recipient 102b are associated via a social networking system. In one or more embodiments, the request to electronically remit funds to a recipient 102b may be received via a social network control.

The method 1000 further includes an act 1020 of accessing information from a social network. In particular, the act 1020 can involve accessing information from the social networking system about one or more of the sender 102a, the recipient 102b, or a relationship between the sender 102a and the recipient 102b. In one or more embodiments, the accessed information from the social networking system comprises one or more of a number, frequency, or length of social network messages between the sender 102a and the selected recipient 102b, social network posts by the sender 102a that reference the selected recipient 102b, social network posts by the recipient 102b that reference the selected sender 102a, posted social network media that includes or references both the sender 102a and the selected recipient 102b, a number of social network friends common between the sender 102a and the selected recipient 102b, and one or more location check-ins indicating the sender 102a and the selected recipient 102b were in the same geographical area at the same time.

The method 1000 further includes an act 1030 of calculating a risk level associated with the request to remit funds. In particular, the act 1030 can involve calculating a risk level associated with the request to remit funds based on the information from the social networking system. In one or more embodiments, the calculated risk level may place the request to remit funds into one of a plurality of ranges. For example, in one or more embodiments, the plurality of ranges comprises: a pass range, a verify social network account range, a pause for review range, a pause for proof of identity range, and a blocked range.

The method 1000 further includes an act 1040 of electronically remitting the funds. In particular, the act 1040 can involve, if the identified risk level is below a predetermined threshold, proceeding with the request to electronically remit funds to the recipient 102b. In one or more embodiments, the predetermined threshold is an identified risk level of low risk, or no risk.

The method 1000 further includes an act 1050 of canceling the request to electronically remit the funds. In particular, the act 1050 can involve, if the identified risk level is above the predetermined threshold, canceling the request to electronically remit funds to the recipient 102b. In one or more embodiments, the predetermined threshold is an identified risk level of high risk, or extreme risk.

The method 1000 can further involve determining, based on the accessed social network information, at least one of a length of time the sender 102a has been a member of the social network, a country of residence of the sender 102a, or a level of activity the sender 102a has related to a destination country associated with the recipient 102b. In one or more embodiments, the method 1000 can further include using the at least one of the length of time the sender 102a has been a member of the social network, the country of residence of the sender 102a, or the level of activity the sender 102a has related to the destination country associated with the recipient 102b to calculate the risk level. Furthermore, the method 1000 can also involve determining, based on the accessed social network information, at least one of a length of time the recipient 102b has been a member of the social network, the recipient's country of residence, or a level of interaction activity the recipient 102b has had with the sender 102a.

The method 1000 can further involve calculating, based on the accessed social network information, a realness score for the sender 102a, and using the realness score for the sender 102a to calculate the risk level. In one or more embodiments, calculating the realness score for the sender 102a can involve determining one or more of: whether the sender 102a has been tagged in photos posted to the social network, whether co-users of the social network wished the sender 102a happy birthday, a number of messages exchanged between the sender 102a and co-users of the social network, or whether co-users like or comment on posts made by the sender 102a. For example, in one or more embodiments, the realness score of a sender 102a is high if the sender 102a has been tagged in photos posted to the social network, if co-users of the social network have wished the sender 102a happy birthday, if the number of messages exchanged between the sender 102a and co-users of the social network is more than a predetermined amount, and if co-users have liked or commented on posts made by the sender 102a.

The method 1000 can further involve determining a country of residence of the sender 102a and a country of residence of the recipient 102b, wherein the country of residence of the sender 102a and the country of residence of the recipient 102b are different countries. In one or more embodiments, the method 1000 can also include canceling the request to electronically remit funds to the recipient based on one or more of the country of residence of the sender 102a or the country of residence of the recipient 102b being unapproved. For example, in one or more embodiments, one or more of the country of residence of the sender 102a or country of residence of the recipient 102b will be unapproved if the country of residence of the sender 102a or country of residence of the recipient 102b that is not able to receive remittances via the social network.

The method 1000 can also include limiting the amount of funds that the sender 102a can remit to the recipient 102b if the risk level is within a predetermined range. For example, in one or more embodiments, the predetermined range wherein the amount of funds will be limited is a range indicating an intermediate risk level. Additionally, the method 1000 can involve requiring the sender 102a to pass a challenge in order to remit funds to the recipient if the risk level is within a predetermined range. For example, the sender 102a can be required to pass a challenge in order to remit funds if the risk level associated with the request to remit funds is an intermediate risk level. In one or more embodiments, the challenge can include a question based on information in a social network profile for the sender 102a or information from the social network about social network friends of the sender 102a.

Figure 11:
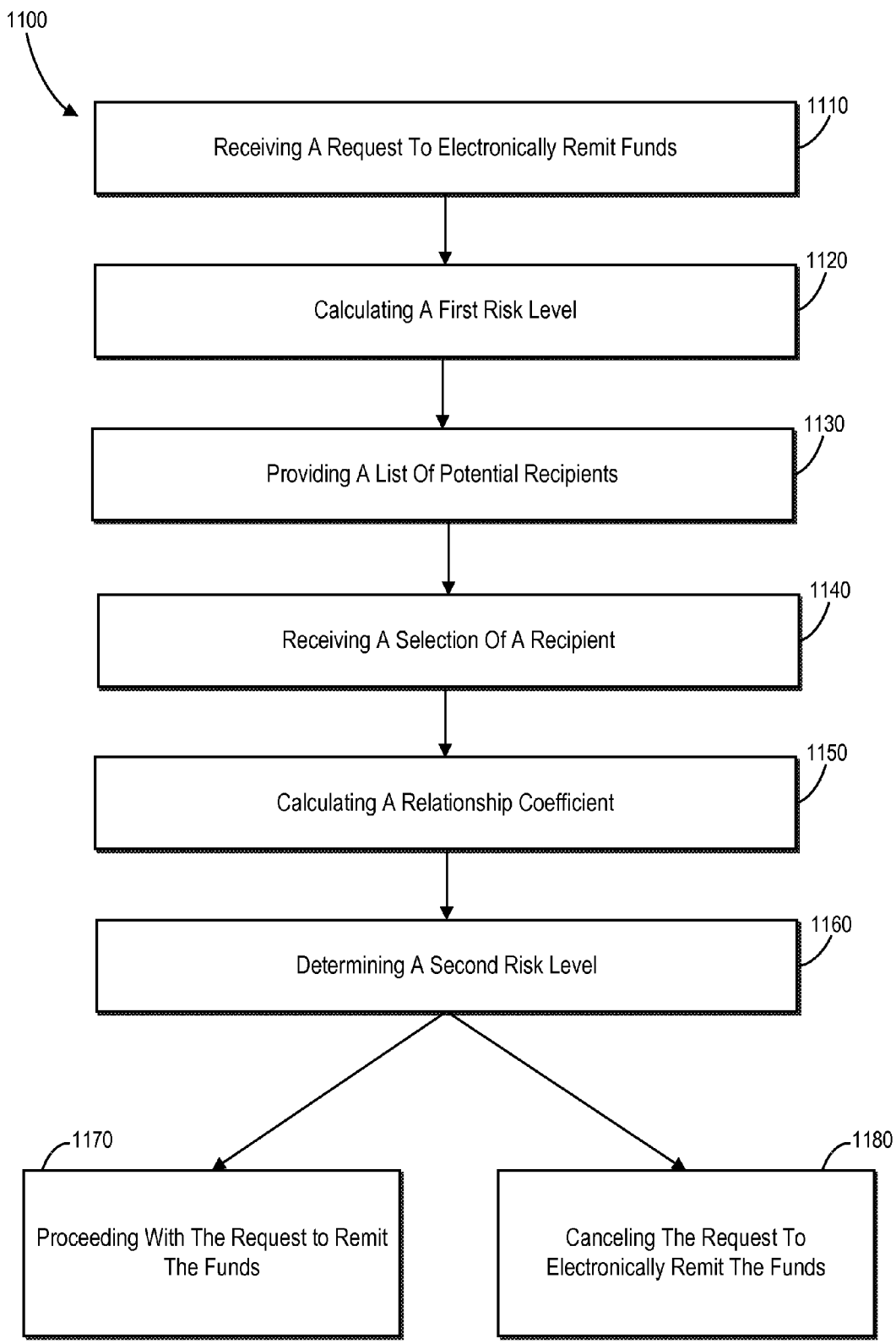
FIG. 11 illustrates a flowchart of a series of acts in a method of performing multiple risk checks as part of a process of performing an electronic remittance.

FIG. 11 illustrates a flowchart of another method 1100 of electronically remitting funds to a recipient via a social network. The method 1100 includes an act 1110 of receiving a request to electronically remit funds. In particular, the act 1110 can involve receiving a request, from a sender 102a, to electronically remit funds. In one or more embodiments, the receiving a request, from a sender 102a, to electronically remit funds can be via a social network message.

The method 1100 can also include an act 1120 of calculating a first risk level. In particular, the act 1120 can involve calculating a first risk level associated with the sender to remit funds. In one or more embodiments, the method 1100 can include determining a length of time the sender 102a has been a member of a social network, a country of residence of the sender 102a, or a level of activity the sender 102a has related to a destination country associated with the recipient 102b, and using the at least one of the length of time the sender 102a has been a member of the social network, the country of residence of the sender 102a, or the level of activity the sender 102a has related to the destination country associated with the recipient 102b to calculate the first risk level. For example, in one or more embodiments, determining a level of activity the sender 102a has related to the destination country associated with the recipient 102b can include determining one or more of: a number of social network friends the sender 102a has from the destination country or whether the sender 102a has visited the destination country.

The method 1100 can further include an act 1130 of providing a list of potential recipients. In particular, the act 1130 can involve providing a list of potential recipients of the funds, based on the first risk level associated with the sender 102a being below a first predetermined threshold. In one or more embodiments, providing the list of potential recipients of the funds can involve determining a plurality of potential recipients likely to be selected by the sender 102a to receive electronically remitted funds and including the potential recipients likely to be selected in the list.

The method 1100 can further include an act 1140 of receiving a selection of a recipient. In particular, the act 1140 can involve receiving a selection of a recipient 102b from the list of potential recipients. In one or more embodiments, receiving a selection of a recipient 102b from the list of potential recipients can also include receiving the selected recipient's social network identifier.

Additionally, the method 1100 can include an act 1150 of calculating a relationship coefficient. In particular, the act 1150 can involve calculating a relationship coefficient representative of a relationship between the sender 102a and the selected recipient 102b. In one or more embodiments, calculating the relationship coefficient representative of the relationship between the sender 102a and the selected recipient 102b comprises analyzing social network interactions between the sender 102a and the selected recipient 102b. For example, analyzing social network interactions between the sender 102a and the selected recipient 102b comprises one or more of analyzing social network activities indicating a strength of the relationship between the sender 102a and the selected recipient 102b or identifying past electronic fund remittances between the sender 102a and the selected recipient 102b. For instance, in one or more embodiments, analyzing social network activities indicating the strength of the relationship between the sender 102a and the selected recipient 102b comprises analyzing one or more of: one or more of a number frequency, or length of social network messages between the sender 102a and the selected recipient 102b, social network posts by the sender 102a that reference the selected recipient 102b, social network posts by the recipient 102b that reference the selected sender 102a, posted social network media that includes or references both the sender 102a and the selected recipient 102b, a number of social network friends common between the sender 102a and the selected recipient 102b, and analyzing location check-ins indicating the sender 102a and the selected recipient 102b were in the same geographical area at the same time.

The method 1100 can also include an act 1160 of determining a second risk level. In particular, the act 1160 can involve determining a second risk level for the request to electronically remit funds based on the identified relationship coefficient between the sender 102a and the selected recipient 102b. In one or more embodiments, the second risk level is low if the identified relationship coefficient is high.

Additionally, the method 1100 can include an act 1170 of proceeding with the request to remit the funds. In particular, the act 1170 can involve proceeding with the request to electronically remit the funds to the recipient 102b, if the second risk level is below a second predetermined threshold. In one or more embodiments, the second risk level is below the second predetermined threshold if the first risk is below the first predetermined threshold and the relationship coefficient is high.

The method 1100 can also include an act 1180 of canceling the request to remit the funds. In particular, the act 1180 can involve canceling the request to electronically remit funds to the selected recipient 102b, if the second risk level is above the second predetermined threshold. In one or more embodiments, the second risk level is above the second predetermined threshold if the relationship coefficient is low.

The method 1100 can also include calculating an implied relationship score between the sender and the recipient. In one or more embodiments, the implied relationship score between the sender 102a and the recipient 102b is based on one or more of: a number, frequency, or length of social network messages between the sender 102a and friends of the selected recipient 102b, or a number, frequency, or length of social network messages between the selected recipient 102b and friends of the sender 102a. For example, in one or more embodiments, the method 1100 can also include using the implied relationship score between the sender 102a and the recipient 102b to calculate the relationship coefficient representative of the relationship between the sender 102a and the selected recipient 102b.

Figure 12:
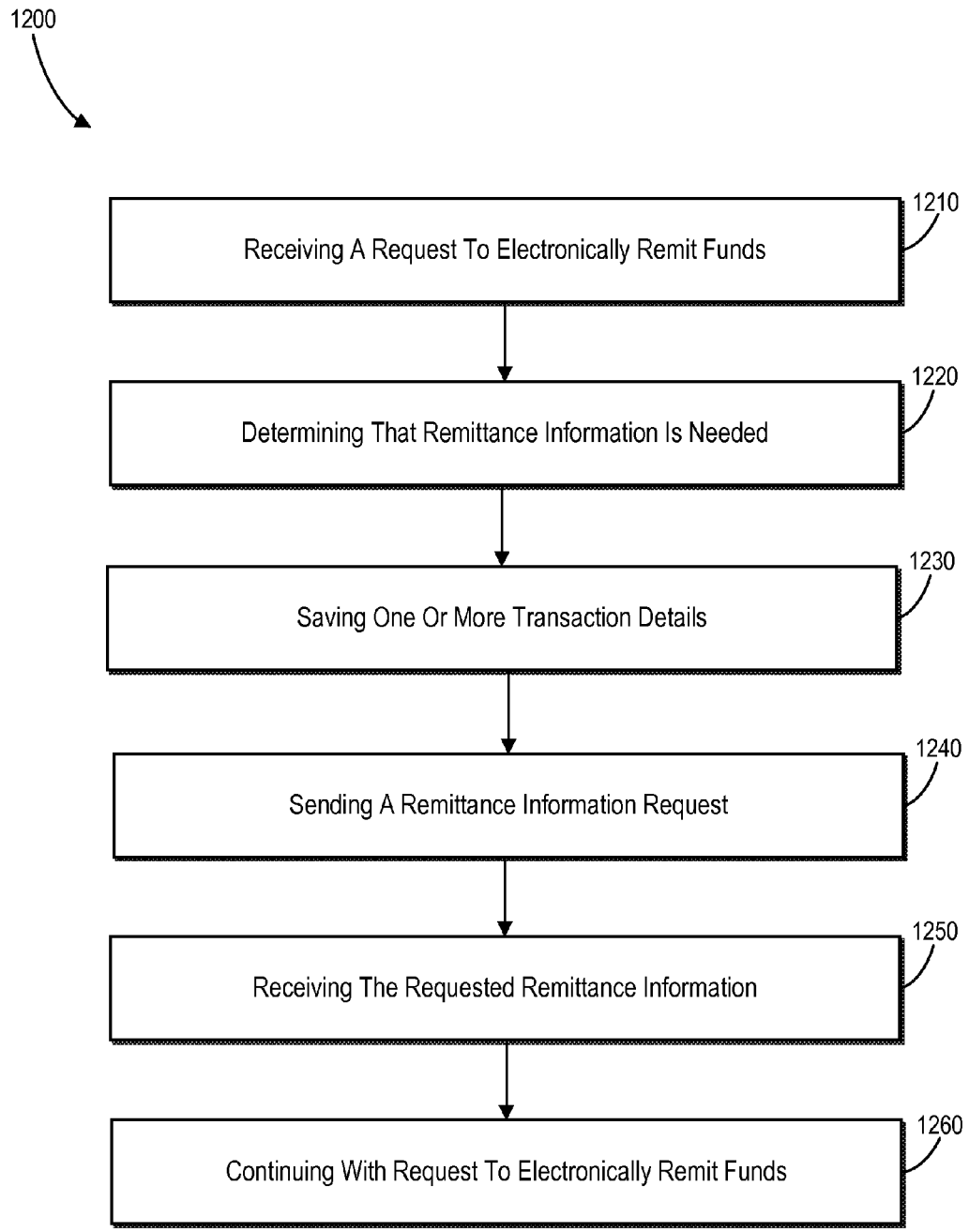
FIG. 12 illustrates a flowchart of a series of acts in a method of obtaining information from a recipient during a process of performing an electronic remittance.

FIG. 12 illustrates a flowchart of another method 1200 of electronically remitting funds to a recipient via a social network. The method 1200 includes an act 1210 of receiving a request to electronically remit funds. In particular, the act 1210 can involve receiving a request, at one or more servers from a sender 102a, to electronically remit funds to a recipient 102b, wherein the sender 102a and the recipient 102b are associated via a social networking system. In one or more embodiments, receiving the request, at one or more servers from the sender 102a, to electronically remit funds to the recipient 102b includes receiving one or more transaction parameters from the sender 102a.

In one or more embodiments, the one or more transaction parameters can include one or more of a recipient identity, a sender identity, a remittance amount, a destination country, or a reception method. For example, a reception method may include a local agent, a bank account, or a mobile wallet. In one or more embodiments, the recipient identity and sender identity may be based on a social network identity.

The method 1200 can also include an act 1220 of determining that remittance information is needed. In particular, the act 1220 can involve determining, by the one or more servers, that remittance information is needed from the recipient 102b to electronically remit the funds to the recipient 102b. In one or more embodiments, determining that remittance information is needed from the recipient 102b can include determining the recipient's personal information is needed. For example, the recipient's personal information can include one or more of the recipient's legal name, the recipient's address, the recipient's phone number, the recipient's email address, or the recipient's bank account information.

The method 1200 can further include an act 1230 of saving one or more transaction details. In particular, the act 1230 can involve saving, by the one or more servers, one or more transaction details related to the request to electronically remit funds to the recipient 102b. In one or more embodiments, saving the one or more transaction details related to the request to electronically remit funds to the recipient 102b can include saving the one or more transaction parameters received from the sender 102a.

Additionally, the method 1200 can include an act 1240 of sending a remittance information request. In particular, the act 1240 can involve sending, by the one or more server, a remittance information request to the recipient 102b. In one or more embodiments, sending a remittance information request to the recipient 102b can include sending a social network notification to the recipient 102b. For example, the act 1240 can further include providing one or more forms to allow the recipient 102b to enter personal information upon the recipient 102b interacting with the social network notification.

The method 1200 can also include an act 1250 of receiving the requested remittance information. In particular, the act 1250 can involve receiving, at the one or more servers, the requested remittance information from the recipient 102b. In one or more embodiments, receiving the requested remittance information from the recipient 102b may include receiving the requested remittance information via one or more forms. The method 1200 can also include calculating an exchange rate between a currency of a country of the sender and a currency of a country of the recipient upon receiving the requested remittance information.

The method 1200 can further include an act 1260 of continuing with the request to electronically remit funds. In particular, the act 1260 can involve, in response to receiving the requested remittance information from the recipient 102b, continuing, by the one or more servers, with the received request to electronically remit funds to the recipient using the saved one or more transaction details and the received remittance information. In one or more embodiments, continuing with the received request to electronically remit funds to the recipient 102b can include forwarding the saved one or more transaction details and the received remittance information to a remittance network.

Figure 13:
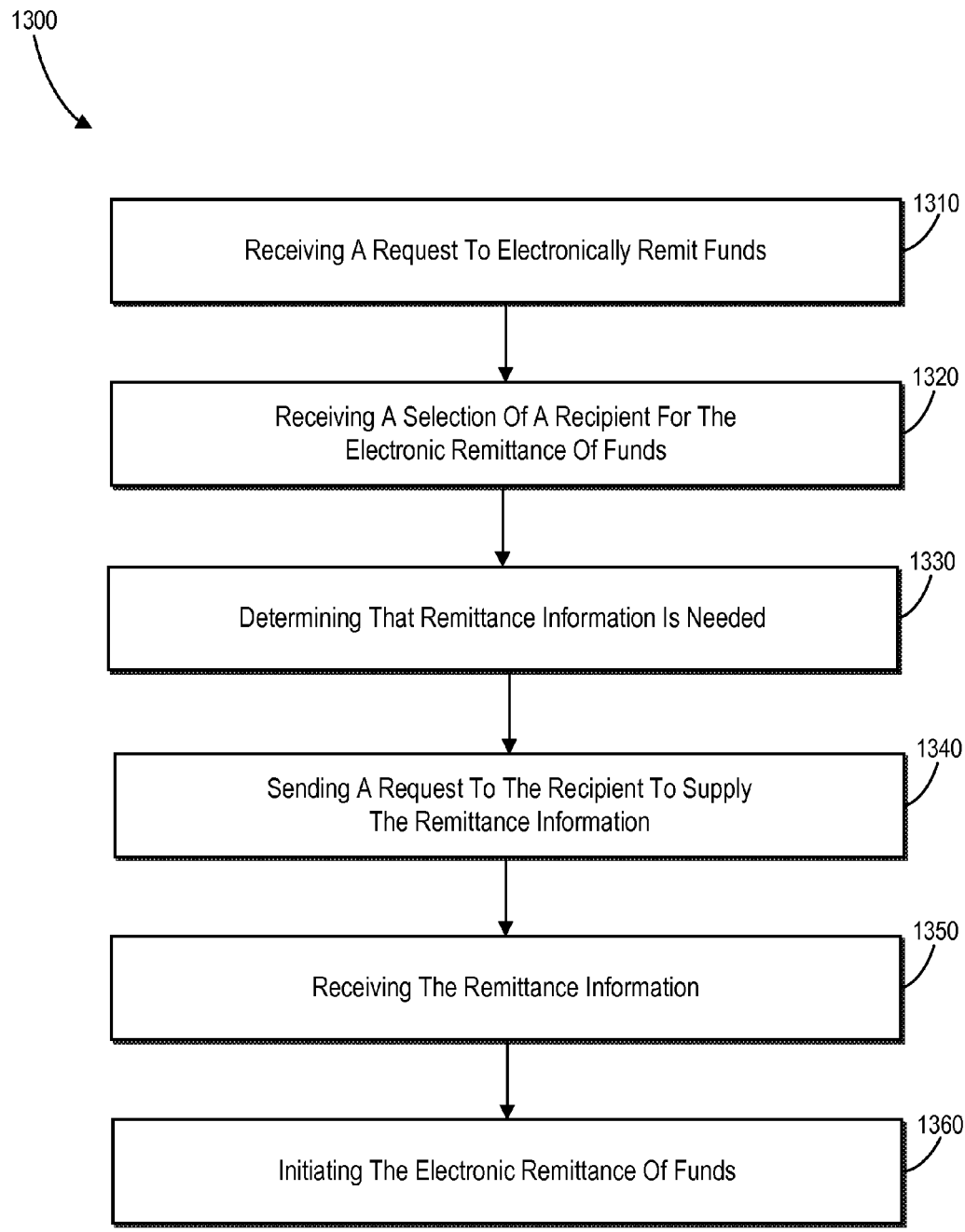
FIG. 13 illustrates a flowchart of a series of acts in another method of obtaining information from a recipient during a process of performing an electronic remittance.

FIG. 13 illustrates a flowchart of another method 1300 of electronically remitting funds to a recipient via a social network. The method 1300 includes an act 1310 of receiving a request to electronically remit funds. In particular, the act 1310 can involve receiving a request, at one or more servers from a sender 102*a*, to electronically remit funds. In one or more embodiments, receiving the request, at one or more servers from the sender 102*a*, to electronically remit funds may include receiving one or more transaction parameters from the sender 102*a*.

The method 1300 can include an act 1320 of receiving a selection of a recipient for the electronic remittance of funds. In particular, the act 1320 can involve receiving, at one or more servers and from a sender 102*a*, a selection of a recipient 102*b* for the electronic remittance of the funds and one or more transaction details related to the electronic remittance of the funds, wherein the recipient 102*b* and the sender 102*a* are connected via a social networking system. In one or more embodiments, receiving a selection of a recipient 102*b* for the electronic remittance of the funds can include receiving a social network identity of the recipient 102*a*. For example, in one or more embodiments, receiving one or more transaction details related to the electronic remittance of the funds comprises receiving one or more of a recipient identity, a sender identity, a remittance amount, a destination country, or a reception method.

The method 1300 may further include an act 1330 of determining that remittance information is needed. In particular, the act 1330 can involve determining, by the one or more servers, that remittance information is needed for the selected recipient 102*b*. In one or more embodiments, determining that remittance information is needed for the selected recipient 102*b* can include determining that one or more of a legal name, an address, a phone number, an email address, or bank account information is needed from the selected recipient 102*b*.

The method 1300 may further include an act 1340 of sending a request to the recipient to supply the remittance information. In particular, the act 1340 can involve sending, by one or more servers, a request to the recipient to supply the remittance information using contact information for the recipient stored by the social networking system. In one or more embodiments, sending a request to the recipient to supply the remittance information using contact information for the recipient 102*b* stored by the social network can include sending the recipient 102*b* a social network notification. For example, sending the social network notification can include sending one or more of a pop-up notification, a social network message, or an icon notification.

Furthermore, the method 1300 can include an act 1350 of receiving the remittance information. In particular, the act 1350 can involve receiving, by the one or more servers, the remittance information from the recipient 102*b*. In one or more embodiments, the remittance information from the recipient 102*b* may be received via one or more forms.

Additionally, the method 1300 can include an act 1360 of initiating the electronic remittance of funds. In particular, the act 1360 can involve initiating the electronic remittance of funds to the recipient 102*b* using the one or more transaction details and the remittance information received from the recipient 102*b*. In one or more embodiments, the method 1300 may include, prior to initiating the electronic remittance of funds to the recipient 102*b*, reviewing the one or more transaction details and the remittance information received from the recipient 102*b*. In one or more embodiments, the method 1300 may also include sending by the one or more servers, a confirmation to the sender that the recipient has supplied the requested remittance information.

Figure 14:
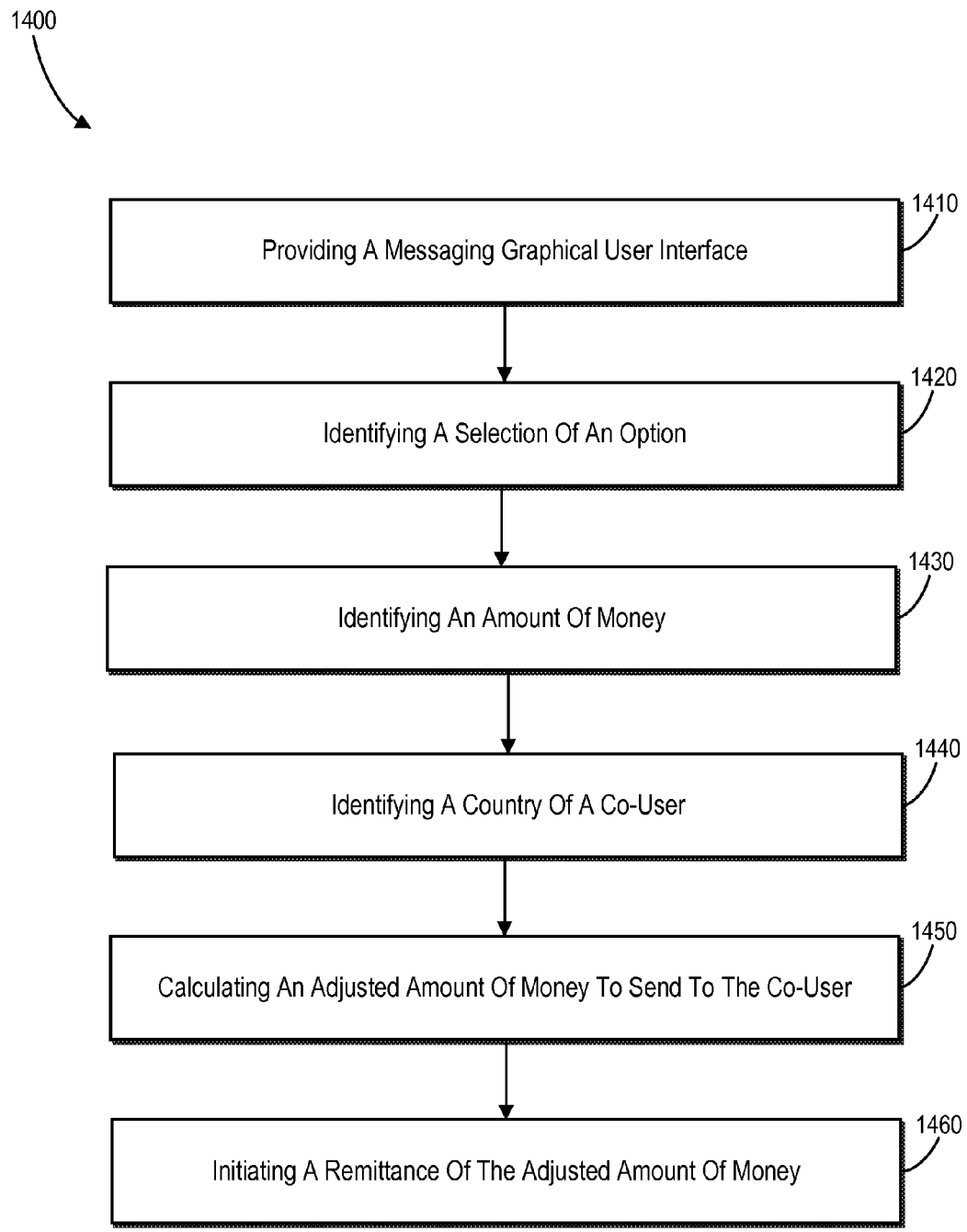
FIG. 14 illustrates a flowchart of a series of acts in a method of electronically remitting funds using an integrated messaging and remittance system.

FIG. 14 illustrates a flowchart of another method 1400 of electronically remitting funds to a recipient via a social network. The method 1400 includes an act 1410 of providing a messaging graphical user interface. In particular, the act 1410 can involve providing a messaging graphical user interface including a communication thread comprising a plurality of electronic messages exchanged between a user and a co-user.

The method 1400 can also include an act 1420 of identifying a selection of an option. In particular, the act 1420 can involve identifying a selection of an option in the messaging graphical user interface to electronically remit funds from the user to the co-user. In one or more embodiments, the option in the messaging graphical user interface to electronically remit funds may be a touch screen icon.

The method 1400 can include an act 1430 of identifying an amount of money. In particular, the act 1430 can involve identifying an amount of money that the user desires to send to the co-user. In one or more embodiments, identifying the amount of money that the user desires to send to the co-user may be based on an electronic message from the co-user to the user.

The method 1400 can further include an act 1440 of identifying a country of a co-user. In particular, the act 1440 can involve identifying a country for the co-user based on profile information maintained for the co-user. In one or more embodiments, identifying a country for the user may be based on a detected location of a client device associated with the user.

Additionally, the method 1400 can include an act 1450 of calculating an adjusted amount of money to send to the co-user. In particular, the act 1450 can involve calculating an adjusted amount of money to send to the co-user in a currency of the identified country for the co-user using an exchange rate. In one or more embodiments, the method 1400 can further include providing a message denying the option in the messaging graphical user interface to electronically remit funds, if the adjusted amount of money is more than a limit associated with user.

Furthermore, the method 1400 can include an act 1460 of initiating a remittance of the adjusted amount of money. In particular, the act 1460 can involve initiating a remittance including the adjusted amount of money to the co-user. In one or more embodiments, the method 1400 can further include providing a confirmation graphical user interface indicating the initiation of the remittance.

The method 1400 can also include a step of identifying a status of the co-user, wherein the status of the co-user is active. Additionally, the method 1400 can include a step of identifying a payment credential associated with the co-user. In one or more embodiments, if the status of the co-user is active and the payment credential is associated with the co-user, the method 1400 can include providing a remittance form to the user for initiating the remittance.

In an embodiment, the method 1400 can include inferring that a payment event for the co-user has occurred or is about to occur, and sending a notification to the user to remit funds to the co-user in response to the inferred payment event. For example, a payment event can be one or more of a birthday, a wedding, a religious event, an anniversary, or a holiday. In one or more embodiments, inferring that the payment event for the co-user has occurred or is about to occur is based on analyzing information about the co-user maintained by a social networking system.

The method 1400 may further include the step of identifying a selection of a remittance method for delivering the funds to the co-user. In one or more embodiments, the method 1400 also includes the step of requesting remittance information about the co-user from the user based on the selected remittance method. Additionally or alternatively, the method 1400 can also include auto-filling one or more pieces of remittance information for the co-user based on information about the co-user maintained by a social networking system.

Additionally, the method 1400 can include the step of requesting remittance information from the co-user via a social network notification. In one or more embodiments, the method 1400 can further include the step of notifying the user of a pause in the electronic remittance of funds from the user to the co-user. Additionally, the method 1400 may include the steps of receiving the requested remittance information from the co-user, and notifying the user of the receipt of the requested remittance information from the co-user. Furthermore, the method 1400 can also include the step of continuing with the electronic remittance of funds from the user to the co-user based on the remittance information received from the co-user.

Figure 15:
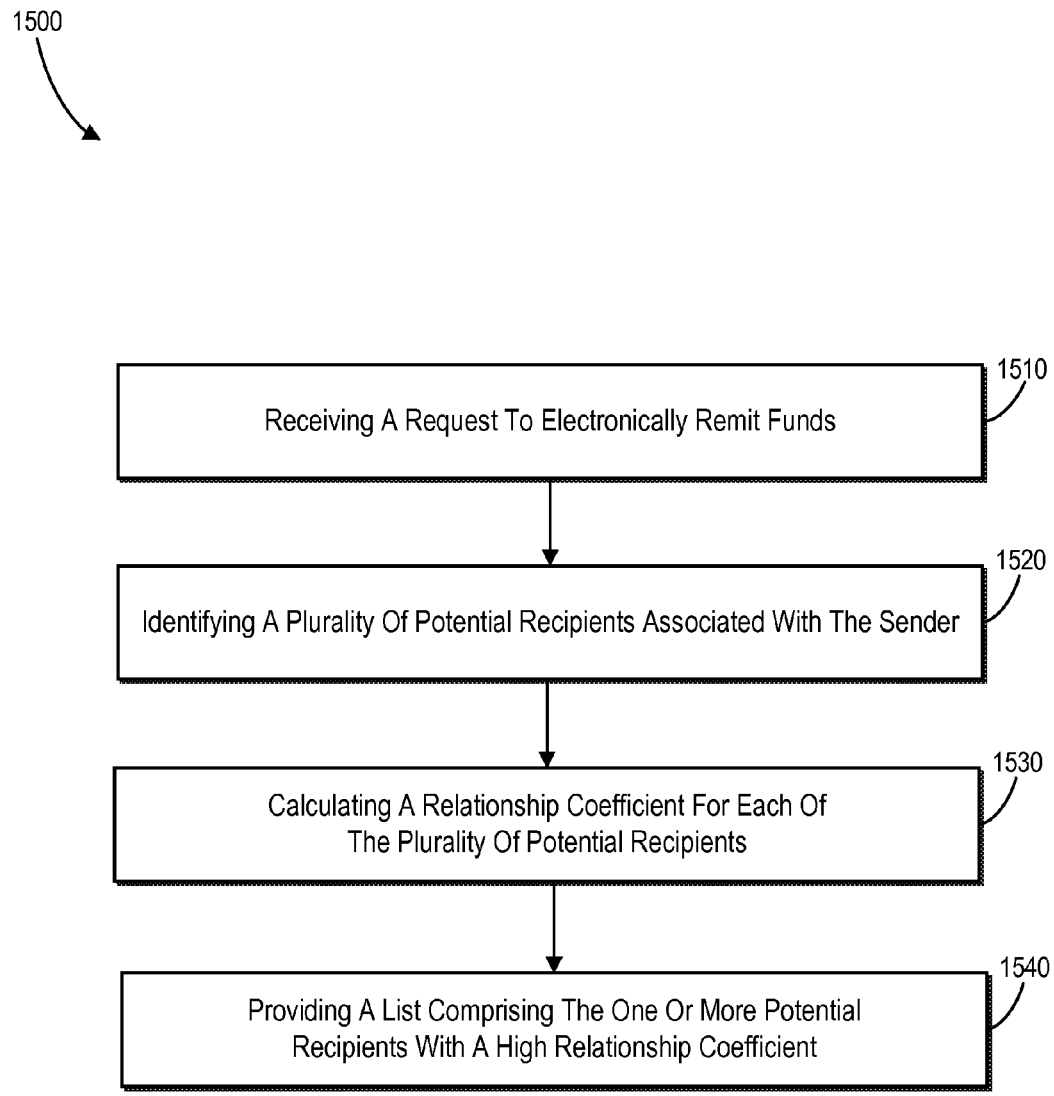
FIG. 15 illustrates a flowchart of a series of acts in a method of providing a list of potential recipients for an electronic remittance.

FIG. 15 illustrates a flowchart of another method 1500 of electronically remitting funds to a recipient via a social network. The method 1500 includes an act 1510 of receiving a request to electronically remit funds. In particular, the act 1510 can involve receiving a request, from a sender, to electronically remit funds.

The method 1500 can include an act 1520 of identifying a plurality of potential recipients associated with the sender. In particular, the act 1520 can involve identifying a plurality of potential recipients who live in an eligible country for receiving the remit funds and are associated with the sender via a social network. In one or more embodiments, the act 1520 can further include providing a list of countries that are eligible for receiving the remit funds, and receiving a selection of an eligible country, wherein the eligible country is selected from the list of countries that are eligible for receiving the remit funds. Thus, in one embodiment, the plurality of potential recipient who live in an eligible country for receiving the remit funds live in the selected eligible country.

The method 1500 can also include an act 1530 of calculating a relationship coefficient for each of the plurality of potential recipients. In particular, the act 1530 can involve calculating a relationship coefficient for each of the plurality of potential recipients based on data of the social networking system. In one or more embodiments, the relationship coefficient indicates the strength of a relationship between the sender and each of the plurality of potential recipients.

Additionally, the method 1500 can include an act 1540 of providing a list comprising the one or more potential recipients with a high relationship coefficient. In particular, the act 1540 can involve providing to the sender, a list comprising the one or more potential recipients with a high relationship coefficient. In one or more embodiments, the act 1540 can further involve ranking the list comprising the one or more potential recipients based on the relationship coefficient of each of the one or more potential recipients. In one embodiment, the list comprising the one or more potential recipients is further ranked based on a payment event associated with each of the one or more potential recipients.

Furthermore, the method 1500 can also include the steps of inferring a payment event associated with a potential recipient, and including the potential recipient associated with the payment event in the list of one or more potential recipients. In one or more embodiments, a payment event is one or more of a birthday, a wedding, a religious event, an anniversary, or a holiday. In an embodiment, the method 1500 can further include a step of providing a reminder to the sender of an upcoming inferred payment event associated with a potential recipient.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 16 illustrates a block diagram of exemplary computing device 1600 that may be configured to perform one or more of the processes described above. One will appreciate that one or more computing devices such as the computing device 1600 may implement the remittance system 100a. As shown by FIG. 16, the computing device 1600 can comprise a processor 1602, a memory 1604, a storage device 1606, an I/O interface 1608, and a communication interface 1610, which may be communicatively coupled by way of a communication infrastructure 1612. While an exemplary computing device 1600 is shown in FIG. 16, the components illustrated in FIG. 16 are not intended to be limiting. Additional or alternative components may be used in other embodiments. Furthermore, in certain embodiments, the computing device 1600 can include fewer components than those shown in FIG. 16. Components of the computing device 1600 shown in FIG. 16 will now be described in additional detail.

In one or more embodiments, the processor 1602 includes hardware for executing instructions, such as those making up a computer program. As an example and not by way of limitation, to execute instructions, the processor 1602 may retrieve (or fetch) the instructions from an internal register, an internal cache, the memory 1604, or the storage device 1606 and decode and execute them. In one or more embodiments, the processor 1602 may include one or more internal caches for data, instructions, or addresses. As an example and not by way of limitation, the processor 1602 may include one or more instruction caches, one or more data caches, and one or more translation lookaside buffers (TLBs). Instructions in the instruction caches may be copies of instructions in the memory 1604 or the storage 1606.

The memory 1604 may be used for storing data, metadata, and programs for execution by the processor(s). The memory 1604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1604 may be internal or distributed memory.

The storage device 1606 includes storage for storing data or instructions. As an example and not by way of limitation, storage device 1606 can comprise a non-transitory storage medium described above. The storage device 1606 may include a hard disk drive (HDD), a floppy disk drive, flash memory, an optical disc, a magneto-optical disc, magnetic tape, or a Universal Serial Bus (USB) drive or a combination of two or more of these. The storage device 1606 may include removable or non-removable (or fixed) media, where appropriate. The storage device 1606 may be internal or external to the computing device 1600. In one or more embodiments, the storage device 1606 is non-volatile, solid-state memory. In other embodiments, the storage device 1606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1608 allows a user to provide input to, receive output from, and otherwise transfer data to and receive data from computing device 1600. The I/O interface 1608 may include a mouse, a keypad or a keyboard, a touch screen, a camera, an optical scanner, network interface, modem, other known I/O devices or a combination of such I/O interfaces. The I/O interface 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1608 is configured to provide graphical data to a display for presentation to a user. The graphical data may be representative of one or more graphical user interfaces and/or any other graphical content as may serve a particular implementation.

The communication interface 1610 can include hardware, software, or both. In any event, the communication interface 1610 can provide one or more interfaces for communication (such as, for example, packet-based communication) between the computing device 1600 and one or more other computing devices or networks. As an example and not by way of limitation, the communication interface 1610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1612 may include hardware, software, or both that couples components of the computing device 1600 to each other. As an example and not by way of limitation, the communication infrastructure 1612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social-networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multi-media content items to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 17:
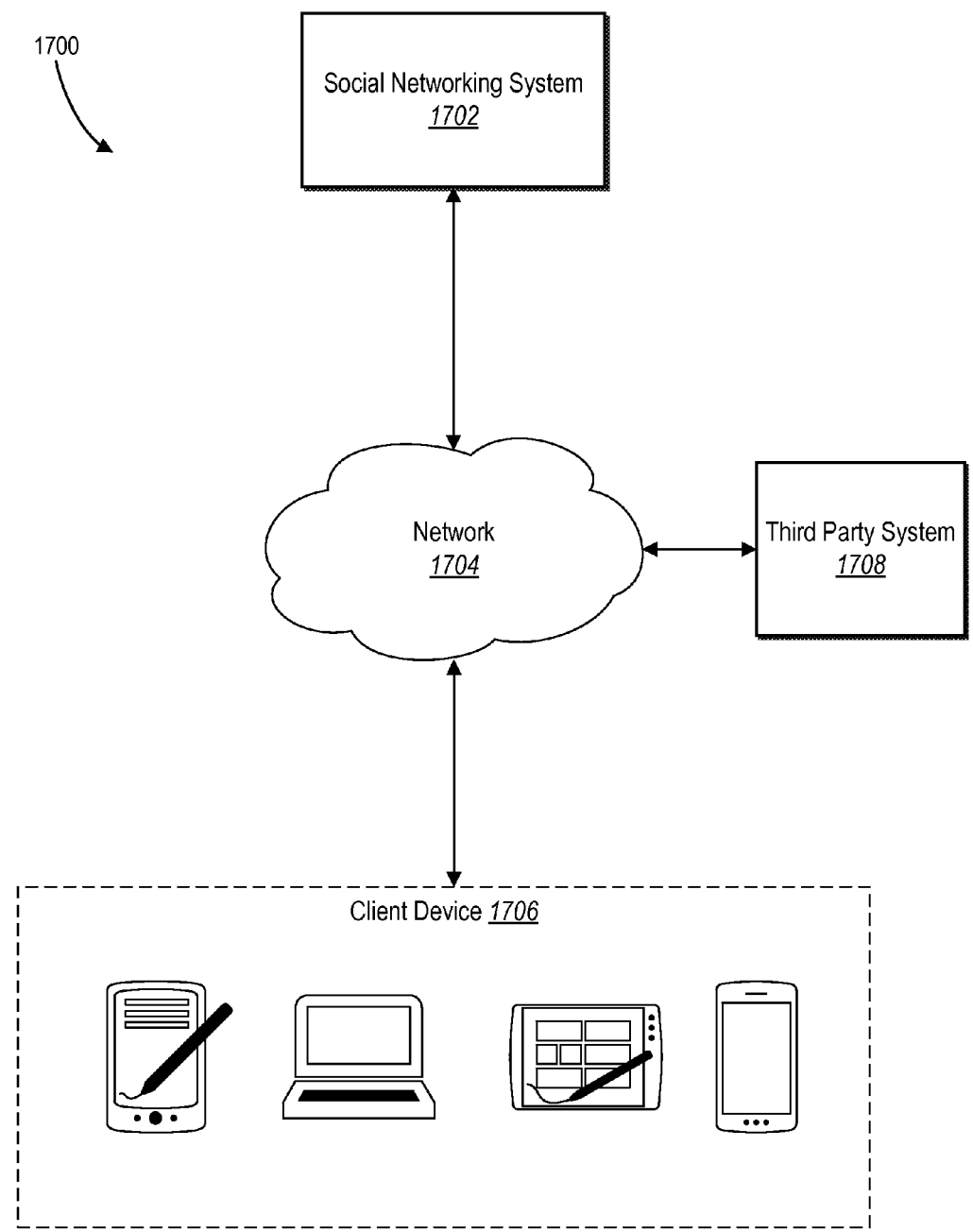
FIG. 17 is an example network environment of a social networking system in accordance with one or more embodiments.

FIG. 17 illustrates an example network environment 1700 of a social-networking system. Network environment 1700 includes a client system 1706, a social-networking system 1702, and a third-party system 1708 connected to each other by a network 1704. Although FIG. 17 illustrates a particular arrangement of client system 1706, social-networking system 1702, third-party system 1708, and network 1704, this disclosure contemplates any suitable arrangement of client system 1706, social-networking system 1702, third-party system 1708, and network 1704. As an example and not by way of limitation, two or more of client system 1706, social-networking system 1702, and third-party system 1708 may be connected to each other directly, bypassing network 1704. As another example, two or more of client system 1706, social-networking system 1702, and third-party system 1708 may be physically or logically co-located with each other in whole or in part. Moreover, although FIG. 17 illustrates a particular number of client systems 1706, social-networking systems 1702, third-party systems 1708, and networks 1704, this disclosure contemplates any suitable number of client systems 1706, social-networking systems 1702, third-party systems 1708, and networks 1704. As an example and not by way of limitation, network environment 1700 may include multiple client system 1706, social-networking systems 1702, third-party systems 1708, and networks 1704.

This disclosure contemplates any suitable network 1704. As an example and not by way of limitation, one or more portions of network 1704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1704 may include one or more networks 1704.

Links may connect client system 1706, social-networking system 1702, and third-party system 1708 to communication network 1704 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1700. One or more first links may differ in one or more respects from one or more second links.

In particular embodiments, client system 1706 may be an electronic device including hardware, software, or embedded logic components or a combination of two or more such components and capable of carrying out the appropriate functionalities implemented or supported by client system 1706. As an example and not by way of limitation, a client system 1706 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 1706. A client system 1706 may enable a network user at client system 1706 to access network 1704. A client system 1706 may enable its user to communicate with other users at other client systems 1706.

In particular embodiments, client system 1706 may include a web browser 932, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1706 may enter a Uniform Resource Locator (URL) or other address directing the web browser to a particular server (such as server, or a server associated with a third-party system 1708), and the web browser may generate a Hyper Text Transfer Protocol (HTTP) request and communicate the HTTP request to server. The server may accept the HTTP request and communicate to client system 1706 one or more Hyper Text Markup Language (HTML) files responsive to the HTTP request. Client system 1706 may render a webpage based on the HTML files from the server for presentation to the user.

This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 1702 may be a network-addressable computing system that can host an online social network. Social-networking system 1702 may generate, store, receive, and send social-networking data, such as, for example, user-profile data, concept-profile data, social-graph information, or other suitable data related to the online social network. Social-networking system 1702 may be accessed by the other components of network environment 1700 either directly or via network 1704. In particular embodiments, social-networking system 1702 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 1702 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 1706, a social-networking system 1702, or a third-party system 1708 to manage, retrieve, modify, add, or delete, the information stored in data store.

In particular embodiments, social-networking system 1702 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 1702 may provide users of the online social network the ability to communicate and interact with other users. In particular embodiments, users may join the online social network via social-networking system 1702 and then add connections (e.g., relationships) to a number of other users of social-networking system 1702 whom they want to be connected to. Herein, the term "friend" may refer to any other user of social-networking system 1702 with whom a user has formed a connection, association, or relationship via social-networking system 1702.

In particular embodiments, social-networking system 1702 may provide users with the ability to take actions on various types of items or objects, supported by social-networking system 1702. As an example and not by way of limitation, the items and objects may include groups or social networks to which users of social-networking system 1702 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1702 or by an external system of third-party system 1708, which is separate from social-networking system 1702 and coupled to social-networking system 1702 via a network 1704.

In particular embodiments, social-networking system 1702 may be capable of linking a variety of entities. As an example and not by way of limitation, social-networking system 1702 may enable users to interact with each other as well as receive content from third-party systems 1708 or other entities, or to allow users to interact with these entities through an application programming interfaces (API) or other communication channels.

In particular embodiments, a third-party system 1708 may include one or more types of servers, one or more data stores, one or more interfaces, including but not limited to APIs, one or more web services, one or more content sources, one or more networks, or any other suitable components, e.g., that servers may communicate with. A third-party system 1708 may be operated by a different entity from an entity operating social-networking system 1702. In particular embodiments, however, social-networking system 1702 and third-party systems 1708 may operate in conjunction with each other to provide social-networking services to users of social-networking system 1702 or third-party systems 1708. In this sense, social-networking system 1702 may provide a platform, or backbone, which other systems, such as third-party systems 1708, may use to provide social-networking services and functionality to users across the Internet.

In particular embodiments, a third-party system 1708 may include a third-party content object provider. A third-party content object provider may include one or more sources of content objects, which may be communicated to a client system 1706. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1702 also includes user-generated content objects, which may enhance a user's interactions with social-networking system 1702. User-generated content may include anything a user can add, upload, send, or "post" to social-networking system 1702. As an example and not by way of limitation, a user communicates posts to social-networking system 1702 from a client system 1706. Posts may include data such as status updates or other textual data, location information, photos, videos, links, music or other similar data or media. Content may also be added to social-networking system 1702 by a third-party through a "communication channel," such as a newsfeed or stream.

In particular embodiments, social-networking system 1702 may include a variety of servers, sub-systems, programs, modules, logs, and data stores. In particular embodiments, social-networking system 1702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1702 may also include suitable components such as network interfaces, security mechanisms, load balancers, failover servers, management-and-network-operations consoles, other suitable components, or any suitable combination thereof. In particular embodiments, social-networking system 1702 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1702 to one or more client systems 1706 or one or more third-party system 1708 via network 1704. The web server may include a mail server or other messaging functionality for receiving and routing messages between social-networking system 1702 and one or more client systems 1706. An API-request server may allow a third-party system 1708 to access information from social-networking system 1702 by calling one or more APIs. An action logger may be used to receive communications from a web server about a user's actions on or off social-networking system 1702. In conjunction with the action log, a third-party-content-object log may be maintained of user exposures to third-party-content objects. A notification controller may provide information regarding content objects to a client system 1706. Information may be pushed to a client system 1706 as notifications, or information may be pulled from client system 1706 responsive to a request received from client system 1706. Authorization servers may be used to enforce one or more privacy settings of the users of social-networking system 1702. A privacy setting of a user determines how particular information associated with a user can be shared. The authorization server may allow users to opt in to or opt out of having their actions logged by social-networking system 1702 or shared with other systems (e.g., third-party system 1708), such as, for example, by setting appropriate privacy settings. Third-party-content-object stores may be used to store content objects received from third parties, such as a third-party system 1708. Location stores may be used for storing location information received from client systems 1706 associated with users. Advertisement-pricing modules may combine social information, the current time, location information, or other suitable information to provide relevant advertisements, in the form of notifications, to a user.

Figure 18:
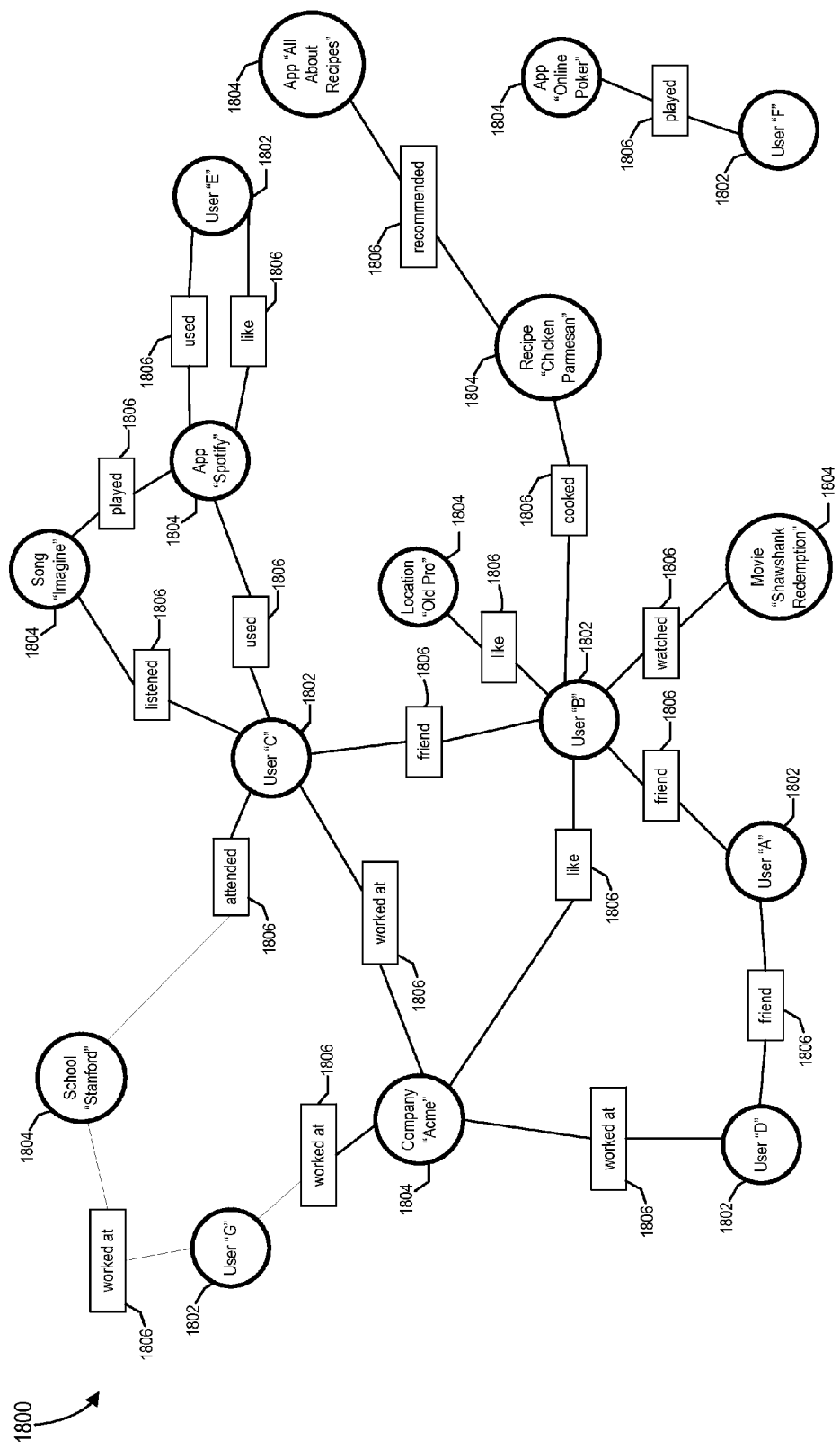
FIG. 18 illustrates a social graph in accordance with one or more embodiments.

FIG. 18 illustrates example social graph 1800. In particular embodiments, social-networking system 1702 may store one or more social graphs 1800 in one or more data stores. In particular embodiments, social graph 1800 may include multiple nodes—which may include multiple user nodes 1802 or multiple concept nodes 1804—and multiple edges 1806 connecting the nodes. Example social graph 1800 illustrated in FIG. 18 is shown, for didactic purposes, in a two-dimensional visual map representation. In particular embodiments, a social-networking system 1702, client system 1706, or third-party system 1708 may access social graph 1800 and related social-graph information for suitable applications. The nodes and edges of social graph 1800 may be stored as data objects, for example, in a data store (such as a social-graph database). Such a data store may include one or more searchable or query able indexes of nodes or edges of social graph 1800.

In particular embodiments, a user node 1802 may correspond to a user of social-networking system 1702. As an example and not by way of limitation, a user may be an individual (human user), an entity (e.g., an enterprise, business, or third-party application), or a group (e.g., of individuals or entities) that interacts or communicates with or over social-networking system 1702. In particular embodiments, when a user registers for an account with social-networking system 1702, social-networking system 1702 may create a user node 1802 corresponding to the user, and store the user node 1802 in one or more data stores. Users and user nodes 1802 described herein may, where appropriate, refer to registered users and user nodes 1802 associated with registered users. In addition or as an alternative, users and user nodes 1802 described herein may, where appropriate, refer to users that have not registered with social-networking system 1702. In particular embodiments, a user node 1802 may be associated with information provided by a user or information gathered by various systems, including social-networking system 1702. As an example and not by way of limitation, a user may provide his or her name, profile picture, contact information, birth date, sex, marital status, family status, employment, education background, preferences, interests, or other demographic information. In particular embodiments, a user node 1802 may be associated with one or more data objects corresponding to information associated with a user. In particular embodiments, a user node 1802 may correspond to one or more webpages.

In particular embodiments, a concept node 1804 may correspond to a concept. As an example and not by way of limitation, a concept may correspond to a place (such as, for example, a movie theater, restaurant, landmark, or city); a website (such as, for example, a website associated with social-network system 1702 or a third-party website associated with a web-application server); an entity (such as, for example, a person, business, group, sports team, or celebrity); a resource (such as, for example, an audio file, video file, digital photo, text file, structured document, or application) which may be located within social-networking system 1702 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1804 may be associated with information of a concept provided by a user or information gathered by various systems, including social-networking system 1702. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1804 may be associated with one or more data objects corresponding to information associated with concept node 1804. In particular embodiments, a concept node 1804 may correspond to one or more webpages.

In particular embodiments, a node in social graph 1800 may represent or be represented by a webpage (which may be referred to as a "profile page"). Profile pages may be hosted by or accessible to social-networking system 1702. Profile pages may also be hosted on third-party websites associated with a third-party server 1708. As an example and not by way of limitation, a profile page corresponding to a particular external webpage may be the particular external webpage and the profile page may correspond to a particular concept node 1804. Profile pages may be viewable by all or a selected subset of other users. As an example and not by way of limitation, a user node 1802 may have a corresponding user-profile page in which the corresponding user may add content, make declarations, or otherwise express himself or herself. As another example and not by way of limitation, a concept node 1804 may have a corresponding concept-profile page in which one or more users may add content, make declarations, or express themselves, particularly in relation to the concept corresponding to concept node 1804.

In particular embodiments, a concept node 1804 may represent a third-party webpage or resource hosted by a third-party system 1708. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1706 to send to social-networking system 1702 a message indicating the user's action. In response to the message, social-networking system 1702 may create an edge (e.g., an "eat" edge) between a user node 1802 corresponding to the user and a concept node 1804 corresponding to the third-party webpage or resource and store edge 1806 in one or more data stores.

In particular embodiments, a pair of nodes in social graph 1800 may be connected to each other by one or more edges 1806. An edge 1806 connecting a pair of nodes may represent a relationship between the pair of nodes. In particular embodiments, an edge 1806 may include or represent one or more data objects or attributes corresponding to the relationship between a pair of nodes. As an example and not by way of limitation, a first user may indicate that a second user is a "friend" of the first user. In response to this indication, social-networking system 1702 may send a "friend request" to the second user. If the second user confirms the "friend request," social-networking system 1702 may create an edge 1806 connecting the first user's user node 1802 to the second user's user node 1802 in social graph 1800 and store edge 1806 as social-graph information in one or more of data stores. In the example of FIG. 18, social graph 1800 includes an edge 1806 indicating a friend relation between user nodes 1802 of user "A" and user "B" and an edge indicating a friend relation between user nodes 1802 of user "C" and user "B." Although this disclosure describes or illustrates particular edges 1806 with particular attributes connecting particular user nodes 1802, this disclosure contemplates any suitable edges 1806 with any suitable attributes connecting user nodes 1802. As an example and not by way of limitation, an edge 1806 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1800 by one or more edges 1806.

In particular embodiments, an edge 1806 between a user node 1802 and a concept node 1804 may represent a particular action or activity performed by a user associated with user node 1802 toward a concept associated with a concept node 1804. As an example and not by way of limitation, as illustrated in FIG. 18, a user may "like," "attended," "played," "listened," "cooked," "worked at," or "watched" a concept, each of which may correspond to a edge type or subtype. A concept-profile page corresponding to a concept node 1804 may include, for example, a selectable "check in" icon (such as, for example, a clickable "check in" icon) or a selectable "add to favorites" icon. Similarly, after a user clicks these icons, social-networking system 1702 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 1702 may create a "listened" edge 1806 and a "used" edge (as illustrated in FIG. 18) between user nodes 1802 corresponding to the user and concept nodes 1804 corresponding to the song and application to indicate that the user listened to the song and used the application. Moreover, social-networking system 1702 may create a "played" edge 1806 (as illustrated in FIG. 18) between concept nodes 1804 corresponding to the song and the application to indicate that the particular song was played by the particular application. In this case, "played" edge 1806 corresponds to an action performed by an external application (SPOTIFY) on an external audio file (the song "Imagine"). Although this disclosure describes particular edges 1806 with particular attributes connecting user nodes 1802 and concept nodes 1804, this disclosure contemplates any suitable edges 1806 with any suitable attributes connecting user nodes 1802 and concept nodes 1804. Moreover, although this disclosure describes edges between a user node 1802 and a concept node 1804 representing a single relationship, this disclosure contemplates edges between a user node 1802 and a concept node 1804 representing one or more relationships. As an example and not by way of limitation, an edge 1806 may represent both that a user likes and has used at a particular concept. Alternatively, another edge 1806 may represent each type of relationship (or multiples of a single relationship) between a user node 1802 and a concept node 1804 (as illustrated in FIG. 18 between user node 1802 for user "E" and concept node 1804 for "SPOTIFY").

In particular embodiments, social-networking system 1702 may create an edge 1806 between a user node 1802 and a concept node 1804 in social graph 1800. As an example and not by way of limitation, a user viewing a concept-profile page (such as, for example, by using a web browser or a special-purpose application hosted by the user's client system 1706) may indicate that he or she likes the concept represented by the concept node 1804 by clicking or selecting a "Like" icon, which may cause the user's client system 1706 to send to social-networking system 1702 a message indicating the user's liking of the concept associated with the concept-profile page. In response to the message, social-networking system 1702 may create an edge 1806 between user node 1802 associated with the user and concept node 1804, as illustrated by "like" edge 1806 between the user and concept node 1804. In particular embodiments, social-networking system 1702 may store an edge 1806 in one or more data stores. In particular embodiments, an edge 1806 may be automatically formed by social-networking system 1702 in response to a particular user action. As an example and not by way of limitation, if a first user uploads a picture, watches a movie, or listens to a song, an edge 1806 may be formed between user node 1802 corresponding to the first user and concept nodes 1804 corresponding to those concepts. Although this disclosure describes forming particular edges 1806 in particular manners, this disclosure contemplates forming any suitable edges 1806 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 1702). A sponsored story may be a social action by a user (such as "liking" a page, "liking" or commenting on a post on a page, RSVP'ing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 1702 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 1702) or RSVP (e.g., through social-networking system 1702) to an event associated with the advertisement. In addition or as an alternative, an advertisement may include social-networking-system context directed to the user. As an example and not by way of limitation, an advertisement may display information about a friend of the user within social-networking system 1702 who has taken an action associated with the subject matter of the advertisement.

In particular embodiments, social-networking system 1702 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1708 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 1702 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 1702 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 1702 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 1702 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 1702 may calculate a coefficient based on a user's actions. Social-networking system 1702 may monitor such actions on the online social network, on a third-party system 1708, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 1702 may calculate a coefficient based on the user's actions with particular types of content. The content may be associated with the online social network, a third-party system 1708, or another suitable system. The content may include users, profile pages, posts, news stories, headlines, instant messages, chat room conversations, emails, advertisements, pictures, video, music, other suitable objects, or any combination thereof. Social-networking system 1702 may analyze a user's actions to determine whether one or more of the actions indicate an affinity for subject matter, content, other users, and so forth. As an example and not by way of limitation, if a user may make frequently posts content related to "coffee" or variants thereof, social-networking system 1702 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 1702 may calculate a coefficient based on the type of relationship between particular objects. Referencing the social graph 1800, social-networking system 1702 may analyze the number and/or type of edges 1806 connecting particular user nodes 1802 and concept nodes 1804 when calculating a coefficient. As an example and not by way of limitation, user nodes 1802 that are connected by a spouse-type edge (representing that the two users are married) may be assigned a higher coefficient than user nodes 1802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 1702 may determine that the user has a higher coefficient with respect to the first photo than the second photo because having a tagged-in-type relationship with content may be assigned a higher weight and/or rating than having a like-type relationship with content. In particular embodiments, social-networking system 1702 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 1702 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1800. As an example and not by way of limitation, social-graph entities that are closer in the social graph 1800 (i.e., fewer degrees of separation) may have a higher coefficient than entities that are further apart in the social graph 1800.

In particular embodiments, social-networking system 1702 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 1706 of the user). A first user may be more interested in other users or concepts that are closer to the first user. As an example and not by way of limitation, if a user is one mile from an airport and two miles from a gas station, social-networking system 1702 may determine that the user has a higher coefficient for the airport than the gas station based on the proximity of the airport to the user.

In particular embodiments, social-networking system 1702 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 1702 may provide information that is relevant to user's interests and current circumstances, increasing the likelihood that they will find such information of interest. In particular embodiments, social-networking system 1702 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 1702 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 1702 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1708 (e.g., via an API or other communication channel), or from another suitable system. In response to the request, social-networking system 1702 may calculate the coefficient (or access the coefficient information if it has previously been calculated and stored). In particular embodiments, social-networking system 1702 may measure an affinity with respect to a particular process. Different processes (both internal and external to the online social network) may request a coefficient for a particular object or set of objects. Social-networking system 1702 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1804 corresponding to a particular photo may have a privacy setting specifying that the photo may only be accessed by users tagged in the photo and their friends. In particular embodiments, privacy settings may allow users to opt in or opt out of having their actions logged by social-networking system 1702 or shared with other systems (e.g., third-party system 1708). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1708, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 1702 may send a request to the data store for the object. The request may identify the user associated with the request and may only be sent to the user (or a client system 1706 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
  receiving a request from a sender, at one or more servers of a social network, to electronically remit funds to a recipient, wherein the sender and the recipient are associated via the social network;
  determining, by the one or more servers of the social network and prior to completing the received request to electronically remit funds to the recipient, that remittance information is needed from the recipient to electronically remit the funds to the recipient;
  saving, by the one or more servers of the social network, one or more transaction details related to the request to electronically remit funds to the recipient;
  sending, by the one or more servers of the social network and prior to completing the received request to electronically remit funds to the recipient, a remittance information request to the recipient via the social network;
  receiving, at the one or more servers of the social network, the requested remittance information from the recipient; and
  in response to receiving the requested remittance information from the recipient, completing, by the one or more servers of the social network, the received request to electronically remit funds to the recipient using the saved one or more transaction details and the received remittance information.

2. The method as recited in claim 1, wherein receiving the request from the sender, at one or more servers of the social network, to electronically remit funds to the recipient comprises receiving one or more transaction parameters from the sender.

3. The method as recited in claim 2, wherein the one or more transaction parameters comprise one or more of a recipient identity, a sender identity, a remittance amount, a destination country, or a reception method.

4. The method as recited in claim 3, wherein a reception method comprises a local agent, a bank account, or a mobile wallet.

5. The method as recited in claim 2, wherein saving, by the one or more servers of the social network, one or more transaction details related to the request to electronically remit funds to the recipient comprises saving the one or more transaction parameters received from the sender.

6. The method as recited in claim 1, wherein determining, by the one or more servers of the social network and prior to completing the received request to electronically remit funds to the recipient, that remittance information is needed from the recipient comprises determining the recipient's personal information is needed.

7. The method as recited in claim 6, wherein the recipient's personal information comprises one or more of the recipient's legal name, the recipient's address, the recipient's phone number, the recipient's email address, or the recipient's bank account information.

8. The method as recited in claim 1, wherein sending, by one or more servers of the social network and prior to completing the received request to electronically remit funds to the recipient, a remittance information request to the recipient via the social network comprises sending a social network notification to the recipient.

9. The method as recited in claim 8, further comprising providing one or more social network forms to allow the recipient to enter personal information upon the user interacting with the social network notification.

10. The method as recited in claim 1, further comprising calculating an exchange rate between a currency of a country of the sender and a currency of a country of the recipient upon receiving the requested remittance information.

11. A method comprising:
  receiving a request from a sender, at one or more servers of a social network, to electronically remit funds;
  receiving, at one or more servers of the social network and from a sender, a selection of a recipient for the electronic remittance of the funds and one or more transaction details related to the electronic remittance of the funds, wherein the selection of the recipient and the one or more transaction details are received via one or more social network graphical user interfaces and the recipient and the sender are connected via the social network;
  determining, by the one or more servers of the social network and prior to initiating an electronic remittance of funds, that remittance information is needed for the selected recipient;

sending, by the one or more servers of the social network, a request to the recipient via the social network to supply the remittance information using contact information for the recipient stored by the social network;

receiving, by the one or more servers of the social network, the remittance information from the recipient; and in response to receiving the remittance information from the recipient, initiating the electronic remittance of funds, by the one or more servers of the social network, to the recipient using the one or more transaction details and the remittance information received from the recipient.

12. The method as recited in claim 11, wherein receiving, at one or more servers of the social network and from the sender, a selection of a recipient for the electronic remittance of the funds comprises receiving a selection of a social network identity of the recipient via the one or more social network graphical user interfaces.

13. The method as recited in claim 12, wherein receiving, at one or more servers of the social network and from the sender, one or more transaction details related to the electronic remittance of the funds via one or more social network graphical user interfaces comprises receiving one or more of a recipient identity, a sender identity, a remittance amount, a destination country, or a reception method.

14. The method as recited in claim 13, wherein determining, by one or more servers of the social network and prior to initiating the electronic remittance of funds, that remittance information is needed for the selected recipient comprises determining that one or more of a legal name, an address, a phone number, an email address, or bank account information is needed from the selected recipient.

15. The method as recited in claim 14, wherein sending, by one or more servers of the social network, a request to the recipient via the social network to supply the remittance information using contact information for the recipient stored by the social network comprises sending the recipient a social network notification.

16. The method as recited in claim 15, wherein sending the social network notification comprises sending one or more of a pop-up notification, a social network message, or an icon notification.

17. The method as recited in claim 16, further comprising sending, by the one or more servers, a confirmation to the sender via the social network that the recipient has supplied the requested remittance information.

18. The method as recited in claim 17, further comprising, prior to initiating the electronic remittance of funds to the recipient, providing the one or more transaction details and the remittance information received from the recipient in one or more social network graphical user interfaces to the sender for review.

19. A social networking system comprising:
at least one processor; and
at least one non-transitory computer-readable storage medium storing instructions thereon that, when executed by the at least one processor, cause the social networking system to:
receive a request to electronically remit funds to a recipient, wherein the sender and the recipient are associated via the social networking system;
determine, prior to completing the received request to electronically remit funds to the recipient, that remittance information is needed from the recipient to electronically remit the funds to the recipient;
save one or more transaction details related to the request to electronically remit funds to the recipient;
send, prior to completing the received request to electronically remit funds to the recipient, a remittance information request to the recipient via the social networking system;
receive the requested remittance information from the recipient; and
in response to receiving the requested remittance information from the recipient, complete the received request to electronically remit funds to the recipient using the saved one or more transaction details and the received remittance information.

20. The system as recited in claim 19, further comprising instructions that, when executed by the at least one processor, cause the system to:
send, prior to completing the received request to electronically remit funds to the recipient, the remittance information request to the recipient via a social network identity of the recipient;
receive the requested remittance information from the recipient via one or more social networking system web forms; and
complete the received request to electronically remit funds to the recipient by processing the saved one or more transaction details and the received remittance information.

* * * * *